United States Patent

Shiraishi et al.

[11] Patent Number: 5,774,249
[45] Date of Patent: Jun. 30, 1998

[54] OPTICAL EXPOSER UNIT

[75] Inventors: Takashi Shiraishi, Sagamihara; Masao Yamaguchi, Kawaguchi, both of Japan

[73] Assignee: Kabushiki Kaisha Toshiba, Kawasaki, Japan

[21] Appl. No.: 625,552

[22] Filed: Mar. 29, 1996

[30] Foreign Application Priority Data

Mar. 31, 1995 [JP] Japan .................................. 7-097626

[51] Int. Cl.$^6$ .................................................. G02B 26/08
[52] U.S. Cl. .................... 359/205; 359/204; 359/207; 359/216; 359/217; 347/243; 347/244
[58] Field of Search ............................. 359/204–207, 359/212–219, 662, 708, 710–711, 717–718; 347/256–261, 225, 232–235, 241–244; 250/234–236

[56] References Cited

U.S. PATENT DOCUMENTS

| 5,181,137 | 1/1993 | Koide ........................................ 359/217 |
| 5,245,462 | 9/1993 | Kanai et al. ............................ 359/204 |
| 5,251,055 | 10/1993 | Koide ...................................... 359/207 |
| 5,278,586 | 1/1994 | Yoneda et al. . | |

*Primary Examiner*—James Phan
*Attorney, Agent, or Firm*—Foley & Lardner

[57] ABSTRACT

The present invention provides an image forming apparatus, which can provide a color image having no color shift with low manufacturing cost, and an optical exposer unit applied to the image forming apparatus. Thereby, the image forming apparatus comprises a finite focus lens for providing a predetermined optical characteristic to the laser beam sent from a plurality of light sources, a cylinder lens, a laser synthesizing mirror unit for synthesizing the laser beams passed through the lenses into one flux of beams, a deflector for deflecting the synthesized beam, first and second image forming lenses for shaping aberration characteristics provided on the image-formed position of the deflected beam, and one or three mirrors for emitting the beam passed through the respective image forming lenses at a predetermined position, thereby a color image having no color shift can be provided.

44 Claims, 48 Drawing Sheets

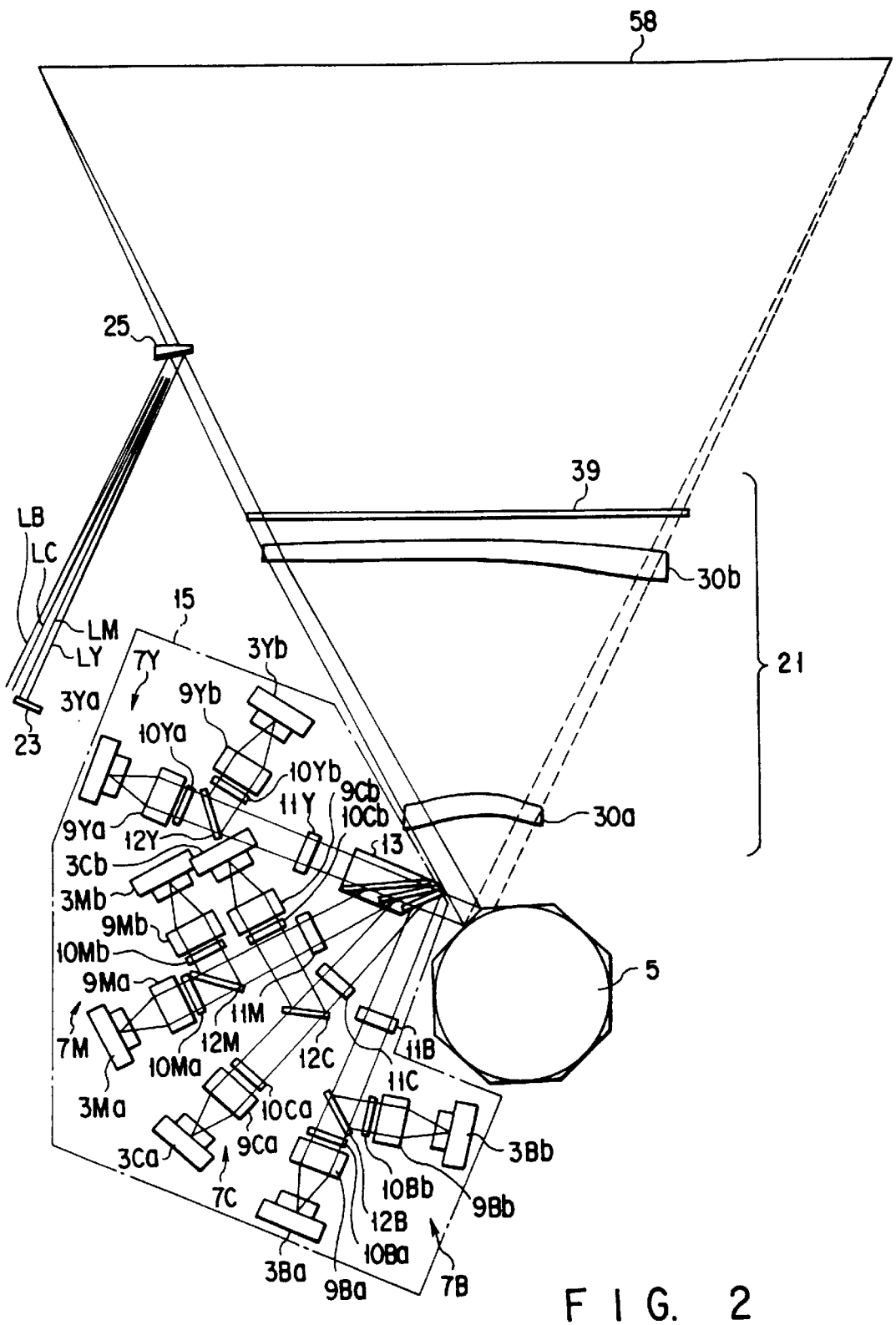
F I G. 2

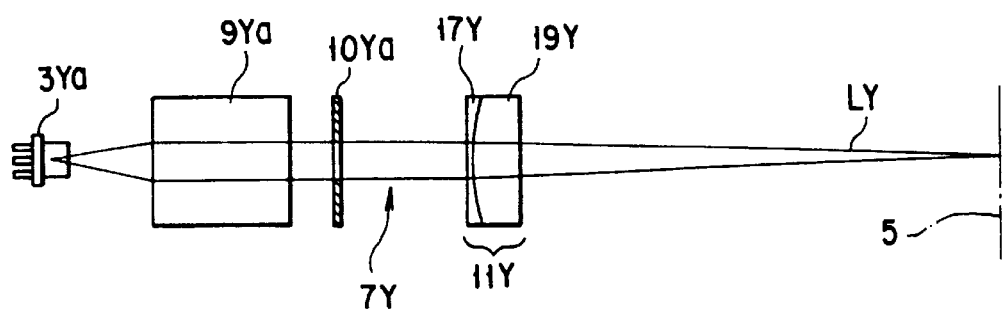
F I G. 3
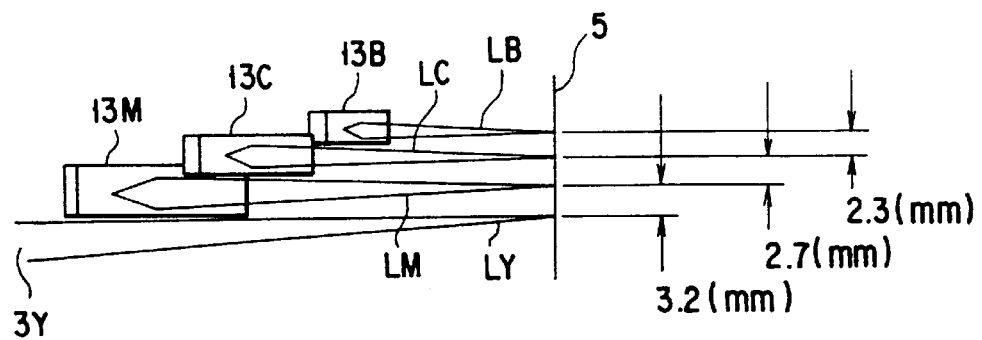
F I G. 4
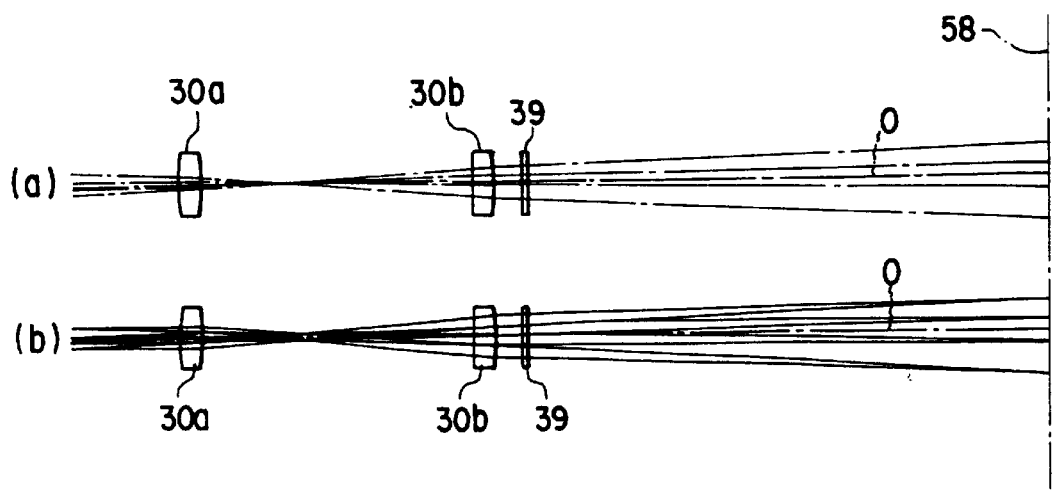
F I G. 6

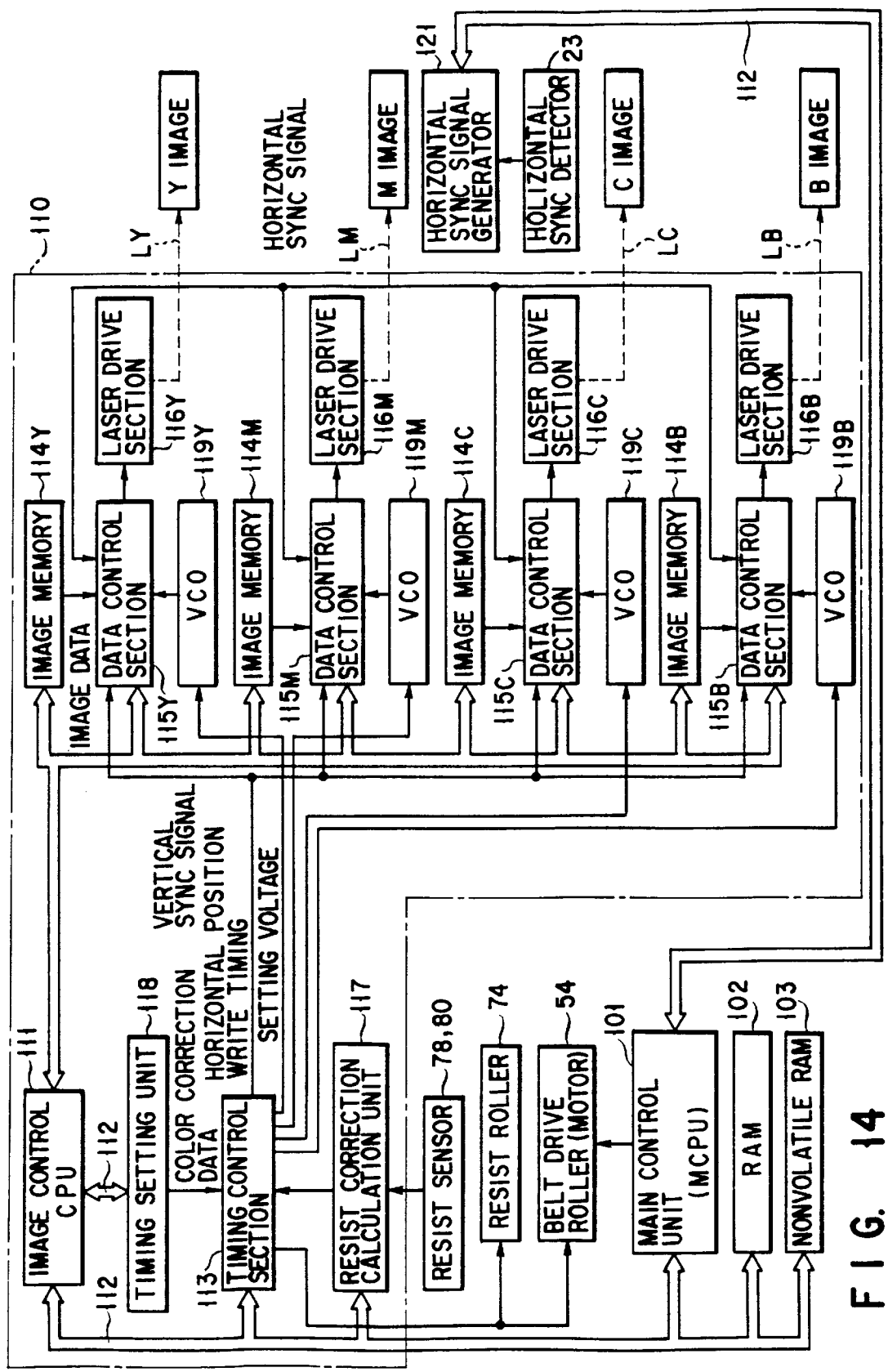
F I G. 14

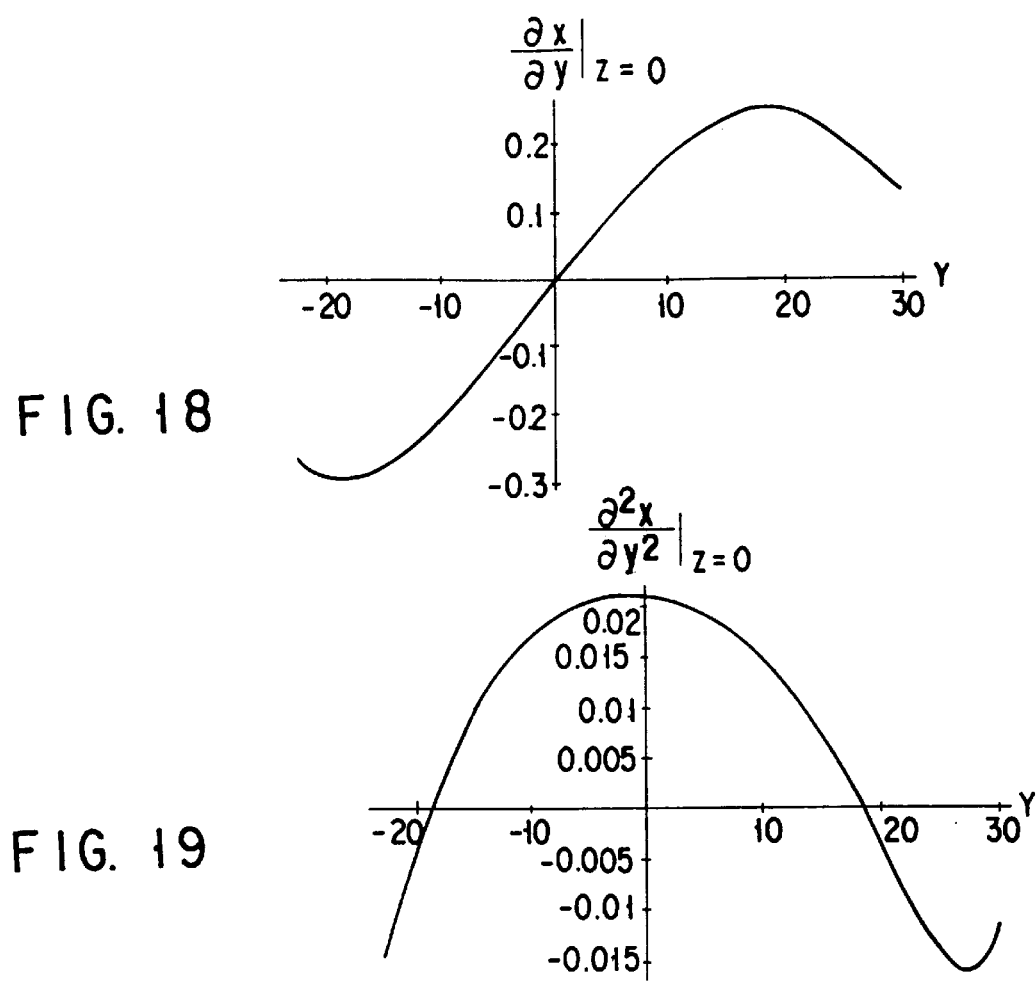
FIG. 18
FIG. 19
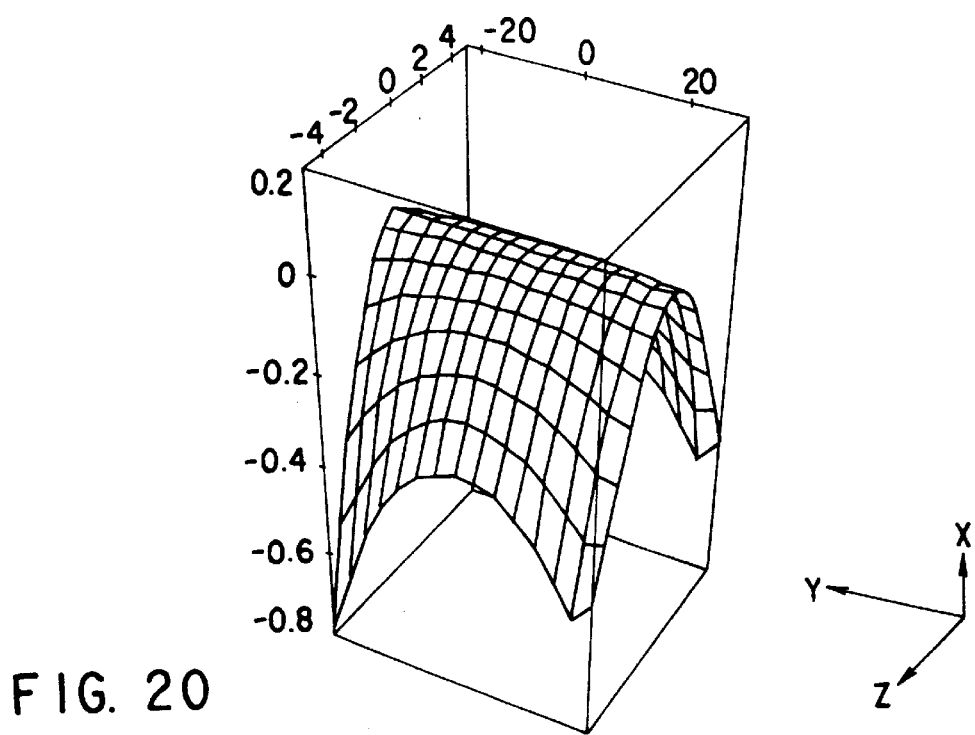
FIG. 20

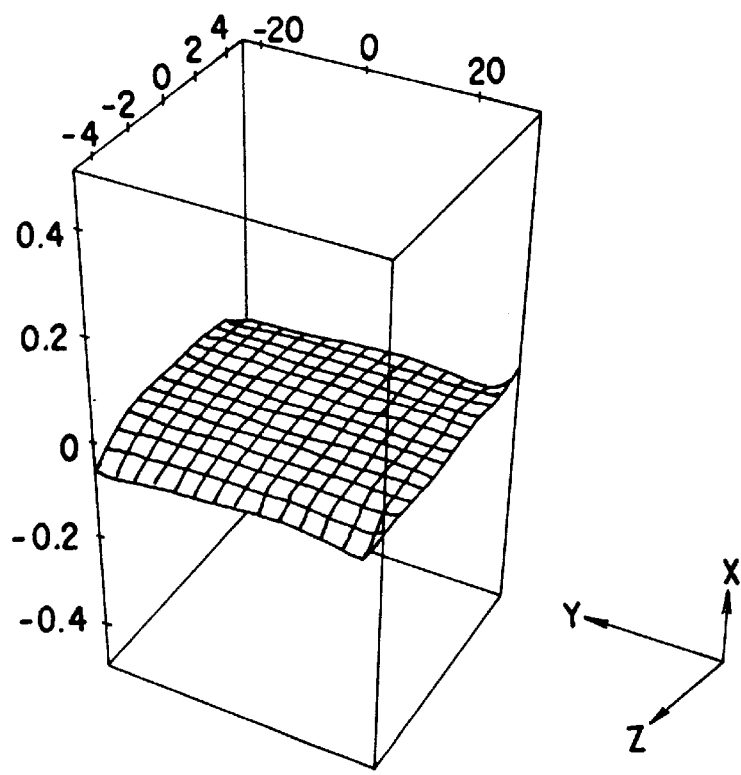
F I G. 29
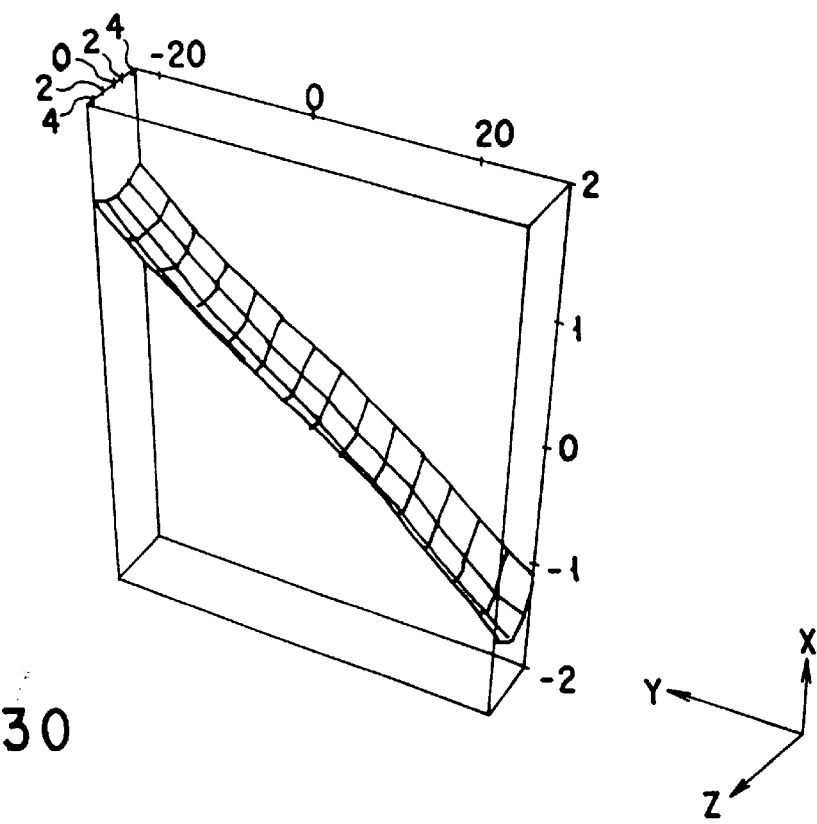
F I G. 30

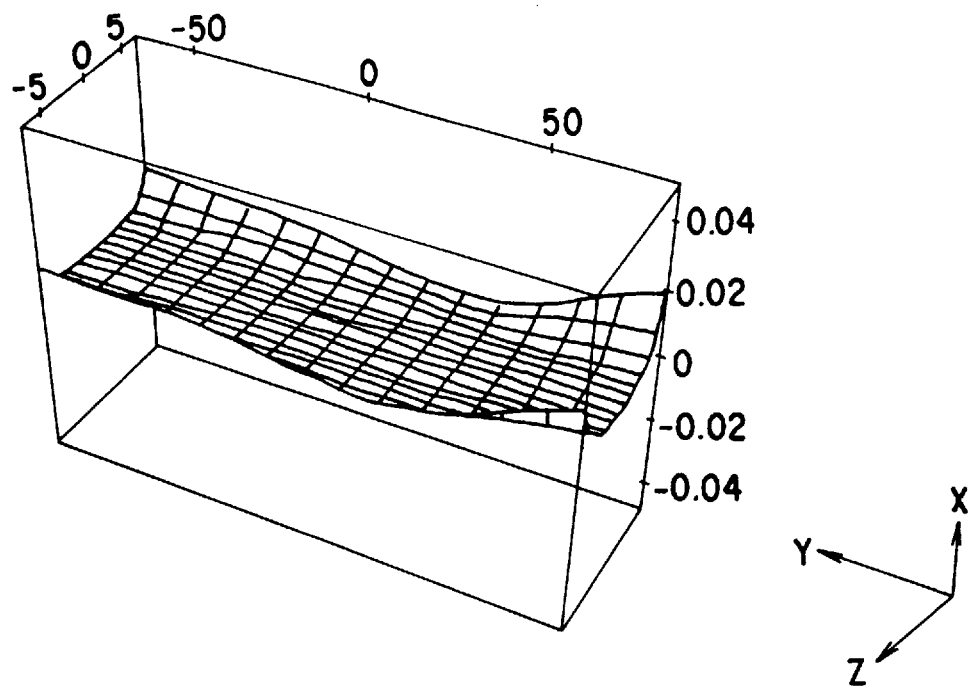
F I G. 37
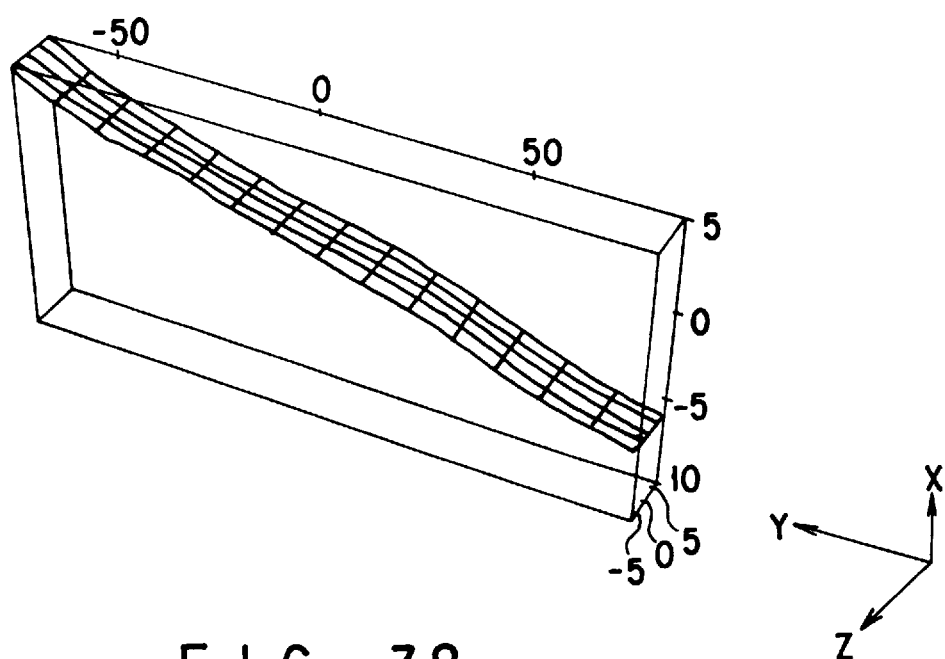
F I G. 38

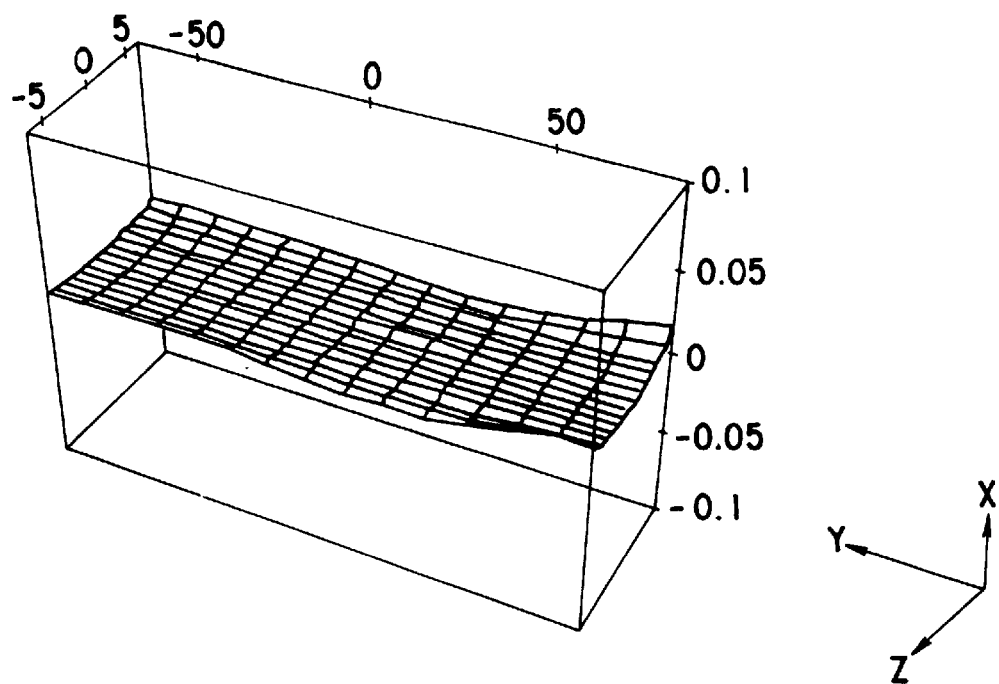
F I G. 45
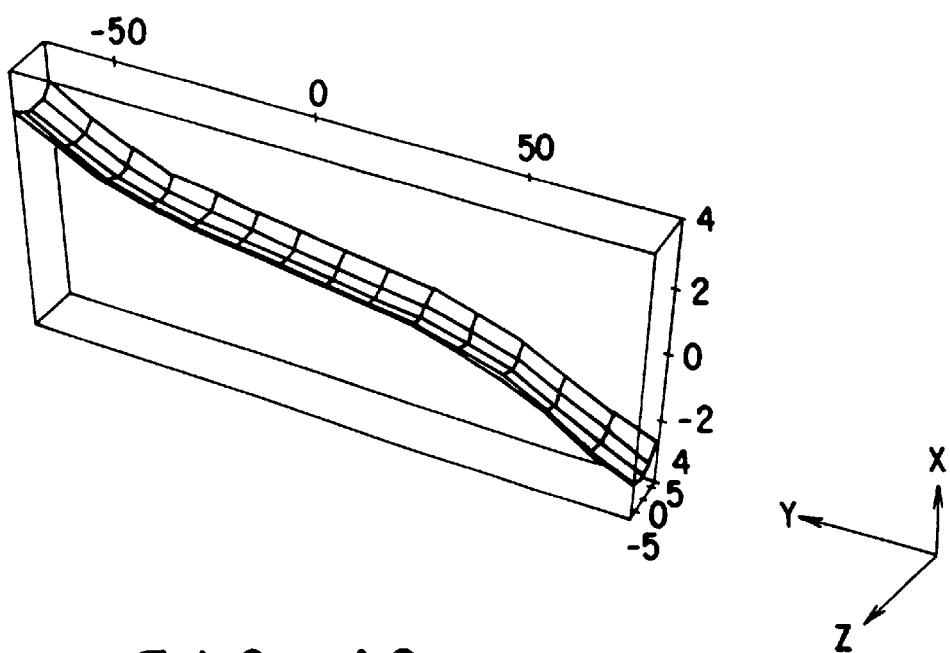
F I G. 46

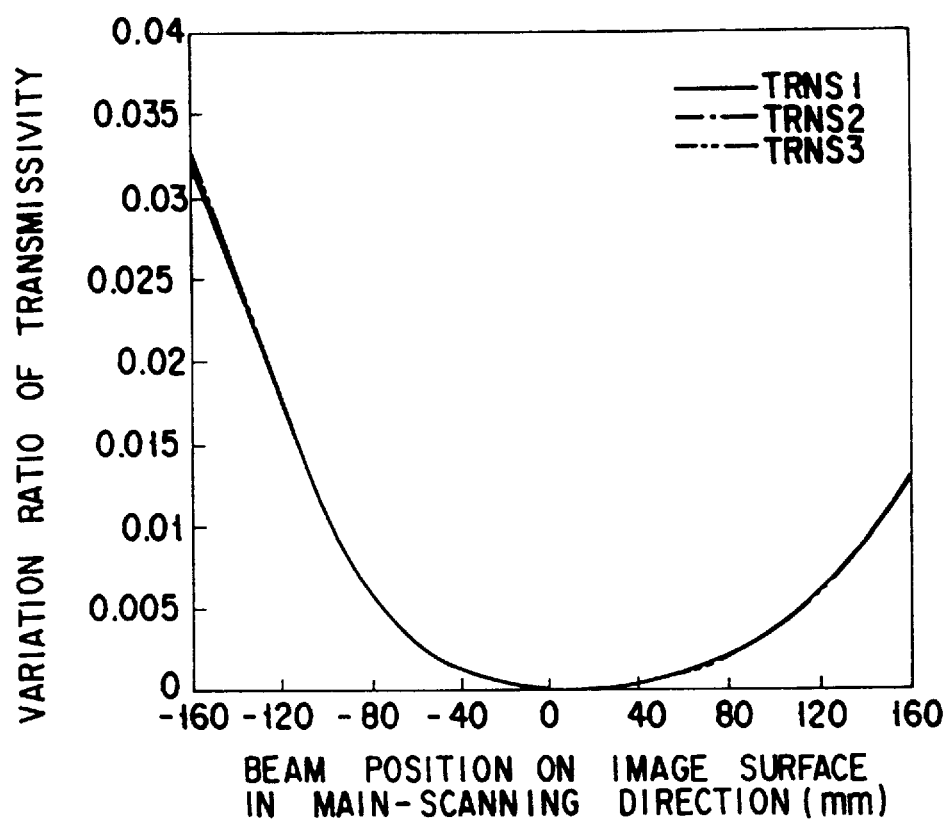
F I G. 64

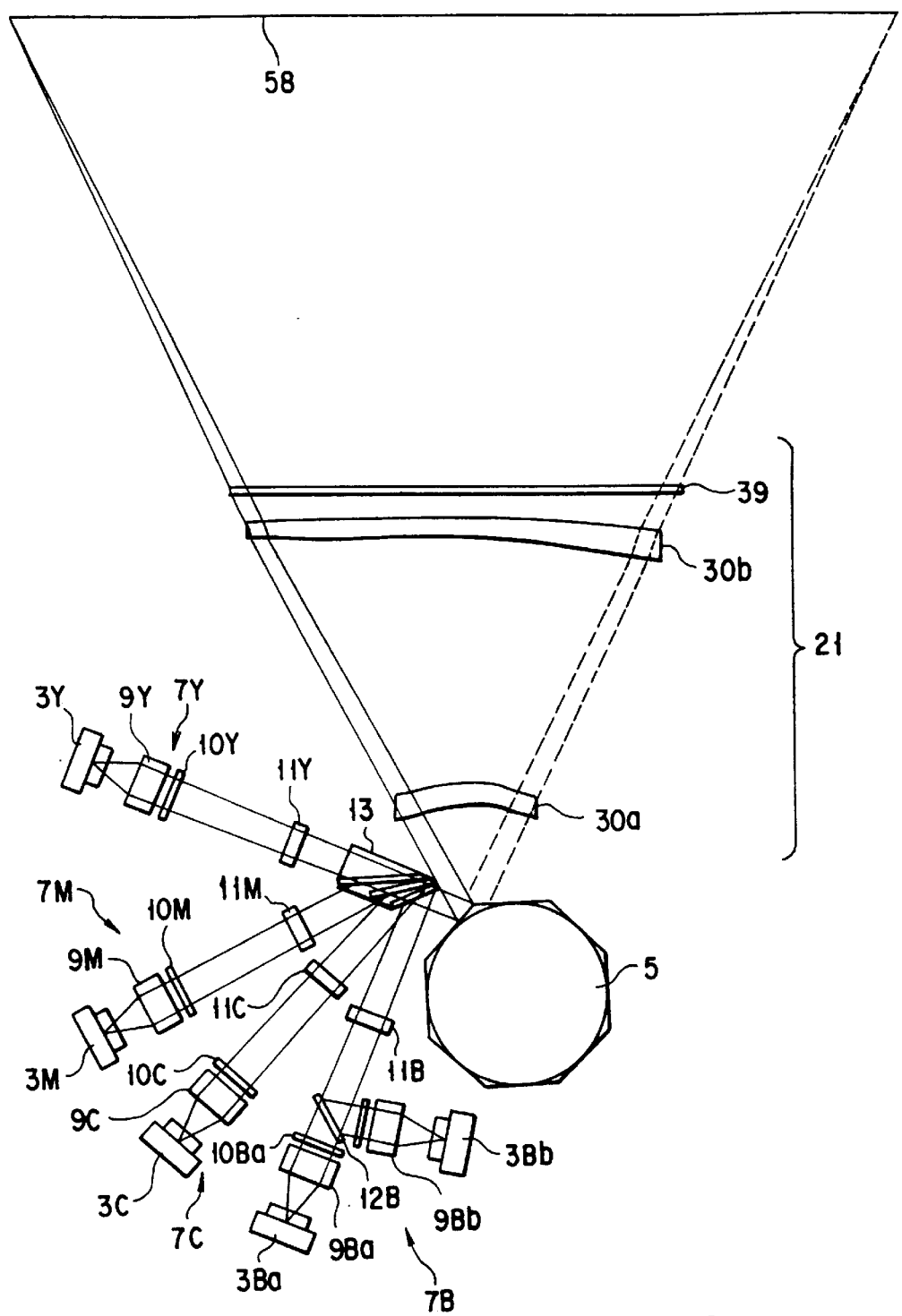
F I G. 66

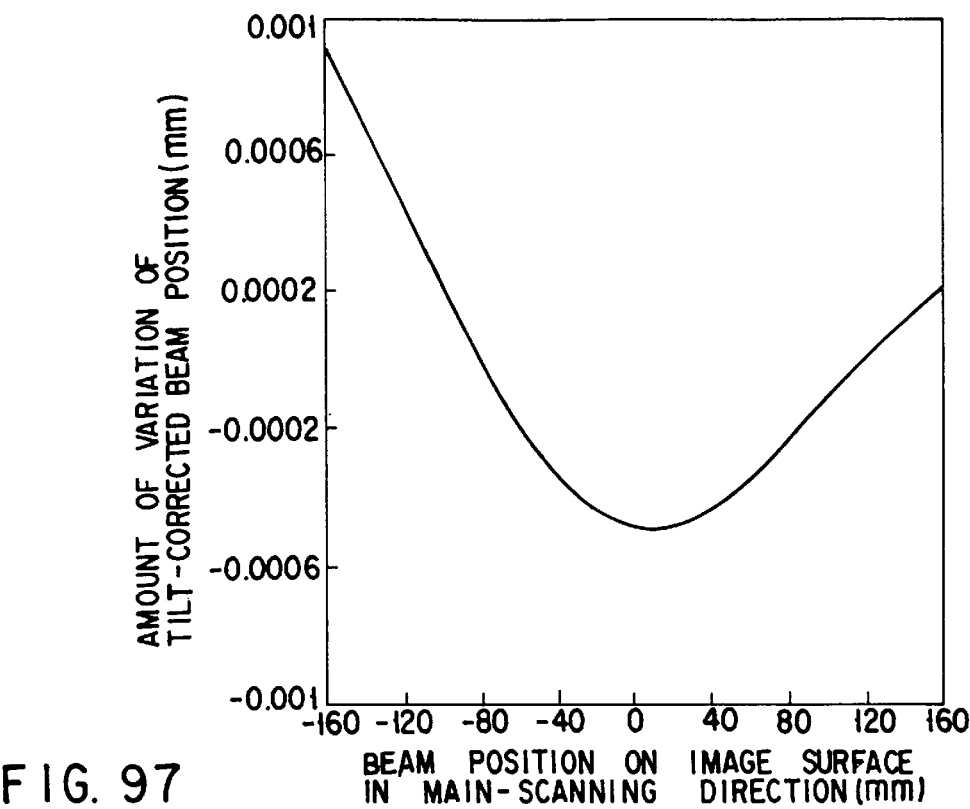
F I G. 97
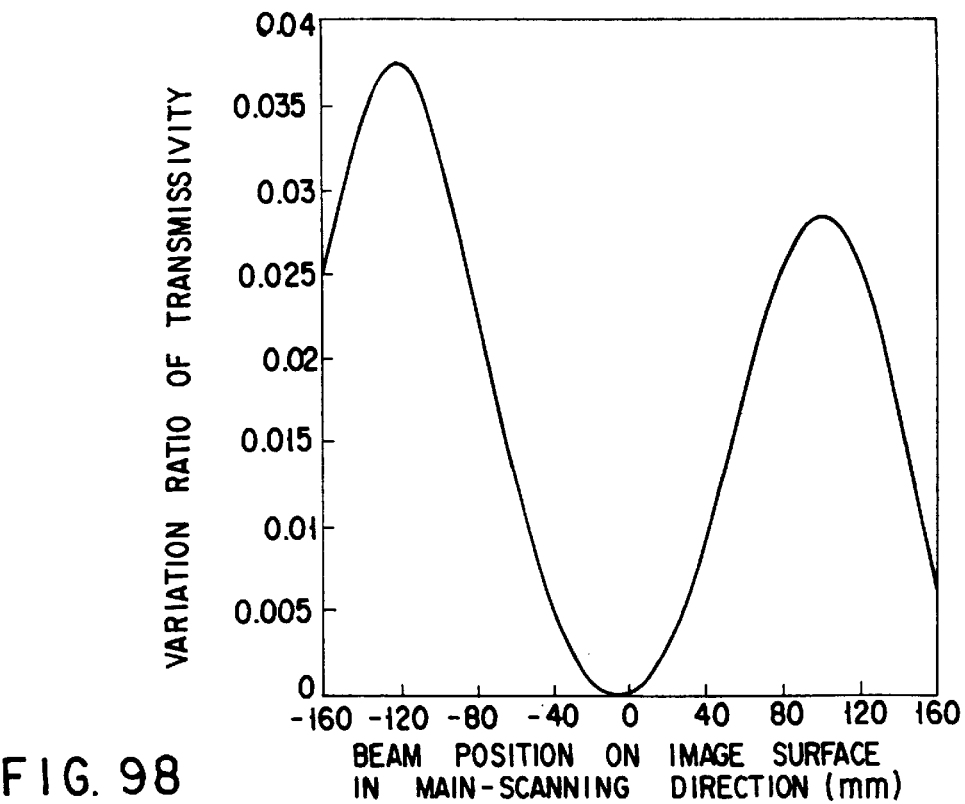
F I G. 98

OPTICAL EXPOSER UNIT

BACKGROUND OF THE INVENTION

1. Field of the Invention

The present invention relates to an optical exposer unit applicable to an image forming apparatus such as a color printer apparatus, a high speed copying machine and a color copying machine.

2. Description of the Related Art

In an image forming apparatus such as a color printer having a plurality of drum or a color copying machine having a plurality of drums, there are used a plurality of image forming sections for forming an image in accordance with color components, which are color-separated, and a laser exposer unit for providing a plurality of image data, i.e., a plurality of laser beams of the respective color components. There has been known an example in which a plurality of laser exposer units are arranged. Also, there has been known an example in which a multi-beam laser exposer unit, which is structured to be able to provide a plurality of laser beams.

The multi-beam laser exposer unit has a semi-conductor laser element, serving as a light source, a first lens group for reducing a diameter of the beam emitted from the laser element to a predetermined size, a beam deflector for continuously deflecting the laser beam whose diameter is reduced by the first lens group in a direction perpendicular to a direction where a recording medium is transferred, and a second lens group for image-forming the laser beam deflected by the deflector onto a predetermined position of the recording medium.

There has been known that the number of rotations of a rotation mirror of the deflector is proportional to resolution, which is needed in the image forming apparatus, and an image forming speed, that is, a process speed. An image frequency is proportional to a square of resolution and proportional to a process speed. Due to this, in order to improve resolution or the process speed, there have been known that the number of rotations of the rotation mirror of the deflector must be increased, and that the image frequency must be sufficiently ensured.

However, if the the number of rotations of the rotation mirror of the deflector is increased, time, which is needed to stabilize the number of the rotations of the rotation mirror, is increased. Due to this, there is a problem in which it takes much time for the image to be actually printed after the input of a print request signal. Also, there is a problem in which the manufacturing cost is largely increased in view of material of a bearing, durability, or accuracy of assembly.

Moreover, by the increase in the number of the rotations of the rotation mirror, damage of the mirror body caused by wind generated when the mirror is rotated is partially increased. Due to this, it is needed that an output of a motor, which is used to rotate the rotation mirror, be improved.

On the other hand, in order to improve the image frequency, a length of a signal line and a line width must be reduced. Also, influence of a parasitic capacitance is acceleratedly increased. Due to this, there occurs a problem in which the manufacturing cost is substantially increased.

Regarding the recording medium, if image data is recorded by use of N number of laser beams, the number of rotations of the rotation mirror and the image frequency are reduced to 1/N, respectively.

For example, Japanese Patent Application KOKAI Publication No. 59-188616 discloses a multi-beam laser exposer unit in which a semiconductor laser, serving as a light source, N sets of a cylinder lens and glass fθ lens group, and N/2 of polygon mirror are used when the number of multi-beams is N.

However, in the above example, from the viewpoint of the single optical exposer unit, the cost of the parts and that of the assembly, the size and weight rise if the number of the lenses or the mirrors are increased.

Moreover, it has been known that the curve of the main-scanning line of the laser beam of each color component, or the deviation of the aberration characteristics on the image forming surface such as a fθ characteristic becomes uneven due to the error of the shape of the fθ lens or the position of the attachment. As a result, a miss-alignment of color components is generated at the time of a color image-forming. The curve of the main-scanning line means that the locus of the laser beam, which is scanned toward the image surface is curved. Also, the unevenness of the fθ characteristic means that the position of the beam on the image surface against the angle θ of the scanned laser beam is shifted.

Due to the curve of the main-scanning line or the unevenness of the fθ characteristic, various disadvantages are generated. For example, overlapped colors to be emitted are not the same as a predetermined color (color shift), or density of the same color is varied. Or, the outline of the image of the overlapped colors is shifted.

Japanese Patent Application KOKAI Publication No. 2-58014 discloses a multi-beam laser exposer unit in which two laser beams are passed through one of two fθ lenses, which are paired, and the other two pairs of lenses are used in each of the laser beams. However, the curve of the main-scanning line or the unevenness of the fθ characteristic cannot be equalized even by the above method. Due to this, overlapped colors to be emitted are not the same as a predetermined color, or density of the same color is varied.

In the examples of Japanese Patent Application KOKAI Publication No. 59-188616 or 2-58014, M number of multi-beams can be passed. However, in a case where each of M number of multi-beams includes Ni (=2 or more), the above-mentioned disadvantages cannot be solved. Therefore, it is needed that the number of rotations of the mirror and the image frequency be increased in order to improve resolution and the process speed.

Japanese Patent Application KOKAI Publication No. 4-50908 discloses the lens in which the curvature of the lens in the sub-scanning direction can be defined regardless of the shape of the main-scanning direction. However, the lens is symmetrical to the surface of the main-scanning direction including the optical axis and that of the sub-scanning direction. Due to this, if the scanning width is made wide, the image is deteriorated. Moreover, since the cross section of the lens of the sub-scanning direction is arc, the beam distance of the sub-scanning direction is not constantly maintained if the plurality of beams are passed through the lens. Furthermore, since transmissivity is largely reduced at the peripheral portion as compared with the central portion, density of the intermediate tone color or that of the color image is easily varied.

Japanese Patent Application KOKAI Publication No. 57-67375 discloses the method for detecting the horizontal synchronization, which is provided by the plurality of beams, by the same detector. However, since each of the beams is guided to the distributor, it is needed that the respective beams be separated with respect to the main-scanning direction. Due to this, there is difficulty in conforming write timing of the image of each beam to each other.

In Japanese Patent Application KOKAI Publication Nos. 59-26005 and 59-26006, the following example is disclosed.

More specifically, when one of the laser elements is emitted and the horizontal synchronization is detected, the emission of the corresponding laser element is stopped and the other laser element is emitted.

However, it is needed that the respective beams be separated with respect to the main-scanning direction. Due to this, there is difficulty in conforming write timing of the image of each beam to each other.

Japanese Patent Application KOKAI Publication No. 64-73369 discloses the example in which the other beam write timing is set based on the horizontal syn signal of one beam. However, there is a problem in which repeatability of timing is changed due to the rise of temperature.

Japanese Patent Application KOKAI Publication No. 61-25366 discloses the example in which laser power, the scanning speed, and the image frequency are controlled based on the signal from resolution changing means. However, this example cannot be applied to the case in which two or more beams are used.

In many color image forming apparatus, there is a tendency that the frequency of which the monochrome image output is increased as compared with the frequency of which the color image is output. Also, as compared with the color image, sharpness of image is much needed in the monochrome image. However, as compared with the optical apparatus, which is used in the laser beam corresponding to the monochrome image, resolution is not much required in the optical apparatus, which is used in the laser beams corresponding to the color image. Therefore, the use of the optical apparatus, which is used in the laser beam corresponding to the monochrome image, increases the manufacturing cost.

SUMMARY OF THE INVENTION

An object of the present invention is to provide an optical exposer unit applicable to the image forming apparatus, which can provide a color image having no color shift at low manufacturing cost.

According to a first aspect of the present invention, there is provided an optical exposer unit comprising:

at least one or more light sources having the sum total of numbers shown $N_1$ to $N_M$ (M=one or more integral number), for respectively emitting light beams;

first lens means for converting each of the light beams emitted from each of the light sources to either a convergent light beam or a parallel light beam, the first lens including one of a finite lens and a collimate lens of the sum total of numbers $N_1$ to $N_M$;

second lens means for providing lens power of a first direction so as to converge the light beam emitted from each of the first lens to only the first direction, and the second lens means prepared to be M pairs;

deflecting means for deflecting the light beam emitted from the second lens means to a second direction perpendicular to the first direction, the deflecting means including a reflection surface formed to be rotatable around a rotation axis extended to be parallel to the first direction; and image forming means, including at least one lens, for image-forming each of the light beams deflected at an equal speed by the deflecting means at a predetermined position, the image forming means for correcting a shift of the image formed position against the predetermined position generated by a tilt of the reflection surface of the deflecting means in the first direction.

According to a second aspect of the present invention, there is provided an optical exposer unit comprising:

at least one or more light sources having the sum total of numbers shown $N_1$ to $N_M$ (M=one or more integral number), for respectively emitting light beams, and at least one of $N_1$ to $N_M$ includes two or more integral number;

first lens means for converting each of the light beams emitted from each of the light sources to either a convergent light beam or a parallel light beam, the first lens including one of a finite lens and a collimate lens of the sum total of numbers $N_1$ to $N_M$;

second lens means for providing lens power of a first direction so as to converge the light beam emitted from each of the first lens to only a first direction, and the second lens means prepared to be M pairs;

deflecting means for deflecting the light beam emitted from the second lens means to a second direction perpendicular to said first direction, the deflecting means including a reflection surface formed to be rotatable around a rotation axis extended to be parallel to the first direction; and image forming means, including at least one lens, for image-forming each of the light beams deflected at an equal speed by the deflecting means at a predetermined position, the image forming means for correcting a shift of the image formed position against the predetermined position generated by a tilt of the reflection surface of the deflecting means in the first direction.

According to a third aspect of the present invention, there is provided an optical exposer unit comprising:

light sources having the sum total of numbers shown $N_1$ to $N_M$ (M=two or more integral number), for respectively emitting light beams;

first lens means for converting each of the light beams emitted from each of the light sources to either a convergent light beam or a parallel light beam, the first lens including one of a finite lens and a collimate lens of the sum total of numbers $N_1$ to $N_M$;

second lens means for providing lens power of a first direction so as to converge the light beam emitted from each of the first lens to only the first direction, and the second lens means prepared to be M pairs;

deflecting means for deflecting the light beam emitted from the second lens means to a second direction perpendicular to the first direction, the deflecting means including a reflection surface formed to be rotatable around a rotation axis extended to be parallel to the first direction; and image forming means, including at least one lens, for image-forming each of the light beams deflected at an equal speed by the deflecting means at a predetermined position, the image forming means for correcting a shift of the image formed position against the predetermined position generated by a tilt of the reflection surface of the deflecting means in the first direction.

According to a fourth aspect of the present invention, there is provided an image forming apparatus comprising:

M number of image carrier members and one optical exposer unit having:

a plurality of light sources having the sum total of numbers shown $N_1$ to $N_M$ (M=one or more integral number);

deflecting means for deflecting the light beam emitted from each of the plurality of the light sources $N_1$ to $N_M$ at a predetermined position of a corresponding image carrier member;

one optical means for providing a predetermined optical characteristic to each of the light beams;

image forming means, including at least one lens, for image-forming each of the light beams deflected at an equal speed by the deflecting means on a predetermined position, the image forming means for correcting a shift of the image formed position against the predetermined position generated by a tilt of the reflection surface of the deflecting means in the first direction; and M number of developing means for supplying developing agent to a latent image formed on each of the image carrier member by the exposer unit so as to form a developed image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a schematic plain view showing the arrangement of the optical members of the optical exposer unit which is incorporated into the image forming apparatus of FIG. 1;

FIG. 3 is a partial cross sectional view of a pre-deflection optical system of the optical exposer unit of FIG. 2 cut along an optical axis of the system between a first optical source and a deflector;

FIG. 4 is a partial cross section view of a pre-deflection optical system of the optical exposer unit of FIG. 2 in a sub-scanning direction to show a state of first to fourth laser beams directing to the deflector;

FIG. 6 is an expanded view of an optical path of a post-deflection optical system, which is expressed in a state that the optical exposer unit of FIG. 2 is cut at a deflection angle of 0° of the deflector and mirrors are removed;

FIG. 14 is a block diagram of an image control section of the image forming apparatus of FIG. 1;

FIG. 18 is a graph showing a differential value between the coordinates of the main-scanning direction and the coordinates of the direction of the optical axis at the cross point between the light scanning surface and the lens surface, in connection with the incident surface of the first lens of the optical exposer unit of FIG. 2;

FIG. 19 is a graph showing a curvature of the main-scanning direction at the cross point between the light scanning surface and the lens surface (that is, the plane, which includes the optical axis of the optical system and is expanded to the main-scanning direction), in connection with the incident surface of the first lens of the optical exposer unit of FIG. 2;

FIG. 20 is a graph showing the offset shape of the incident surface of the first lens of the sub-scanning direction at each point of the lens surface based on the cross point between the light scanning surface and the lens surface (that is, the plane, which includes the optical axis of the optical system and is expanded to the main-scanning direction);

FIG. 29 is a schematic view showing the shift of the shape of the emission surface of the first lens of the sub-scanning direction based on an arc having curvature in a condition that the sub-scanning direction z=0;

FIG. 30 is a schematic view showing an asymmetrical component to the surface expanding to the sub-scanning direction and including the optical axis with respect to the shape of the emission surface of the first lens;

FIG. 37 is a schematic view showing the shift of the shape of the incident surface of the second lens of the sub-scanning direction based on an arc having curvature in a condition that the sub-scanning direction z=0;

FIG. 38 is a schematic view showing an asymmetrical component to the surface expanding to the sub-scanning direction and including the optical axis with respect to the shape of the incident surface of the second lens;

FIG. 45 is a schematic view showing the shift of the shape of the emission surface of the second lens of the sub-scanning direction based on an arc having curvature in a condition that the sub-scanning direction z=0;

FIG. 46 is a schematic view showing an asymmetrical component to the scanning surface expanding to the sub-scanning direction and including the optical axis with respect to the shape of the emission surface of the second lens of the main-scanning direction;

FIG. 64 is a graph showing the variation ratio of transmissivity of each laser beam against the image surface beam position in the main scanning direction on the image surface in connection with each of the laser beams emitted from each of the first laser element for magenta, the first laser element for cyan, the first laser element for black, and the first laser element for yellow;

FIG. 66 is a schematic plane view showing the arrangement of optical members of an optical exposer unit, which is incorporated into the image forming apparatus of FIG. 65;

FIG. 97 is a graph showing the variation of the beam position of the sub-scanning direction on the image surface in a state that the tilts of the deflect surface of the polygon mirror 5 is contained within one minute; and FIG. 98 is a graph showing the variation ratio of transmissivity of each laser beam against the image surface beam position in the main scanning direction on the image surface.

DETAILED DESCRIPTION OF THE PREFERRED EMBODIMENTS

Embodiments of the present invention will be described with reference to the drawings.

Figure 1:
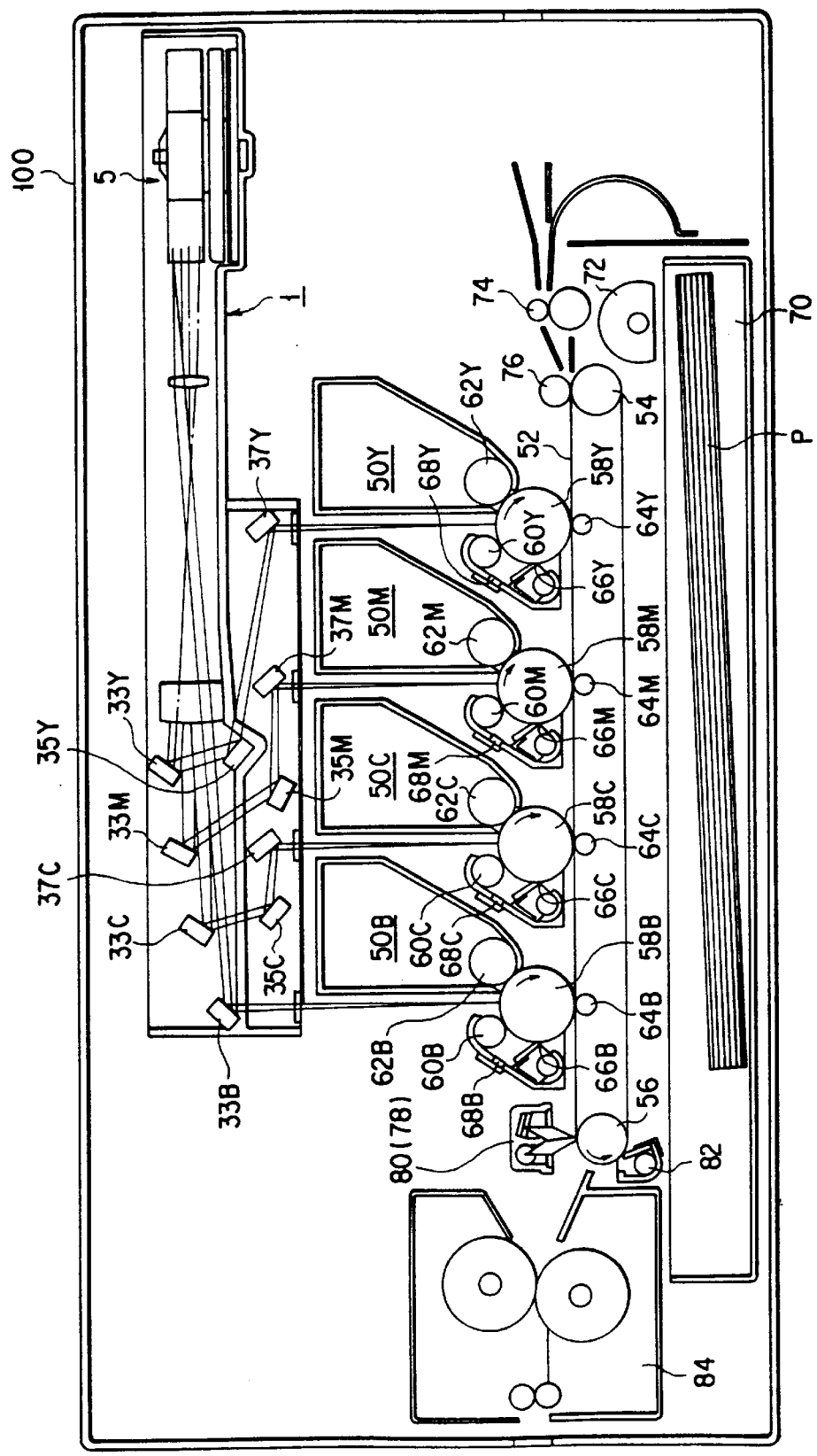
FIG. 1 is a schematic cross sectional view of an image forming apparatus in which an optical exposer unit of an embodiment of the present invention is used.

FIG. 1 is a front cross sectional view of a color image forming apparatus of a quadruple-drum system.

An image forming apparatus 100 has first to fourth image forming units 50Y, 50M, 50C, and 50B for forming an image of each of components, which are color-separated into Y (Yellow), M (Magenta), C (Cyan), and B (Black).

The respective image forming units 50 are provided under a laser exposer unit 1 in series in order of 50Y, 50M, 50C, and 50B so as to correspond to the position where the laser beams LY, LM, LC, LB corresponding to the respective color components are emitted through the respective mirrors 37Y, 37M, 37C, and 33B.

A transfer belt 52 is provided under the respective image forming units 50 to transfer an image formed by the respective image forming units 50Y, 50M, 50C, and 50B.

The transfer belt 52 is stretched onto a belt drive roller 56 and a tension roller 54, and rotated at a predetermined speed in a direction where the belt drive roller 56 is rotated.

The respective image forming units 50Y, 50M, 50C, and 50B include photosensitive members 58Y, 58M, 58C, and 58B. The photosensitive members 58Y, 58M, 58C, and 58B, which are shaped like a cylindrical drum to be rotatable in a direction of an arrow, form an electrostatic latent image corresponding to each image.

There are arranged charge units 60 (Y, M, C, B), developing units 62 (Y, M, C, B), transfer units 64 (Y, M, C, B), cleaners 66 (Y, M, C, B), and discharge units 68 (Y, M, C, B) around the respective photosensitive members 58Y, 58M, 58C, and 58B in order of the rotational direction of the photosensitive members 58 (Y, M, C, B).

Each of the charge units 60 provides a predetermined voltage on the surface of each of the respective photosensitive members 58 (Y, M, C, B).

Each of the developing units 62 develops the electrostatic latent image on the surface of each of the photosensitive members 58 with toner to which the corresponding color is provided.

Each of the transfer units 64 transfers an toner image, which is formed on each of the photosensitive members 58, to a recording medium, which is transferred through the transfer belt 52, in a state that the transfer belt 52 is provided between each of the photosensitive members 58 and each of the transfer units 64 to be opposite to each of the photosensitive members 58.

Each of the cleaners 66 removes the residual toner, which is left on each of the photosensitive members 58 after each toner image is transferred through each of the transfer units 64.

Each of the discharge units 68 removes the residual voltage, which is left on each of the photosensitive members 58 after each toner image is transferred through each of the transfer units 64.

Irradiation of the respective laser beams LY, LM, LC, and LB, which are guided by the respective mirrors 37Y, 37M, 37C, 33B of the laser exposer unit 1, is provided between the respective charge units 60 (Y, M, C, B) and the respective developing units 62 (Y, M, C, B).

A paper cassette 70 is provided under the transfer belt 62 to contain the recording medium for transferring the image formed by each of the image forming units 50 (Y, M, C, B), that is, paper P.

A feeding roller 72 having a semicircular cross section is provided at the position, which is one end portion of the paper cassette 70 and a portion close to the tension roller 54, so as to pick up paper P contained in the paper cassette 70 one by one from the uppermost section.

A resist roller 74 is provided between the feeding roller 72 and the tension roller 54. The resist roller 74 is used to conform the top end of one paper P, which is picked up from the cassette 70, to the top end of each toner image formed on the respective image forming units 50, particularly the toner image formed on the photosensitive member 58B by the image forming unit 50B.

There is provided an absorption roller 74 at a portion between the resist roller 74 and the first image forming unit 50Y, that is, a portion close to the tension roller 54, substantially on an outer periphery of the tension roller 54. The absorption roller 76 provides a predetermined electrostatic absorption. The axis of the absorption roller 76 and the tension roller 54 are arranged to be parallel with each other.

There are provided resist sensors 78 and 80 at a portion, which is end portion of the transfer belt 52, and close to the belt drive roller 56, substantially on an outer periphery of the belt drive roller 56 to have a predetermined distance in an axial direction of the belt drive roller 56. The resist sensors 78 and 80 detect the position of the image formed on the transfer belt 52 (FIG. 1 is the front cross sectional view showing only the back sensor 80).

A transfer belt cleaner 82 is provided on the transfer belt 52 corresponding to the outer periphery of the belt drive roller 56. The transfer belt cleaner 82 removes toner adhered onto the transfer belt 52 or paper dust from paper P.

A fixing unit 84 is provided in a direction where paper P transferred through the transfer belt 52 is detached from the belt drive roller 56 and further transferred. The fixing unit 84 is used to fix the toner image, which is transferred onto the paper P, to paper P.

FIG. 2 is a schematic cross sectional view of a multi-beam laser scanning apparatus, which is used in the image forming apparatus of FIG. 1.

In general, in the color laser beam printer, four are used four kinds of image data, which is color-separated into the respective color components Yellow (Y), Magenta (M), Cyan (C), and Black (B), and various units for forming an image corresponding to each of the image components. Then, image data of the respective color components and the corresponding units are discriminated by the subscripts of Y (Yellow), M (Magenta), C (Cyan), and B (Black).

As shown in FIG. 2, the multi-beam laser exposer unit 1 has a polygon mirror unit 5 (deflecting means). The polygon mirror unit 5 deflects each of the laser beams emitted from each of the laser elements, serving as a light source, to a predetermined position of each of the image surfaces, that is, each of photosensitive drums 58 (Y, M, C, B) of the first to fourth image forming sections 50 (Y, M, C, B) at a predetermined linear speed. In this case, a direction where the laser beam is deflected by each of the reflection surfaces of the polygon mirror 5 is hereinafter called "main-scanning direction."

The polygon mirror 5 has includes a polygon mirror body 5a in which eight-face plane reflectors are arranged in a shape of a regular polygon, and a motor (not shown), which rotates the polygon mirror body 5a to the main-scanning direction at at a predetermined speed.

The polygon mirror body 5a is formed of, for example, aluminum.

Each of the reflection surfaces of the polygon mirror body 5a is cut along the surface including direction where the polygon mirror body 5a is rotated, that is, the surface perpendicular to the main-scanning direction. Thereafter, a surface protection layer of such as $SiO_2$ is deposited on the cut surface.

A post-deflection optical system 21 is provided between the polygon mirror 5 and the image surface in order to provide a predetermined optical characteristic to each of the laser beams deflected to a predetermined direction by each of the reflection surfaces of the polygon mirror 5.

The post-deflection optical system 21 comprises two lenses, first and second lenses 30a and 30b. Each of the laser beam deflected to the predetermined direction by each of the reflection surfaces is guided to a predetermined position of each of the photosensitive drums 58 (Y, M, C, B).

A horizontal synchronization detector 23 is provided at a position where the beam passed through a predetermined position of the second lens 30b of the post-deflection optical system 21 is guided. The above predetermined position corresponds to a position where each of the laser beams L (Y, M, C, B) emitted from the second image forming lens 30b is deflected to a position prior to an image write starting position on the photosensitive drum 58.

A mirror 25 for horizontal synchronization is provided between the post-deflection optical system 21 and the horizontal syn detector 23. The mirror 25 is used to reflect the part of 4×2 synthesized laser beams L (Y, M, C, B), which are passed through at least one of lenses (30a, 30b) included in the post-deflection optical system 21 toward the detector 23 in each of the main-scanning direction and the sub-scanning direction. The following will specifically explain the pre-deflection optical system formed between the laser elements and the polygon mirror 5.

The laser exposer unit 1 includes first to fourth light sources 3Y, 3M, 3C, and 3B (M, M=positive integral number, 4 in this case) including first and second (N1=N2=N3=N4=2) laser elements satisfying Ni (i=positive integral number), for generating the laser beam corresponding to image data, which is color-separated into color components.

The first to fourth light sources 3Y, 3M, 3C, and 3B include first and second yellow lasers 3Ya, 3Yb for emitting laser beams corresponding to yellow images, first and second magenta lasers 3Ma, 3Mb for emitting laser beams corresponding to magenta images, first and second cyan lasers 3Ca, 3Cb for emitting laser beams corresponding to cyan images, and first and second black lasers 3Ba, 3Bb for emitting laser beams corresponding to black images. In this case, first to fourth laser beams, that is, paired LYa and LYb, paired LMa and LMb, paired LCa and LCb, and paired LBa and LBb are emitted from each of the laser elements.

Four pairs of pre-deflection optical systems 7 (Y, M, C, B) are arranged between the respective laser elements 3Ya, 3Ma, 3Ca, 3Ba and the polygon mirror 5, in order to provide a predetermined shape of a cross section beam spot of each of the laser beams LYa, LMa, LCa and LBa emitted from each of the light sources 3Ya, 3Ma, 3Ca, and 3Ba.

The following will explain the pre-deflection optical system 7 (Y) in which the laser beam LYa directing to the polygon mirror 5 from the first yellow laser 3Ya is shown as a typical example.

A predetermined convergence is provided to the dispersive laser beam emitted from the first yellow laser 3Ya by a finite focus lens 9Ya. Thereafter, the cross section beam is formed to be a predetermined shape by a diaphragm 10Ya. A predetermined convergence is further provided to the laser beam LYa, which is passed through the diaphragm 10Ya, in only the sub-scanning direction through a hybrid cylinder lens 11Y so as to be guided to the polygon mirror 5.

A half mirror 12Y is provided between the finite focus lens 9Ya and the hybrid cylinder lens 11Y to have a predetermined angle against the optical axis.

A laser beam LYb emitted from the second yellow laser 3Yb is made incident onto the surface opposite to the surface on which the laser beam LYa is made incident to have a predetermined beam distance between the laser beams LYa and LYb in the sub-scanning direction. A finite focus lens 9Yb for providing a predetermined convergence to the laser beam LYb emitted from the second laser 3Yb, and a diaphragm 10Yb are arranged between the second yellow laser 3Yb and the half mirror 12Y.

Each of the laser beams LYa and LYb, which have the predetermined beam distance therebetween in the sub-scanning direction and which are synthesized into substantially one laser beam, is passed through a laser synthesizing mirror unit 13 (to be described with reference to FIGS. 8A and 8B), and guided to the polygon mirror 5.

Regarding the pre-deflection optical system 7M (magenta), a finite focus lens 9Ma, a diaphragm 10Ma, a hybrid cylinder lens 11M, a half mirror 12M, a second magenta laser 3Mb, a finite focus lens 9Mb, and a diaphragm 10Mb are arranged at the respective predetermined positions between the first magenta laser 3Ma and the laser synthesizing mirror unit 13. The finite focus lens 9Mb and the diaphram 10Mb are positioned between the second magenta laser 3Mb and the half mirror 12M. Similarly, regarding the pre-deflection optical system 7C (cyan), a finite focus lens 9Ca, a diaphragm 10Ca, a hybrid cylinder lens 11C, a half mirror 12C, a second magenta laser 3Cb, a finite focus lens 9Cb, and a diaphragm 10Cb are arranged at the respective predetermined positions between the first cyan laser 3Ca and the laser synthesizing mirror unit 13. Moreover, similarly, regarding the pre-deflection optical system 7B (black), a finite focus lens 9Ba, a diaphragm 10Ba, a hybrid cylinder lens 11B, a half mirror 12B, a second magenta laser 3Bb, a finite focus lens 9Bb, and a diaphragm 10Bb are arranged at the respective predetermined positions between the first black laser 3Ba and the laser synthesizing mirror unit 13.

The light sources 3 (Y, M, C, B), the pre-deflection optical system 7 (Y, M, C, B), and the laser synthesizing mirror unit 13 are integrally held by a holding member 15, which is formed of an aluminum alloy.

As finite focus lenses 9 (Y, M, C, B)a, and (Y, M, C, B)b, a single lens, which is formed by adhering an UV (ultraviolet) light-curing plastic aspherical portion (not shown) to the aspherical glass lens or the spherical lens, is used.

FIG. 3 relates to an optical path formed between the half mirror 12 of the pre-deflection optical system 7 and the reflection surface of the polygon mirror 5. FIG. 3 is a partial cross sectional view showing the optical path seeing from the sub-scanning direction in a state that the reflection mirror 25 is omitted. In FIG. 3, only the optical parts corresponding to one laser beam LY (LYa) is shown as a typical example.

The hybrid cylinder lens 11 (Y) is formed of cylinder lens 17 (Y) of PMMA (polymethyl methacrylate) and glass-made cylinder lens 19 (Y), both which have substantially the same curvature in the sub-scanning direction. The cylinder lens 17 (Y) of PMMA is formed such that its surface contacting air is substantially flat.

Also, the hybrid cylinder lens 11 (Y) may be formed as follows.

More specifically, the cylinder lens 17 (Y) and the cylinder lens 19 (Y) are integrally formed by adhering the emission surface of the cylinder lens 17 (Y) to the incident surface of the cylinder lens 19 (Y), or pressing these surfaces to a positioning member (not shown) from a predetermined direction.

The hybrid cylinder lens 11 (Y) may be formed by molding the cylinder lens 17 (Y) on the incident surface of the cylinder lens 19 (Y) as one unit.

The plastic cylinder lens 17 (Y) is formed of material such as RMMA (polymethyl methacrylate). The glass cylinder lens 19 (Y) is formed of material such as TaSF 21.

Each of the cylinder lenses 17 (Y) and 19 (Y) is fixed to the finite focus lens 9 to have a correct distance therebetween by the positioning section, which is formed to be integral with the holding member 15.

Table 1 shows optical numeric data of the pre-deflection optical system 7.

TABLE 1

Lens Data of Pre-deflection Optical System

| Unit of Angle: | radian | Radius of Reflection Surface of Optical Deflector | 33 |
| Reflection Angle | .479 | Center of Rotation of Reflection Surface of Optical | |
| Separation Angle | .698 | Deflector | (26.31, 20.01) | a) For Yellow, Black

| curvature | | thickness | material | others |
|---|---|---|---|---|
| main-scanning | sub-scanning | 11.882 | air | f = 11.55, NA = 0.33 |
| — | — | 52.331 | air | |
| eccentricity of main beam | | | | beam b: inverse sign |
| incident onto cylinder lens 17 | −3.567E-4 | | | |
| inclination of main beam | | | | |
| incident onto cylinder lens 17 | −8.436E-5 | | | |

TABLE 1-continued

| | | | | |
|---|---|---|---|---|
| plane | plane | 0.1 | PMMA | |
| plane | 2.711E-2 | 5 | glass | n = 1.922 |
| plane | plane | 65.879 | air | |
| shift from optical axis at reflecting surface of optical deflector | | | | −3.344 |
| inclination from optical axis at reflecting surface of optical deflector | | | | 2.828E-2 | b) For Magenta

| curvature | | thickness | material | others |
|---|---|---|---|---|
| main-scanning | sub-scanning | 11.882 | air | f = 11.55, NA = 0.33 |
| — | — | 56.664 | air | |
| eccentricity of main beam incident onto cylinder lens 17 −3.567E-4 | | | | beam b: inverse sign |
| inclination of main beam incident onto cylinder lens 17 −8.436E-5 | | | | |
| plane | plane | 0.1 | PMMA | |
| plane | 2.711E-2 | 5 | glass | n = 1.922 |
| plane | plane | 65.802 | air | |
| shift from optical axis at reflecting surface of optical deflector | | | | −1.562 |
| inclination from optical axis at reflecting surface of optical deflector | | | | 1.213E-2 | c) For Cyan

| curvature | | thickness | material | others |
|---|---|---|---|---|
| main-scanning | sub-scanning | 11.882 | air | f = 11.55, NA = 0.33 |
| — | — | 57.728 | air | |
| eccentricity of main beam indicdent onto cylinder lens 17 −4.448E-3 | | | | beam b: inverse sign |
| inclination of main beam incident onto cylinder lens 17 −9.950E-5 | | | | |
| plane | plane | 0.1 | PMMA | |
| plane | 2.711E-2 | 5 | glass | n = 1.922 |
| plane | plane | 65.790 | air | |
| shift from optical axis at reflecting surface of optical deflector | | | | −1.562 |
| inclination from optical axis at reflecting surface of optical deflector | | | | 3.877E-3 |

As is obvious from Table 1, regarding the finite focus lenses 9 and the hybrid cylinder lenses 11, the same lens can be used in any color components. The pre-deflection optical system 7Y corresponding to yellow, and the pre-deflection optical system 7B corresponding to black have substantially the same lens arrangement. Moreover, in the pre-deflection optical system 7M corresponding to magenta, and the pre-deflection optical system 7C corresponding to cyan, the distance between the finite focus lens 9 and the hybrid cylinder lens 11 is made wider than the case of the pre-deflection optical systems 7Y and 7B.

FIG. 4 shows the laser beams LM, LC, LB, which are reflected by the reflection mirrors 13M, 13C, 13B of the laser synthesizing mirror and directed to the respective reflection surfaces of the polygon mirror 5, and LY, which is directed to the respective reflection surfaces of the polygon mirror 5 without being reflected by the reflection mirror in a state that the respective beams are passed through the respective pre-deflection optical systems 7 (Y, M, C, B) and separated to have a predetermined distance in a direction (sub-scanning direction) parallel to the rotation axis of the respective surfaces of the polygon mirror 5 (LY has LYa and LYb, LM has LMa and LMb, and LC has LCa and LCb).

As is obvious from FIG. 4, the respective laser beams LY, LM, LC, and LB are guided to the polygon mirror 5 in the direction parallel to the rotation axis of the reflection mirror of the polygon mirror 5 to have a different distance. Also, the laser beams LM and LC are asymmetrically guided to the respective reflection surfaces of the polygon mirror 5 to sandwich the surface, which is parallel to the rotation axis of the reflection surface of the polygon mirror and includes the center of the reflection surface in the sub-scanning direction, that is, the surface, which includes the optical axis. The distance between the respective laser beams on the respective reflection surfaces of the polygon mirror 5 is as follows.

More specifically, the distance between LY and LM: 3.20 mm, the distance between LM and LC: 2.70 mm, and the distance between LC and LB: 2.30 mm.

Figure 5:
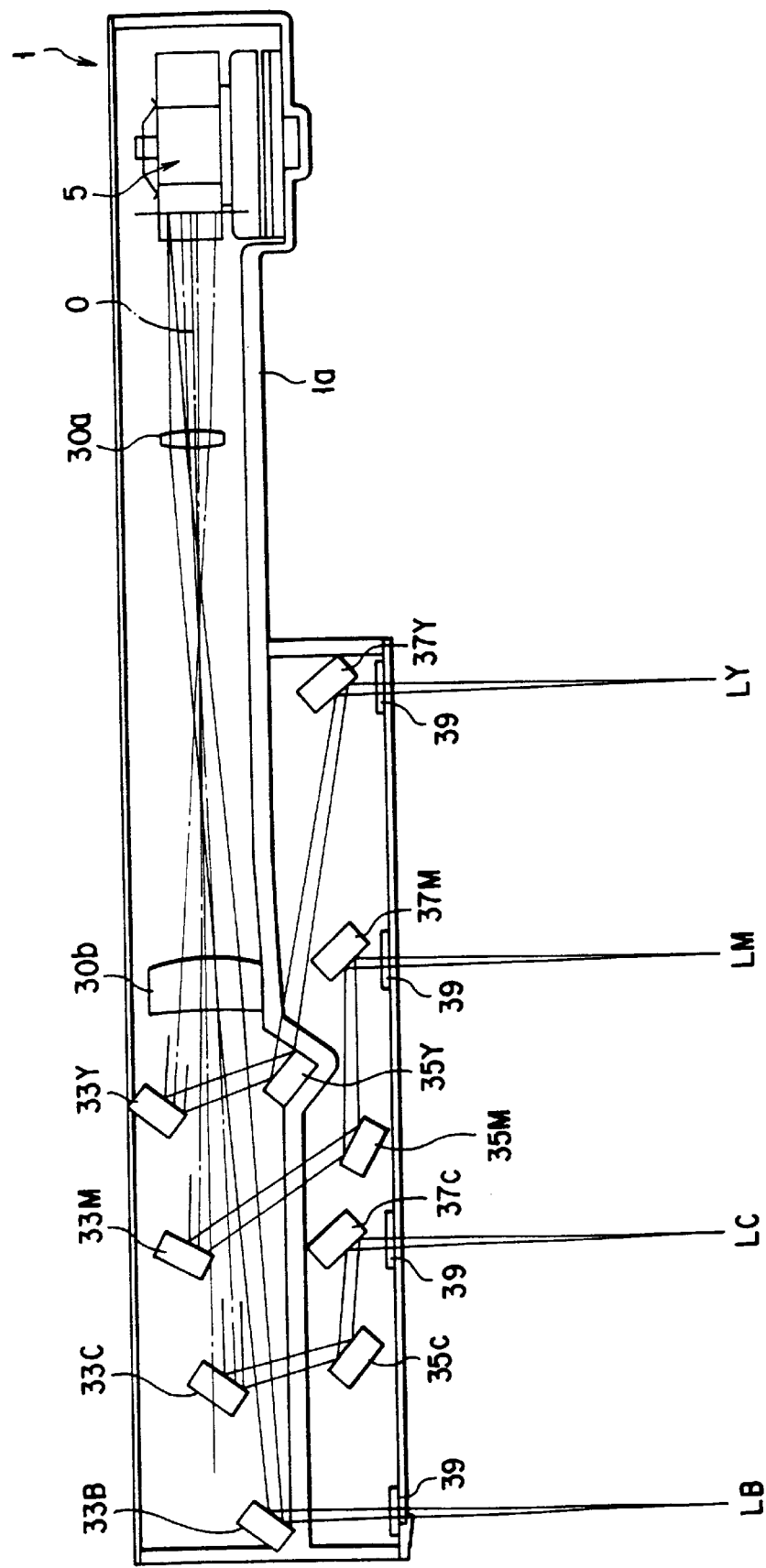
FIG. 5 is a schematic cross section of the optical exposer unit of FIG. 2 cut at a deflection angle of 0° of the deflector.

FIG. 5 relates to the optical members arranged between the polygon mirror 5 and each photosensitive drum 58, that is, image surface. FIG. 5 shows a state in the sub-scanning direction at the position where the deflection angle of the polygon mirror 5 is 0°.

As shown in FIG. 5, between the second image forming lens 30b of the post-deflection optical system and the image surface, there are arranged first mirrors 33 (Y, M, C, B), which bend 2×8 laser beams L (Y, M, C, B) passed through the lens 30b, second and third mirrors 35 (Y, M and C), and 37 (Y, M and C), which further bend the laser beams L (Y, M and C) bent by the first mirrors 33. As is obvious from FIG. 5, the laser beam LB corresponding to B image (black image) is bent by the first mirror 33B, and guided to the image surface without reflected by the other mirrors.

The first and second image forming lenses 30a and 30b, the first mirrors 33 (Y, M, C, B), and the second mirrors 35 (Y, M and C) are fixed to fixing members (not shown), which are integrally formed in an intermediate base 1a of the laser exposer unit 1, with adhesive.

Also, the third mirrors 37 (Y, M and C) are arranged to be movable to at least one direction with respect to the direction perpendicular to the mirror surface through a fixing rib and an inclination adjusting mechanism (to be described later with reference to FIG. 10).

At a portion among the third mirrors 37 (Y, M and C), the first mirror 33B and the image surface, and a position where eight (2×4) laser beams L (Y, M, C, B) reflected on the mirrors 33B, 37Y, 37M, and 37C are output from the laser exposer unit 1, there are arranged dust-proof glasses 39 (Y, M, C, B) for preventing dust from being entered the inferior of the laser exposer unit 1.

The following will specifically explain the optical characteristic provided between the hybrid cylinder lens 11 and the post-deflection optical system 21.

Regarding the post-deflection optical system 21, that is, the first and second image forming lenses 30*a* and 30*b*, these lenses are formed of plastic such as PMMA. Due to this, for example, it is known that a refractive index n is varied from 1.4876 to 1.4789 when the peripheral temperature is varied between 0° to 50° C. In this case, the image forming position of the sub-scanning direction is varied about ±12 mm when the laser beam, which is passed through the first and second image forming lenses 30*a* and 30*b*, is actually condensed on the image forming surface.

In order to reduce the above variation, the lenses having the same material as lenses used in the post-deflection optical system 21 are incorporated into the pre-deflection optical system 7 in a state that the curvature is suitably set. Thereby, the variation of the image forming position, which is caused by the change of the refractive index n due to the temperature change, can be reduced to about ±0.5 mm. Due to this, as compared with the conventional optical system in which the pre-deflection optical system 7 is formed of glass lenses and the post-deflection optical system 21 is formed of plastic lenses, it is possible to correct the color aberration of the sub-scanning direction, which is caused by the variation of the refractive index due to the temperature change of the lenses of the post-deflection optical system 21.

FIG. 6 is a view of the optical path to show the relationship between the first to fourth synthesized laser beams L (Y, M, C, B), which are passed through the portion between the polygon mirror 5 and the image surface, and the optical axis of the system of the optical exposer unit 1 in the sub-scanning direction.

As shown in FIG. 6, the first to fourth synthesized laser beams L (Y, M, C, B), which are reflected by the reflection surface of the polygon mirror 5, cross the optical axis in the sub-scanning direction at the portion between the first image forming lens 30*a* and the second image form lens 30*b*, and are guided to the image surface.

Figure 7:
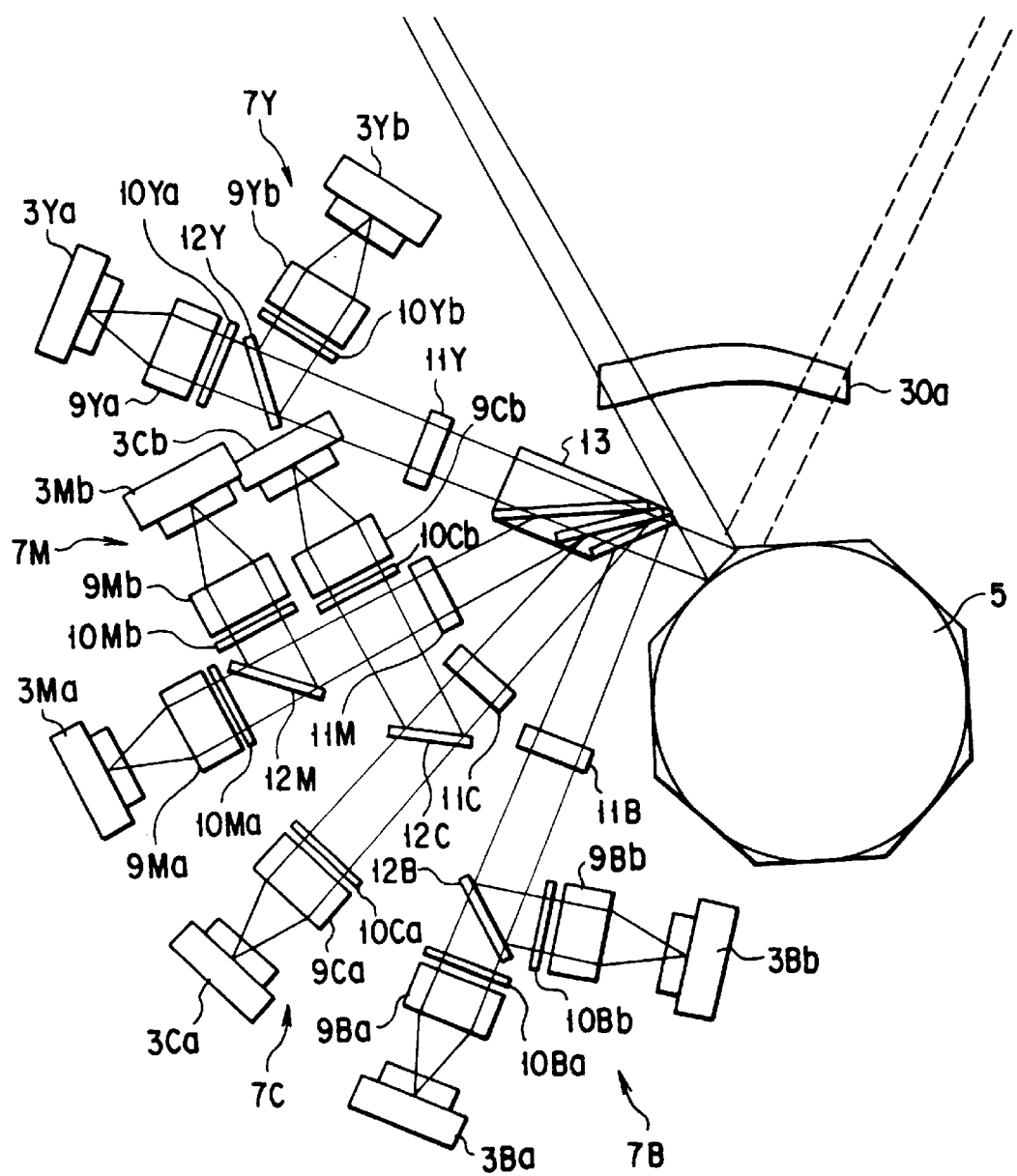
FIG. 7 is a schematic plain view showing a state that the respective optical members of the pre-deflection optical system of the optical exposer unit of FIG. 2 are arranged.

FIG. 7 shows the details of the arrangement of the laser elements used in the pre-deflection optical optical system of FIG. 2.

As already explained in FIG. 2, the first to fourth light sources 3 (Y, M, C, B) have a pair of the first and second yellow lasers 3Ya and 3Yb, a pair of the first and second magenta lasers 3Ma and 3Mb, a pair of the first and second cyan lasers 3Ca and 3Cb, and a pair of the first and second black lasers 3Ba and 3Bb. These lasers are arranged to have a predetermined distance corresponding to the beam distance between the respective lasers and the image surface in the sub-scanning direction. The respective laser beams paired to correspond to the respective color components are arranged to be four-layered in a state seeing from the sub-scanning direction.

Figure 8A:
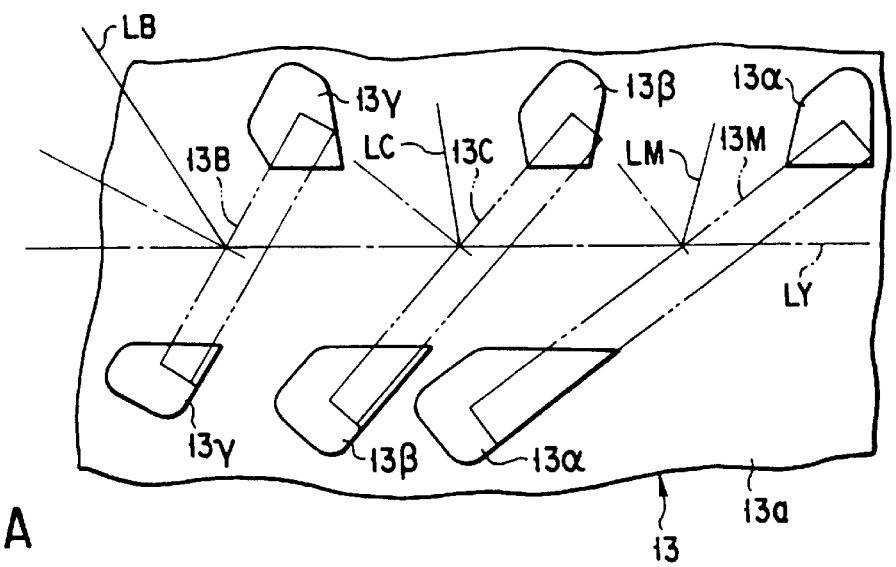
FIGS. 8A and 8B are a plain view and a side view each showing a laser synthetic mirror unit of the optical exposer unit of FIG. 2.
Figure 8B:
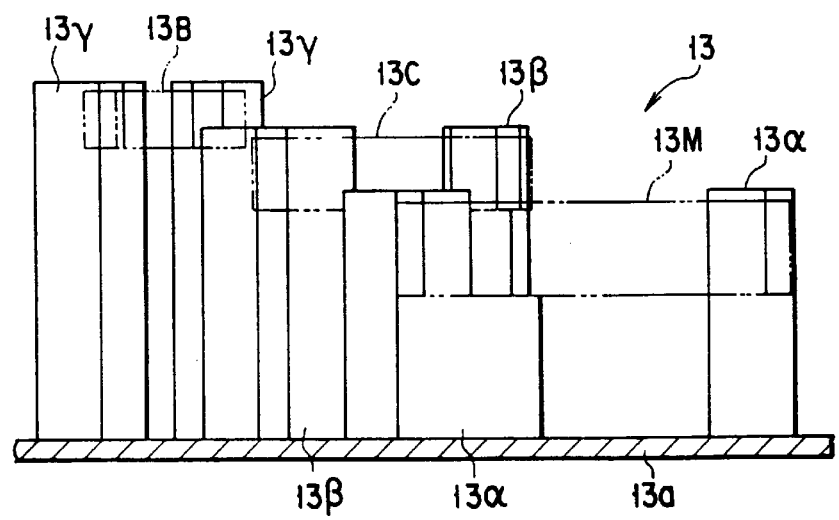

FIGS. 8A and 8B show the laser synthesizing mirror unit 13 for guiding eight (2×4) laser beams, that is, the first to fourth laser beams L (Y, M, C, B), serving as one flux of the laser beam, to the respective reflection surfaces of the polygon mirror unit 5.

More specifically, the laser synthesizing mirror unit 13 comprises first to third mirrors 13M, 13C, 13B whose number is smaller than the number of image formable color components by one, first to third mirror holding sections 13α, 13β, 13γ, and a base 13*a* for supporting the mirror holding sections 13α, 13β, 13γ. The base 13*a* and the mirror holding sections 13α, 13β, 13γ are integrally formed of, for example, an aluminum alloy, and have low coefficient of thermal expansion, respectively.

As already explained, the laser beams LY emitted from the first and second yellow lasers 3Ya and 3Yb are directly guided to the respective reflection surfaces of the polygon mirror 5. In this case, the laser beams LY are passed through the base 13*a* side rather than the optical axis, that is, the portion between the mirror 13M fixed to the first holding section 13α and the base 13*a*.

The following will explain intensity (amount of light) of the respective laser beams LM, LC, LB, which are reflected by the respective mirrors 13M, 13C, 13B to be guided to the polygon mirror 5, and that of the the laser beams LY directly guided to the polygon mirror 5.

According to the laser synthesizing mirror unit 13 of FIGS. 8A and 8B, the laser beams LM, LC, and LB are bent by the normal mirrors (13M, 13C, 13B) at an area where the respective laser beams LM, LC LB are separated in the sub-scanning direction before being made incident onto the respective reflection surfaces. Therefore, the amount of light of each of the laser beams L (M, C, B), which are reflected by the respective reflection surfaces (13M, 13C, 13B) to be supplied to the polygon mirror body 5*a*, can be maintained to be about 90% or more of the amount of the beams emitted light from the finite focal lens 9. Whereby, the output of each laser can be reduced. Also, since aberration of the beams, which is caused by the inclined parallel plate, is not generated, aberration of the beams reaching the image surface can be equally corrected, thereby making it possible to reduce the beam spot and lead to high precision.

It is noted that the laser beams LY emitted from the laser element 3Y corresponding to Y (yellow) is directly guided to the respective reflection surfaces of the polygon mirror 5 regardless of any mirrors 13. Due to this, the output capacitance of the laser can be reduced, and there can be removed the error of the incident angle onto the reflection surfaces of the polygon mirror 5*a*, which is caused when the other laser beams are reflected by the mirrors 13.

With reference to FIGS. 2 and 5, the following will explain the relationship among the laser beams L (Y, M, C, B), which are reflected by the polygon mirror body 5*a*, the inclination of the respective laser beams L (Y, M, C, B), which are passed through the post-deflection optical system 21 and emitted to the exterior of the optical exposer unit 1, and mirrors 33B, 37Y, 37M, 37C.

As explained above, the respective laser beams L (Y, M, C, B) to which the predetermined aberration characteristics are provided through the first and second lenses 30*a* and 30*b* after being reflected by the polygon mirror body 5*a*, are bent in a predetermined direction through the first mirrors 33 (Y, M, C, B).

At this time, the laser beam LB is reflected by the first mirror 33B, and passed through the dustproof glass 39B to be guided to the photosensitive member 58. The other laser beams L (Y, M and C) are guided to the second mirrors 35 (Y, M and C), respectively, and reflected toward the third mirrors 37 (Y, M and C) by the second mirrors 35 (Y, M and C). Further, the respective laser beams L (Y, M and C) are reflected by the third mirrors 37 (Y, M and C). Thereafter, the respective laser beams are image-formed on the photosensitive member 58 to have substantially an equal interval through the dustproof glasses 38 (Y, M and C). In this case, the laser beam LB emitted from the mirror 33B and the laser beam LC adjacent to the laser beam LB are also image-formed on the photosensitive member 58 to have substantially an equal interval.

After the laser beam LB is reflected by only the polygon mirror body 5a and the mirror 33B, and guided to the photosensitive drum 58. In other words, the laser beam LB, which is guided by substantially only one mirror 33B, can be can be ensured.

In a case where a plurality of mirrors is presented in the optical path, the laser beam LB is useful as a reference beam of light in relatively correcting the other laser beams in connection with the variation of the aberration characteristics of the image-formed surface a position error of a line of the main-scanning direction and inclination of the line, which is increased (multiplied) in accordance with the number of the mirrors, and the tilt of the main-scanning direction.

In the case where the plurality of mirrors is presented in the optical path, the number of the mirrors relating to the respective laser beams after deflection is preferably set to be an odd number or an even number. In other words, as shown in FIG. 5, the number of the mirrors after deflection relating to the laser beam LB is one (odd number) excepting the polygon mirror body 5a of the polygon mirror 5, and the number of the mirrors relating to each of the laser beams LC, LM, and LY is three (odd number). It is assumed that the second mirror 35 relating to any one of the laser beams is omitted. The direction of the curve of the main-scanning line, which is caused by the inclination of the lens of the laser beam (even number) passing through the optical path where the second mirror 35 is omitted, is opposite to the direction of the curve of the main-scanning line, which is caused by the inclination of the other laser beams (odd number). As a result, there occurs the problem of the color shift in which the overlapped colors to be emitted are not the same as a predetermined color to be reproduced.

Therefore, the number of the mirrors provided in the optical path of each of the laser beams L (Y, M, C, B) is set to be substantially the odd or even number in overlapping eight (4×2) laser beams L (Y, M, C, B) to reproduce a predetermined color.

Figure 9:
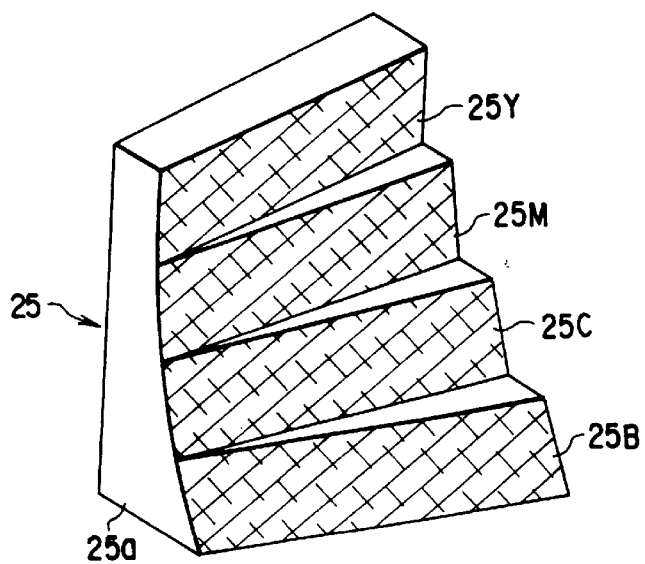
FIG. 9 is a schematic perspective view showing a reflection mirror for an SYNC of horizontal detection of the optical exposer unit of FIG. 2.

FIG. 9 specifically shows a mirror for a horizontal syn for guiding the respective beams L (Y, M, C, B), which are passed through the optical path of FIG. 2 and deflected to the only one horizontal synchronization detector 23, by only one mirror unit 25.

According to FIG. 9, the mirror 25 has first to fourth mirror surfaces 25Y, 25M, 25C, and 25B, and a mirror block 25a. The first to fourth mirror surfaces 25Y, 25M, 25C, and 25B are formed at a different angle to both the main-scanning direction and the sub-scanning direction in order to reflect the respective laser beams L (Y, M, C, B) in the main-scanning direction to reach the detector 23 at a different timing, and to provide substantially the same level (height) on the detector 23 in the sub-scanning direction. The mirror block 25a holds the mirror surfaces 25Y, 25M, 25C, and 25B as one unit.

The mirror block 25a is formed of, for example, polycarbonate containing glass. The respective mirror surfaces 25Y, 25M, 25C, and 25B of the mirror block 25a are formed to be as one unit at a predetermined angle. Or, metallic material such as aluminum is deposited on portions cut from the mirror block 25a. The mirror surfaces are shaped to be removed from the mold without providing an under-cut at the portions corresponding to the mirror surfaces.

As mentioned above, the respective laser beams LY, LM, LC and LB, which are deflected by the polygon mirror 5, can be made incident onto one detector 23. In addition, there can be solved the problem of sensitivity of each detector and the shift of the horizontal syn signal, which are caused in the unit having the plurality of detectors. It is needless to say that the laser beams are made incident onto the detector 23 eight times per one line of the main-scanning direction by use of the mirror block 25.

Figure 10:
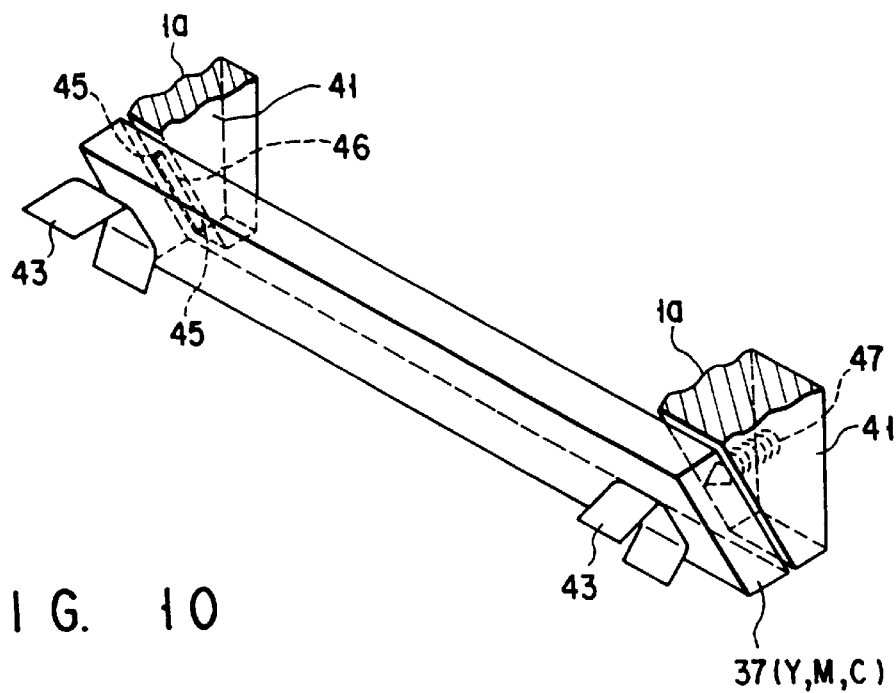
FIG. 10 is a schematic perspective view showing an adjusting mechanism of an emission mirror of the optical exposer unit of FIG. 1.

FIG. 10 is a schematic perspective view showing a support mechanism of the third mirrors 37 (Y, M, C).

In FIG. 10, each of the third mirrors 37 (Y, M, C) is supported at a predetermined position of the intermediate base 1a of the laser exposer unit 1 by each of fixing sections 41 (Y, M, C), which are formed to be integral with the intermediate base 1a, and each of mirror holding plate springs 43 (Y, M, C), which are opposite to the fixing sections 41 to sandwich the corresponding mirror.

The fixing sections 41 (Y, M, C) are formed to be paired with each other at both end portions in the longitudinal direction of each of the mirrors (Y, M, C). On one of the pair of the fixing sections 41, there are formed two projections 45 for holding the mirrors 37 at two points. As shown by a dotted line of FIG. 10, ribs 46 may be used instead of two projections 45. On the other pair of the fixing sections 41, there are provided setscrew 47 to movably support the mirrors by the projections along the optical axis.

The setscrew 47 move back and forth, thereby the mirrors 37 are moved in the direction of the optical axis in a state that the axis line defined by the projections 45 is used as a fulcrum. According to the above method, the inclination of the scanning direction, which is the inclination of the main-scanning line, can be adjusted. However, the shift of the parallel distance (the pitch) of the sub-scanning direction cannot be corrected.

The above problem can be solved by the change of a vertical write timing (to be described later) with reference to FIGS. 11 to 14.

Figure 11:
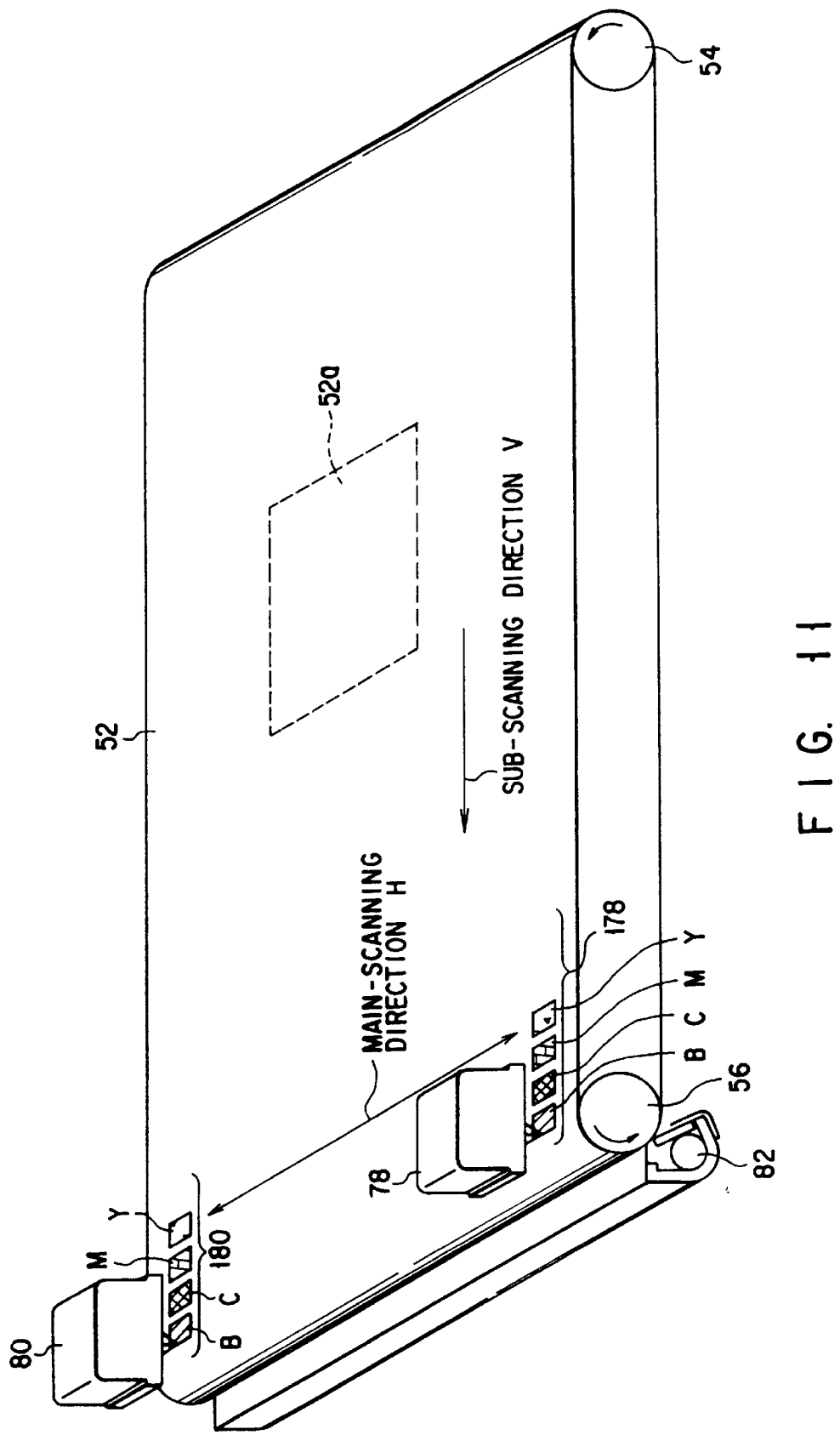
FIG. 11 is a schematic view showing the principle of the resist correction in the image forming apparatus of FIG. 1.

FIG. 11 is a schematic perspective view showing a portion in the vicinity of the transfer belt of the image forming apparatus of FIG. 1 in order to explain a resist correction mode. As already explained, the resist sensors 78 and 80 are arranged to have a predetermined distance in the width direction of the transfer belt 52, that is, the main-scanning direction H. A line (imaginary line) connecting the center of the resist sensor 78 to the center of the resist sensor 80 is defined to be substantially parallel to the axial line of each of the photosensitive drums (Y, M, C, B) of each of the image forming sections 50 (Y, M, C, and B). The above connection line is preferably defined to be correctly parallel to the photosensitive drum 58B of the image forming section 50B.

Figure 12:
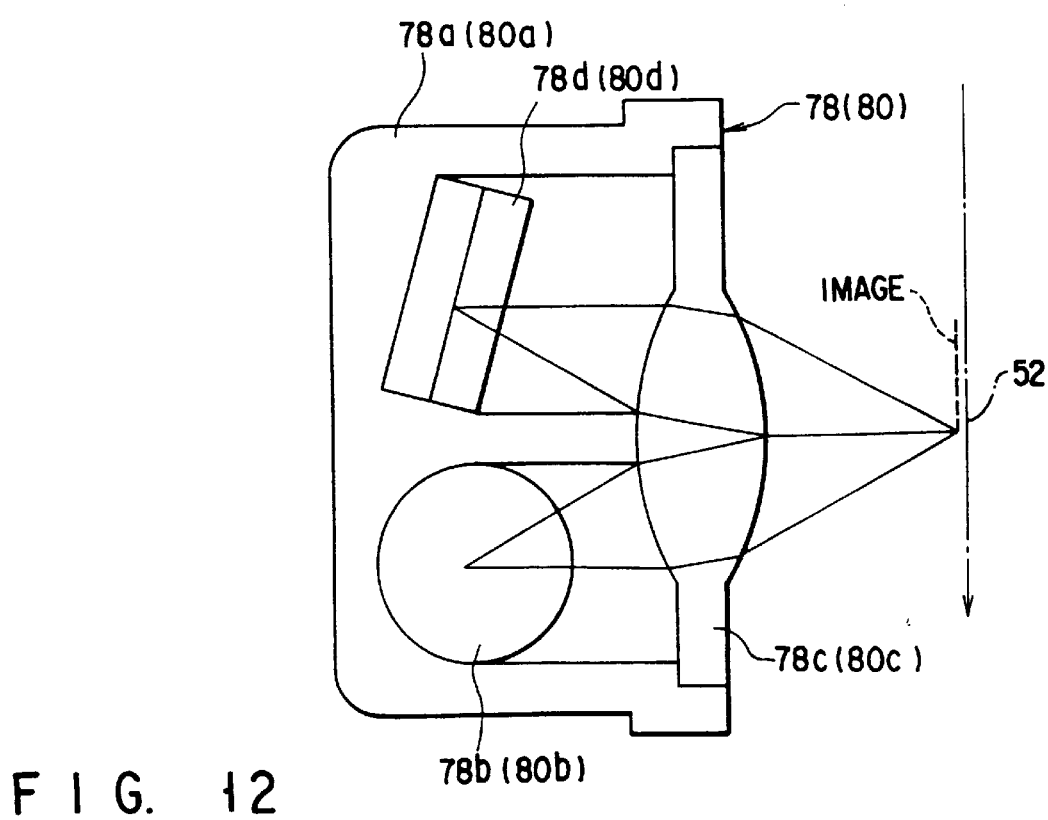
FIG. 12 is a schematic cross sectional view of the resist sensor of FIG. 11.

FIG. 12 is a schematic cross sectional view showing the resist sensors 78 and 80 (resist sensor 78 is shown as a typical example since both sensors are substantially the same).

The sensor 78 (or 80) includes a housing 78a (80a), a light source 78b (or 80b) for a reference light, a convex lens 78c (or 80c), and a photosensor 78d (or 80d). The light source 78b (or 80b) is provided at a predetermined position of the housing 78a (or 80a) to provide irradiation of light including a predetermined wavelength, at least about 450, 550, and 600 nm, in the image on the transfer belt 52. The convex lens 78c (or 80c) focuses the light generated from the light source 78b (or 80b) on the image formed on the transfer belt 52, and image-forms light on the photosensor 78d (or 80d). The photosensor 78d (80d) detects the reflected light from the image focused by the convex lens 78c (or 80c) to be converted to an electric signal.

As shown in FIG. 13, the photosensor 78d (or 80d) has an area division type pin diode having first and second light detection areas 78A and 78B (or 80A and 80B) divided along the main-scanning direction H perpendicular to the sub-scanning direction V. Each of the wavelengths, 450, 550, and 600 nm required in the light source 78b (or 80b) is a peak wavelength of an absorption spectrum distribution of each toner of Y (Yellow), M (Magenta), C (Cyan), and B (Black) so as to be ensured to maintain sensitivity of detection against each other. The lateral magnification of the convex lens 78c (80c) is −1.

Figure 13A:
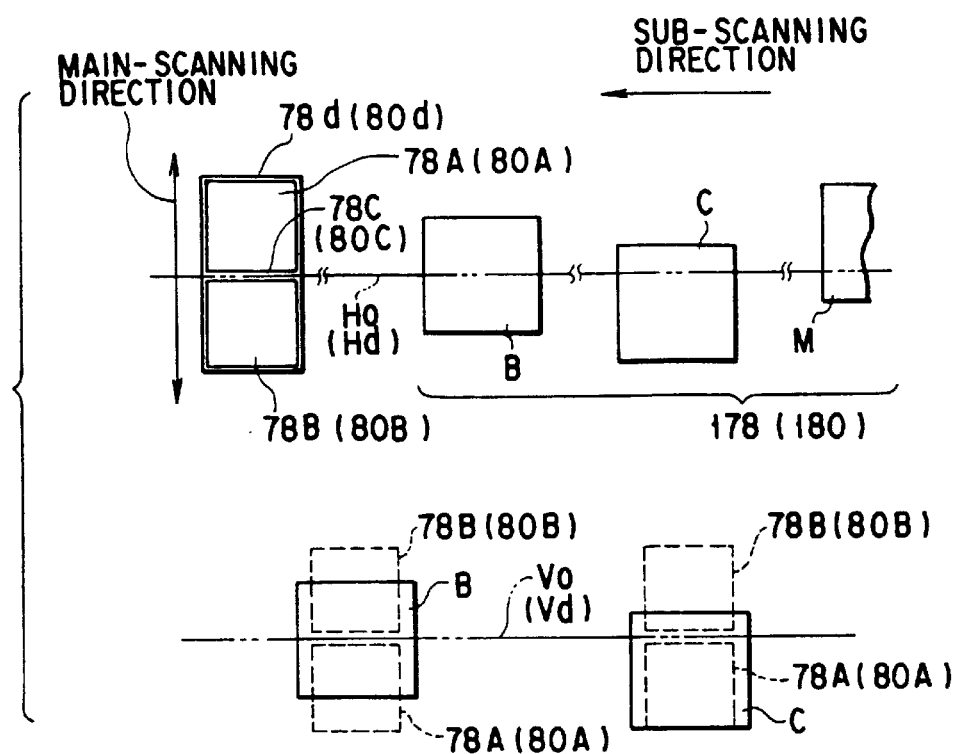
FIGS. 13A and 13B are schematic views showing a detection output of the resist of the resist sensor of FIG. 12.
Figure 13B:
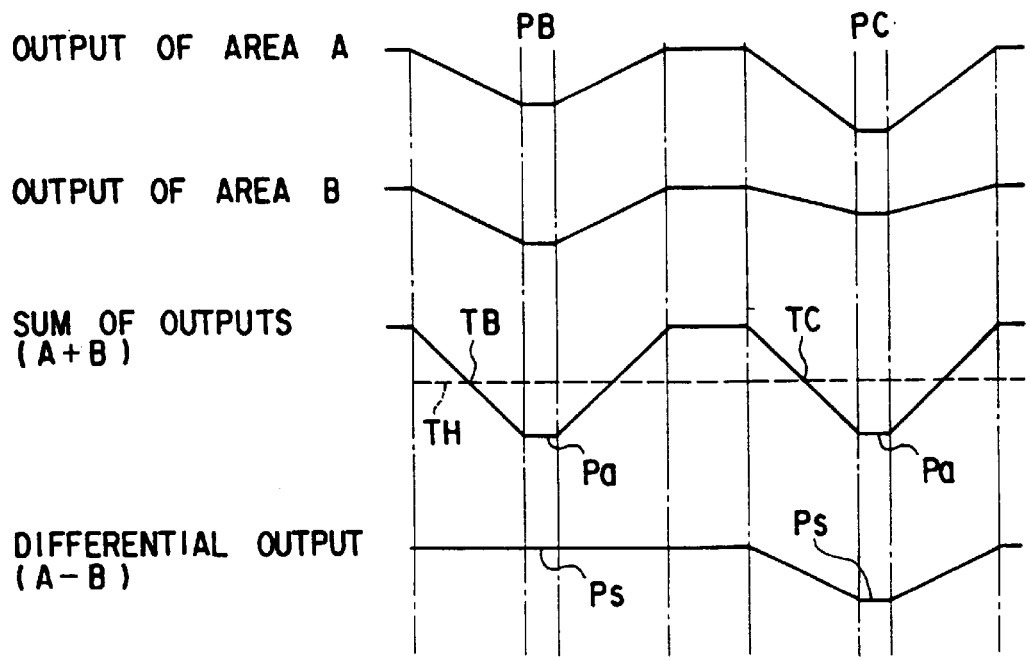

FIGS. 13A and 13B are schematic views showing the principle in which the position of the image can be detected by the resist sensors 78 and 80.

In FIG. 13A, the photosensor 78d of the resist 78 is provided to conform a boundary section 78C between the first and second detection areas 78A and 78B to a reference position Ho relating to the main-scanning direction H of the image formed on the transfer belt 52. Similarly, the photosensor 80d of the resist sensor 80 is provided to conform a boundary section 80C between a reference position Ho' relating to the main-scanning direction H of the image formed on the transfer belt 52. The images are passed through the sensor in order of B, C, M, and Y (image Y is omitted).

In FIG. 13B, the lateral magnification of the convex lens 78c (or 80c) is −1. Due to this, the output voltage, which is output from the respective pin diodes 78A (80A) and 78B (80B) on the opposite side of the design center Ho (Hd) of the main-scanning direction where the direction of the the design center Ho and that of the image shift are reversed. In other words, the output of the image shift detected through pin diode is reversed against the design center Ho.

For example, since the image B is substantially linearly symmetrical to the reference position Ho (Hd) of the main-scanning direction, the outputs from the corresponding pin diodes 78A (80A) and 78B (80B) are substantially the same.

On the other hand, since the image C is shifted to the side of the area B at the center of the reference position Ho (Hd) of the main-scanning direction, the outputs from the corresponding pin diodes 78A (80A) and 78B (80B) become A<B.

The sum of the outputs of the pin diodes corresponding to the images B and C, that is, A+B, and the difference, that is, A−B are obtained. Then, resultant value of A+B is thresholded by a predetermined threshold level TH and the minimum of maximum amount of A−B is measured. Thereby, the certain position of the sub-scanning direction V and the center of the main-scanning direction H of the respective images B and C can be detected. In other words, by detecting the position (e.g., TB, TC) where the sum (A+B) of the outputs of the pin diode exceeds the threshold level TH, the certain position of the sub-scanning direction V of the corresponding image can be detected. Also, by detecting the value of level Ps of the difference (A−B) of the outputs, the center of the main-scanning direction H of the corresponding image can be detected.

FIG. 14 is a schematic block diagram of the image control section for controlling an image forming operation of the image forming apparatus of FIG. 1.

The image forming section 110 has a plurality of control units such as an image control CPU 111, a timing control section 113, data control sections 115Y, 115M, 115C, and 115B corresponding to the respective color separated components.

The image control CPU 111, the timing control section 113, and data control sections 115 are mutually connected to each other through a bus line 112.

A main control unit 101 is connected to the image control CPU 111. The main control unit 101 controls an operation of the mechanical elements of the image forming unit 100 such as a motor or a roller through the bus line 112. Also, the main control unit 101 controls a voltage value or an amount of current to be applied to the electrical elements such as the charge units 60, the develop units 62, or the transfer units 64.

A ROM (read only memory), a RAM 102 (random access memory), and a nonvolatile memory 103 are connected the main control unit 101. The ROM stores initial data for operating the unit 100 or a test pattern (not shown). The RAM 102 temporarily stores input image data or compensation data calculated in accordance with the outputs of the resist sensors 78 and 80. The nonvolatile memory 103 stores various compensation data obtained by an adjusting mode to be described later.

The timing control section 113 includes image memories 114 (Y, M, C, B), laser device sections 116 (Y, M, C, B), a resist compensation calculation unit 117, a timing setting unit 118, and voltage controlled oscillators (VCO) 119 (Y, M, C, B).

The image memories 114 store image data of the respective color separated components.

The laser drive sections 116 drive lasers 3 (Y, M, C, B) to provide irradiation of the laser beams to the respective photosensitive members 58 based on the respective image data stored in the image memories 114.

The resist compensation calculation unit 117 calculates an amount of compensation of timing for writing the image from the laser beams L (Y, M, C, B) based on the outputs of the first and second resist sensors 78 and 80.

The timing setting unit 118 defines timing for operating the respective mechanical elements of the respective image forming units 50 and the lasers 3 of the laser exposer unit 1.

The voltage controlled oscillators 119 correct an error of a length of a scanning line, which is peculiar to the respective image forming units 50, and a shift caused by each optical path of the laser exposer unit 1.

The timing control section 113 is a microprocessor including the RAM section for storing compensation data therein. The timing control section 113 is used in, for example, ASIC (Application Specific Integrated Circuit) based on the individual specification.

The respective data control sections 115 are microprocessors including a plurality of latch circuits and OR gates. The data control sections 115 are also used in, for example, ASIC.

The resist compensation calculation unit 117 is a microprocessor including at least four pairs of comparators and OR gate. Also, the resist compensation calculation unit 117 is used in, for example, ASIC.

The VOCs 119 are oscillators, which can vary a frequency to be output in accordance with the voltage to be applied. The VOCs 119 have a frequency variable range of about ±3%. As this type of oscillators, a harmonic oscillator, an LC oscillator, or a simulated reactance variable LC oscillator can be used. Moreover, as VOC 119, there is known a circuit device in which a converter for converting an output waveform from a sine wave to a rectangular wave is incorporated.

In the respective memories 114, image data, which is sent from an outer storage unit (not shown) or a host computer, is stored.

Moreover, the output of the horizontal synchronization detector 23 of the laser exposer unit 1 is converted to a horizontal synchronization signal H-syn through a horizontal synchronization signal generator 121, and input to the timing control section 113 and respective data control sections 115.

The following will explain an operation of the image forming unit 100 with reference to FIGS. 1 and 14.

The image forming 100 can be operated in two modes, that is, an image forming (normal) mode for forming an image on paper P transferred through the transfer belt 52, and a resist compensation (adjustment) mode for directly forming an image on the transfer belt 52.

The following will explain the resist compensation (adjustment) mode.

FIG. 11 is a perspective view showing a cut portion in the vicinity of the transfer belt of the image forming unit shown in FIG. 1 to explain the resist compensation mode. As already explained, the resist sensors 78 and 80 are arranged to have a predetermined interval in the width direction of the transfer belt 52, that is, the main-scanning direction H. A line (imaginary line) connecting to the mutual center of the resist sensors 78 and 80 is defined to be substantially parallel to the axial line of the respective photosensitive members 58. Preferably, the line connecting to the center of the resist sensors 78 and 80 is provided to be correctly parallel to the photosensitive member 58B of the image forming unit 50B.

The belt drive roller 56 is rotated in the direction of an arrow, thereby the transfer belt 52 is moved to the direction where an area 52a is directed from the roller 54 to the roller 56 (hereinafter this direction called "sub-scanning direction V"). In the resist compensation mode, two pairs of test modes 178 (Y, M, C, B) and test modes 180 (Y, M, C, B) are formed on the transfer belt 52 to have a predetermined distance in a direction perpendicular to the main-scanning direction H, that is, a sub-scanning direction V. The test images 178 and 180 are formed to correspond to image data for resist adjustment, which is stored in ROM in advance. The test images 178 and 180 are moved along the sub-scanning direction V in accordance with the movement of the transfer belt 52, and passed through the resist sensors 78 and 80. As a result, a shift between the test images 178 and 180 and the resistor sensors 78 and 80 can be detected. In the resist compensation mode, the roller 72 for feeding paper P from the cassette 70 and the fixing unit 80 are maintained to be stopped.

More specifically, the first to fourth image forming units 50 (Y, M, C, B) are driven by the control of the main control unit 101, a predetermined voltage is applied onto the surface of each of the photosensitive members 58 of each of the image forming units 50. At the same time, the polygon mirror 5a of the polygon mirror unit 5 of the laser exposer unit 1 is rotated at a predetermined speed by the control of the image control CPU 111 of the image control section 110.

Sequentially, image data, which corresponds to the test image fetched from ROM, is fetched to the respective image memories 114 by the control of the image control CPU 111. Thereafter, a vertical synchronization signal V-syn is output from the timing control section 113 based on timing data, which is set by the timing setting unit 118, and resist compensation data, which is stored in the initial RAM of the timing control section 113. In a case where resist compensation data is not stored in the internal RAM, initial data stored in the ROM is used.

The vertical synchronization signal V-syn, which is output from the timing control section 113, is supplied to the respective data control sections 115.

The corresponding lasers 3 are operated by the corresponding laser drive sections 116, which are based on the vertical synchronization signal V-syn, and the laser beams L emitted from the lasers 3 are detected by the horizontal synchronization detector 23. Then, a predetermined clock numbers of the VCO 119 (initial data stored in the ROM is used till the output is input from the resist sensors 78 and 80) is counted after the horizontal signal H-syn is counted after the horizontal synchronization signal H-syn is output from the horizontal synchronization signal generator 121. At this time, oscillation frequency data, which is initial data stored in the ROM, is supplied to the respective VCOs 119. After counting the predetermined clock, image data stored in the image memories 114 is output by a predetermined timing.

Thereafter, by the control of the respective data control sections 115, a laser drive signal corresponding to image data is output to the respective lasers from the respective laser drive sections 116. Then, the laser beams L, which are intensity-modulated, are output from the respective lasers 3 based on image data. Therefore, the electrostatic latent image, which corresponds to test image data, is formed on the respective photosensitive members 58 of the respective image forming units 50 in which the predetermined voltage is set. By use of the respective developing units 62, the electrostatic latent image is developed with toner to which the corresponding color is provided, and converted to the toner image, which is paired of four colors.

Two test images, each which is paired of four colors Y, M, C, B) and formed on the respective photosensitive members 58, are transferred onto the transfer belt 52 through the transfer units 64, and delivered to the resist sensors 78 and 80. When two test toner images are passed through the resist sensors 78 and 80, the resist sensors 78 and 80 output a predetermined output, which corresponds to the relative position of the respective test toner images wherein the positions of the resist sensors 78 and 80 are set as a reference position, that is, the shift of the test toner images. The test toner images formed on the transfer belt 52 are further transferred with the rotation of the transfer belt 52, and removed by the belt cleaner 82.

The respective outputs from the resist sensors 78 and 80 are input to the resist compensation calculation unit 117 to be used in the calculation of the shift of the respective test toner images.

The resist compensation calculation unit 117 detects the shift of the position of each pair of test toner images of each color, that is, 178Y and 180Y, 178M, and 180M, 178C, and 180C, and 178B and 180B formed to be separated by a predetermined distance in the sub-scanning direction. After the detection, the unit 117 calculates of each of the average value, and defines an amount of compensation Vr of timing to output the vertical synchronization signal V-syn based on the difference between the calculated average value and the predetermined design value. Whereby, the shift, which is caused by the overlap of four images, in the sub-scanning direction is removed. In other words, the light-emitting timing of the respective lasers 3 of the exposer unit 1 is adjusted. In other words, the shift, which is caused when the distances between the respective image forming units 50 are different from each other, are removed. Then, there is removed the shift between the respective laser beams L emitted from the laser exposer 1 in connection with the distance in the sub-scanning direction.

Moreover, the resist compensation calculation unit 117 detects the shift of the position of each of the test toner images 178 (Y, M, C, B) in the main-scanning direction. After the detection, the unit 117 calculates the average value, and defines an amount of compensation Hr of timing to output image data after the output of the horizontal synchronization signal H-syn based on the difference between the calculated average value and the predetermined design value. Whereby, there is adjusted timing in which the laser beams L, which are emitted from the respective lasers 3 of the laser exposer unit 1, are intensity-modulated by image data. In other words, the writing position of image data to be recorded onto the respective photosensitive members 58 of the respective image forming units 50 is adjusted in the main-scanning direction.

Furthermore, the resist compensation calculation unit 117 detects the variation of the distance of each pair of test toner images of each colors of each other, that is, 178Y and 180Y, 178M and 180M, 178C and 180C, and 178B and 180B in the main-scanning direction. After the detection, the unit 117 calculates the average value, and defines an amount of compensation Fr of the oscillation frequency to be output from VOCs 119 based on the difference between the calculated average value and the predetermined design value.

Whereby, the length of the respective laser beams in the main-scanning direction per one clock, that is, the length of one line in the main-scanning direction to be image-formed on the respective photosensitive members 58, is adjusted.

The above amounts of compensation Vr, Hr, and Fr, which are obtained by the resist compensation calculation unit 117, are temporarily stored in the RAM of the timing control section 113. In this case, Vr, Hr, and Fr may be stored in the nonvolatile RAM 103. Moreover, these compensation operations are executed by the predetermined timing such as time when the compensation mode is selected by a control panel (not shown), time when a power supply switch (not shown) of the image forming unit 100 is turned on, or time when a certain number of papers to be printed, which is counted by a counter (not shown), reaches a predetermined number of papers.

The following will explain the image forming mode.

An image forming start signal is supplied by a control panel (not shown) or a host computer, so that the respective image forming units 50 are wormed up by the control of the main control unit 101, and the polygon mirror 5a of the polygon mirror unit 5 is rotated at a predetermined rotation speed by the control of the image control CPU 111.

Sequentially, image data to be printed is fetched to the RAM 102 from the outer memory unit, the host computer, or the scanner (image reading unit). A part (or all) of image data fetched into the RAM 102 is stored in each image memories 114 by the control of the image control CPU 111 of the image control unit 110. Moreover, the feeding roller 72 is driven by the control of the main control unit 101 in a state that a predetermined timing such a vertical synchronization signal v-syn is used as a reference, thereby one paper P is picked up from the paper cassette 70. Then, the respective toner images Y, M, C, and B, which are provided by the image forming units 50, and the timing are adjusted by the resist roller 74. The picked up paper P is adhered to the transfer belt 52 by the absorption roller 76, and guided to the respective image forming units 50 in accordance with the rotation of the transfer belt 52.

On the other hand, at the same time with the paper feeding and transferring operations, the vertical synchronization signal V-syn is outputted from the timing control unit 113 based on data set by the timing setting unit 118, resist data read from the internal RAM of the timing control unit 113, and clock data.

When the vertical synchronization signal V-syn is output from the timing control unit 113, the respective laser drive units 116 are driven by the respective data control units 115. Then, irradiation of each of the laser beams for one line in the main-scanning direction is provided to the respective photosensitive members 58 of the respective image forming units 50 form the respective lasers 3.

The number of clocks of the respective VCOs 119 is counted just after the input of the horizontal synchronization signal H-syn, respectively, which is generated by the horizontal synchronization signal generator 121, based on the laser beam for one line. When the number of clocks of the respective VCOs 119 reaches a predetermined value, image data to be printed read from the respective image memories 114. Sequentially, in order to intensity-modulate the respective laser beams from the respective lasers 3, image data is transferred to the respective laser drive units 116 by the control of the respective control units 115, so that an image having no shift is formed on the respective photosensitive members 58 of the respective image forming units 50.

As a result, the respective laser beams, which are guided to the respective photosensitive members 58, are correctly image-formed on the respective photosensitive members 58. At this time, no influence of the deviation of the optical path, which is form the respective lasers 3 to the respective photosensitive members 58, is exerted on the above image formation. Moreover, the above image formation is not influenced by the variation of the position of each photosensitive member 58, which is caused by the deviation of the diameter of the respective photosensitive members 58.

Each of the photosensitive members 58 is charged to a predetermined potential, and the potential is changed based on image data, whereby an electrostatic latent image corresponding to image data is formed on each of the photosensitive members 58. Each of the developing units 62 develops the electrostatic latent image with toner having a corresponding color to be converted to an toner image.

Each toner image is moved to paper P, which is delivered by the transfer belt 52, with the rotation of each of the photosensitive member 58, and transferred onto paper P on the transfer belt 52 at a predetermined timing by the transfer unit 64.

Whereby, the toner image in which four colors are correctly positioned on photosensitive member 58 is transferred on paper P. After the toner image is transferred onto paper P, the residual toner and the residual voltage, which are left on the respective photosensitive members 58, are removed by the respective cleaners 66 and the respective discharge lamps 68 to be used in the sequential image formation.

Paper P in which the four-colored toner image is electrostatically maintained is further transferred with the rotation of the transfer belt 52, and separated from the transfer belt 52 by the difference between the curvature of the belt drive roller 56 and linearity of paper P to be guided to the fixing unit 84. Paper P guided to the fixing unit 84 is discharged to a discharge tray (not shown) after toner is melted and the toner image as a color image is fixed by the fixing unit 84.

On the other hand, the transfer belt 52 in which paper P is already supplied to the fixing unit 84 is further rotated. As a result, undesired toner left on the surface is removed by the belt cleaner 82, and the transfer belt 52 is used in the transfer of paper P to be supplied from the cassette 70.

The following will specifically explain the post-deflection optical system between the polygon mirror 5 and the mirror surface.

FIGS. 15 to 50 and Tables 2 to 6 show various optical characteristics and lens data on the first surface (incident surface) of the first image forming lens 30a of the post-deflection optical system, the second surface (emission surface) of the first image forming lens 30a of the post-deflection optical system, the first surface (incident surface) of the second image forming lens 30b of the post-deflection optical system (lens surface No. "3" in Table 5), the second surface (emission surface) of the second image forming lens 30b of the post-deflection optical system (lens surface No. "4" in Table 6).

TABLE 2

Beam advances from + to − due to reflection here
Lens Data of Post-deflection Optical System

| post-deflection optical system curvature | | absolute coordinates thickness | material | others |
|---|---|---|---|---|
| CUX | CUY | −35.286 | air | eccentricity in y direction −5.945 |
|  |  | −7.975 | PMMA | first surface |
|  |  | −88.026 | air | second surface |
|  |  | −7.065 | PMMA | third surface |

TABLE 2-continued

Beam advances from + to − due to reflection here
Lens Data of Post-deflection Optical System

| post-deflection optical system curvature | | absolute coordinates thickness | material | others |
|---|---|---|---|---|
| plane | plane | −9.645 | air | fourth surface |
| plane | plane | −2.000 | BK7 |  |
| plane | plane | −170.000 | air |  |

(coordinate system: right-hand system) lens shape:

$$X = \frac{CUYy^2 + CUZz^2}{1 + \sqrt{1 - AYCUY^2y^2 - AZCUZ^2z^2}} + \sum_{n=0}\sum_{m=0} A_{mn}y^m z^{2n} \quad (1)$$

TABLE 3

Coefficient $A_{mn}$ of Polynomial of First Surface

AY = 1　　　　　　　AZ = 1
CUY = 2.099E-2　　　CUZ = −2.313E-2

| | | | m | | | |
|---|---|---|---|---|---|---|
| n | 0 | 1 | 2 | 3 | 4 | 5 |
| 0 | 0 | −4.745E-3 | 0 | −2.106E-5 | −5.360E-6 | −2.895E-9 |
| 1 | 0 | 1.584E-4 | −1.905E-5 | 2.320E-7 | −8.577E-9 | −2.078E-11 |
| 2 | −5.292E-5 | 5.260E-7 | 8.518E-9 | 3.612E-10 | −2.761E-10 | −4.033E-12 |
| 3 | 0 | 0 | 0 | 0 | 0 | 0 |

| | | | m | | |
|---|---|---|---|---|---|
| n | 6 | 7 | 8 | 9 | 10 |
| 0 | −6.300E-10 | 2.978E-11 | −1.498E-12 | −7.911E-15 | 1.114E-15 |
| 1 | −1.077E-12 | −1.471E-13 | −4.611E-15 | 2.606E-16 | 3.326E-18 |
| 2 | 9.231E-14 | 2.343E-14 | 7.918E-18 | −5.066E-17 | 1.614E-18 |
| 3 | 0 | 0 | 0 | 0 | 0 |

TABLE 4

Coefficient $A_{mn}$ of Polynomial of First Surface

AY = 1　　　　　　　AZ = 1
CUY = 2.098E-2　　　CUZ = 2.247E-2

| | | | m | | | |
|---|---|---|---|---|---|---|
| n | 0 | 1 | 2 | 3 | 4 | 5 |
| 0 | 0 | −4.275E-2 | 0 | −2.697E-5 | 9.061E-9 | −4.558E-6 |
| 1 | 0 | 1.371E-4 | −1.414E-5 | 1.772E-7 | −1.288E-10 | −1.349E-8 |
| 2 | −6.111E-5 | 8.337E-7 | 2.431E-9 | −2.357E-9 | 1.437E-11 | −9.033E-11 |
| 3 | 0 | 0 | 0 | 0 | 0 | 0 |

TABLE 4-continued

| n | m=6 | m=7 | m=8 | m=9 | m=10 |
|---|---|---|---|---|---|
| 0 | −1.290E-9 | 1.138E-11 | −1.421E-13 | 3.497E-16 | 1.251E-16 |
| 1 | 2.743E-12 | −1.679E-13 | −1.115E-13 | 1.494E-16 | 6.329E-18 |
| 2 | −4.218E-13 | −1.643E-14 | 2.215E-16 | −7.831E-18 | 8.730E-19 |
| 3 | 0 | 0 | 0 | 0 | 0 |

TABLE 5

Coefficient $A_{mn}$ of Polynomial of First Surface

AY = 1  AZ = 1
CUY = 3.979E-3  CUZ = 1.490E-3

| n | m=0 | m=1 | m=2 | m=3 | m=4 | m=5 |
|---|---|---|---|---|---|---|
| 0 | 0 | −5.167E-2 | 0 | −5.117E-6 | −3.029E-7 | 1.992E-10 |
| 1 | 0 | −2.417E-5 | 3.729E-7 | −2.104E-10 | 1.140E-10 | 3.208E-13 |
| 2 | 1.590E-6 | −7.391E-8 | 3.951E-10 | 2.123E-11 | 1.716E-14 | 1.721E-15 |
| 3 | 0 | 0 | 0 | 0 | 0 | 0 |

| n | m=6 | m=7 | m=8 | m=9 | m=10 |
|---|---|---|---|---|---|
| 0 | 1.820E-11 | −2.882E-14 | 1.039E-14 | 7.345E-18 | −8.637E-21 |
| 1 | −1.276E-14 | −2.155E-17 | −1.024E-18 | −4.978E-22 | −1.057E-22 |
| 2 | 1.941E-17 | −7.128E-19 | 6.163E-22 | 4.512E-23 | −4.903E-25 |
| 3 | 0 | 0 | 0 | 0 | 0 |

TABLE 6

Coefficient $A_{mn}$ of Polynominal of Fourth Surface

AY = 1  AZ = 1
CUY = 1.314E-3  CUZ = 1.545E-2

| n | m=0 | m=1 | m=2 | m=3 | m=4 | m=5 | m=6 | m=7 | m=8 | m=9 | m=10 |
|---|---|---|---|---|---|---|---|---|---|---|---|
| 0 | 0 | −1.518E-2 | 0 | −3.793E-6 | −2.806E-8 | −3.801E-10 | 9.361E-13 | 3.592E-14 | 2.538E-14 | 3.627E-18 | 4.242E-20 |
| 1 | 0 | −2.047E-5 | 3.586E-7 | 6.698E-10 | 4.157E-11 | −7.005E-14 | 1.545E-15 | 1.303E-17 | −1.362E-18 | −1.555E-21 | −6.560E-23 |
| 2 | 5.630E-7 | −5.839E-10 | 1.888E-11 | 6.039E-14 | 01.070E-15 | 1.889E-18 | 1.547E-18 | 1.457E-19 | 2.315E-23 | −3.883E-25 | |
| 3 | 0 | 0 | 0 | 0 | 0 | 0 | 0 | 0 | 0 | 0 | 0 |

In FIGS. 15 to 50, an axis x conforms to the direction of the optical axis of the post-deflection optical system, "+" is provided to the direction to the polygon mirror 5, and "−" is provided to the direction to the image surface. An axis y conforms to the main-scanning direction, the direction of the beam deflected by the polygon mirror, that is, the direction where the polygon mirror body 5a is rotated is changed to "+" to "−."

On the other hand, an axis z is conforms to the sub-scanning direction. For example, the side where the laser beam LB shown in FIG. 4 is passed, that is, an upper side to the optical axis of the sub-scanning direction is shown by "+."

In the conventional optical exposer unit, it has been known that three or more image forming lenses are needed in order to optimize the aberration characteristics such as the spherical aberration on the image forming surface, the comma aberration, the image surface curvature, or the multiplication error in the case where the toric lens is used.

The following will explain the result of the simulation of the shapes of the incident surface and the emission surface of each of the first and second plastic lens 30a and 30b based on the polynomial shown in the equation (1) of Table 2.

The spherical aberration, the comma aberration, the aberration of the image surface curvature, and the multiplication error in the sub-scanning direction can be optimized from the terms from the terms n≠0 of $A_{mn}$ and $A_{mn}$≠0 of the equation (1). Also, various aberration characteristics in the main-scanning direction can be optimized from the terms from the terms m≠0 of $A_{mn}$ and $A_{mn}$≠0 of the equation (1). According to the result of the simulation of the shapes of the incident surface and the emission surface of each of the first and second plastic lens 30a and 30b, the following points can be confirmed.

More specifically, in a case where one lens surface of the lens surface No. 1 to 4 includes the terms n≠0 of $A_{mn}$ and $A_{mn}$≠0 of the equation (1) (that is, no specific rotation symmetrical axis is included), the comma aberration and the spherical aberration are not sufficiently corrected, and the diameter of the cross section beam spot on the image surface is about 100 μm. Also, in a case where two or more lens surfaces, which include the terms n≠0 of $A_{mn}$ and $A_{mn}≠0$, are arranged, the diameter of the cross section beam spot on the image surface can be reduced to about 40 μm.

Regarding the lens surfaces of each lens, if the total number of $A_{mn}$ (content of term of Σ) shown in the equation (1), it can be confirmed that various aberration characteristics in the main-scanning and sub-scanning directions in the condition that $A_{mn}≠0$, m≧11 and n≧2 where (m, n)=(0, 0), (2, 0), (0, 1) are excepted.

FIGS. 15 to 22 show the shape characteristic of the incident surface of the first lens 30a, FIGS. 23 to 30 show the shape characteristic of the emission surface of the first lens 30a. Also, FIGS. 31 to 38 show the shape characteristic of the incident surface of the second lens 30b, FIGS. 39 to 46 show the shape characteristic of the emission surface of the second lens 30b.

The shape of the lens is formed to be asymmetrical, excepting to one surface. In this case, only the surface, which satisfies an equation Z=0, is symmetrical surfaces and no other surface nor axis is symmetrical axis or surface. At least one of the incident surface of the first lens 30a, the emission surface of the first lens 30a, the incident surface of the second lens 30b, and the emission surface of the second lens 30b is defined to be the asymmetrical surface with out depending on the rotation symmetrical axis.

Figure 15:
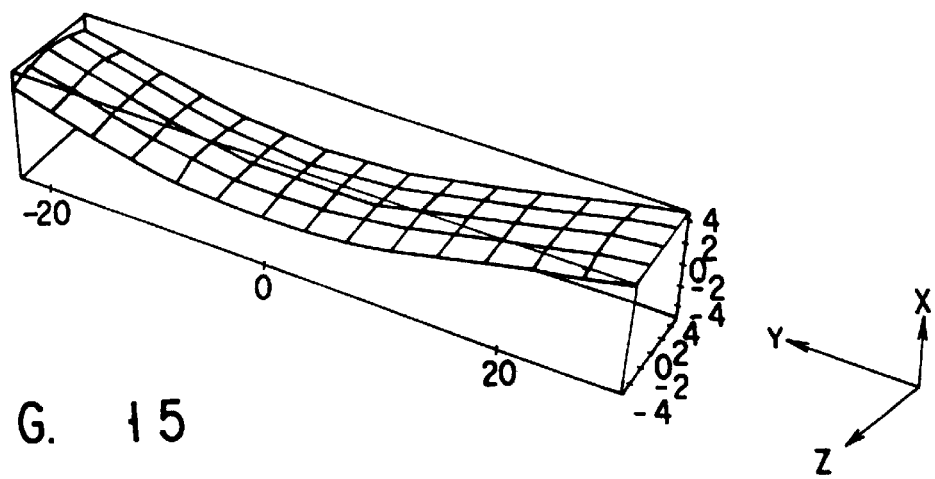
FIG. 15 is a perspective view showing a shape of an incident surface of a first fθ lens of the optical exposer unit of FIG. 2.

FIG. 15 shows the shape of the first surface of the first image-forming lens 30a, that is, a light incident surface. As shown in FIG. 15, the first surface of the first image-forming lens 30a is formed to be asymmetrical to the optical axis (y=0, z=0).

Figure 16:
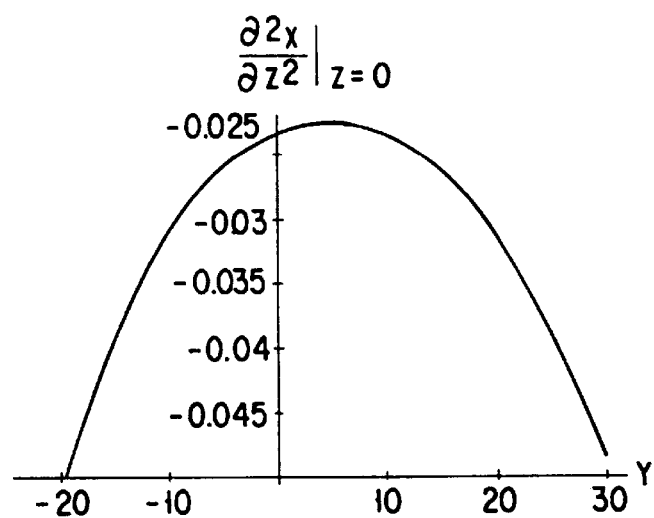
FIG. 16 is a graph showing a curvature of an incident surface of the first lens (of the optical exposer unit of FIG. 2) of the sub-scanning direction at a cross point between a light scanning surface and a lens surface (that is, a plane, which includes an optical axis of the optical system and is expanded to the main-scanning direction)

FIG. 16 shows a curvature of the first surface of the lens 30a of the sub-scanning direction at a cross point between a light scanning surface and a lens surface (that is, a plane, which includes an optical axis of the optical system and is expanded to the main-scanning direction). In other words, FIG. 16 shows the characteristic of the shape of the first surface of the first image-forming lens 30a of the sub-scanning direction shown in FIG. 15, that is, the first surface of the first image-forming lens 30a is formed to be asymmetrical to the optical axis (y=0, z=0). As is obvious from this figure and the equation of Table 2, the shape of first surface of the first image-forming lens 30a of each of the main-scanning direction and the sub-scanning direction can be independently set. Thereby, it is possible to sufficiently correct the curve of the main-scanning line, the beam diameter on the image surface (sub-scanning direction), and the position error of each of the tilts of the deflect surfaces of the polygon mirror 5 against the wide deflection angle. Moreover, due to combination with the other lenses, there can be obtained the optical system, which is not easily influenced by the change of the temperature and humidity.

Figure 17:
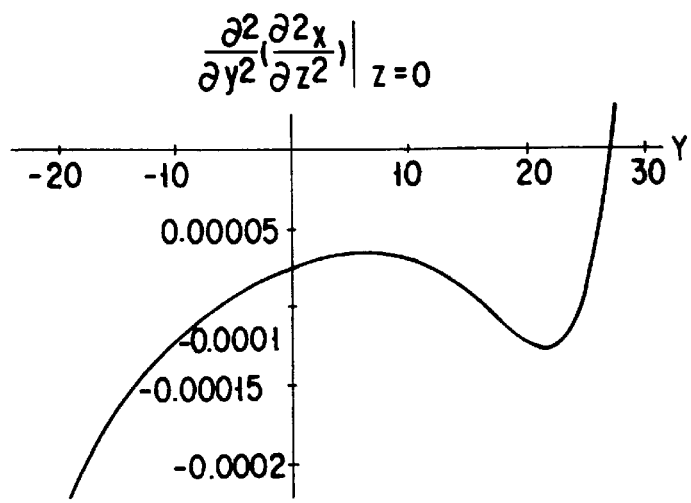
FIG. 17 is a graph showing a secondary differential value between the curvature the sub-scanning direction and the coordinates of the main-scanning direction at the cross point between the light scanning surface and the lens surface, in connection with the incident surface of the first lens of the optical exposer unit of FIG. 2.

FIG. 17 shows a secondary differential value between the curvature of the sub-scanning direction and the coordinates of the main-scanning direction at the cross point between the light scanning surface and the lens surface. In other words, FIG. 17 shows that the change ratio of the curvature of the first surface of the lens 30a of the sub-scanning direction (FIG. 15) is asymmetrically changed with respect to the point crossing the optical axis of the main-scanning direction.

FIG. 18 shows a differential value between the coordinates of the main-scanning direction and the coordinates of the direction of the optical axis at the cross point between the light scanning surface and the lens surface. In other words, the inclination changing direction of the lens surface of the main-scanning direction of the first surface (FIG. 15) is changed at a position other than the cross point.

FIG. 18, it can be understood that a primary differential value between the main-scanning direction and the coordinates of the optical axis at the cross point between the light scanning surface and the lens surface has two extreme values. Therefore, in a state that the characteristic of the sub-scanning direction (FIG. 16) is maintained, fθ characteristic of the main-scanning direction can be corrected without increasing the thickness of the lens against the wide deflection angle. Particularly, in the case of the plastic-formed lens, it takes much time to mold the lens and the manufacturing cost is increased if the thickness of the lens becomes thick.

FIG. 19 shows a curvature of the first surface of the lens 30a of the main-scanning direction at the cross point between the light scanning surface and the lens surface (that is, the plane, which includes the optical axis of the optical system and is expanded to the main-scanning direction). In other words, FIG. 19 shows the characteristic of the shape of the first surface of the lens 30a of the main-scanning direction shown in FIG. 15, that is, the first surface of the first image-forming lens 30a is formed to be asymmetrical to the optical axis (y=0, z=0). Also, the curvature of the lens surface of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

FIG. 20 shows the shape of the first surface of the first image-forming lens 30a of the sub-scanning direction at each point of the main-scanning direction of the lens surface based the cross point between the light scanning surface and the lens surface (that is, the plane, which includes the optical axis of the optical system and is expanded to the main-scanning direction). In other words, FIG. 20 shows that the shape of the first surface (FIG. 15) is formed to be rotationally asymmetrical to the sub-scanning direction.

Figure 21:
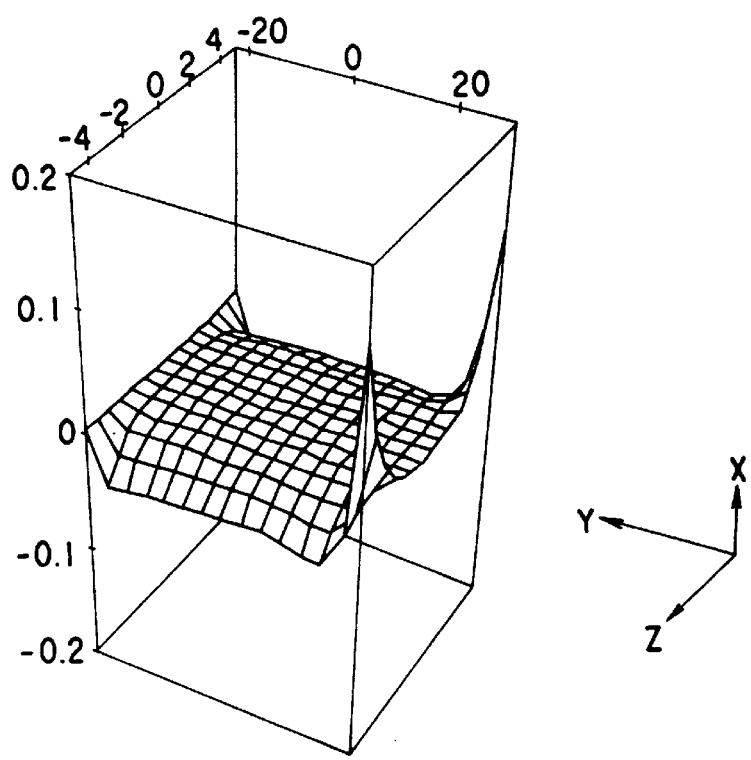
FIG. 21 is a schematic view showing the shift of the shape of the incident surface of the first lens of the sub-scanning direction based on an arc having curvature in a condition that the sub-scanning direction z=0.

FIG. 21 shows the shift of the shape of the first surface of the lens 30a of the sub-scanning direction based on an arc having curvature in a condition that the sub-scanning direction z=0. In other words, FIG. 21 shows that the first surface of the lens 30a is shaped such that in which at least the term of n is 2 or more in the equation (1), that is, $A_{mn}Y^m·Z^{2n}$ to the sub-scanning direction.

Figure 22:
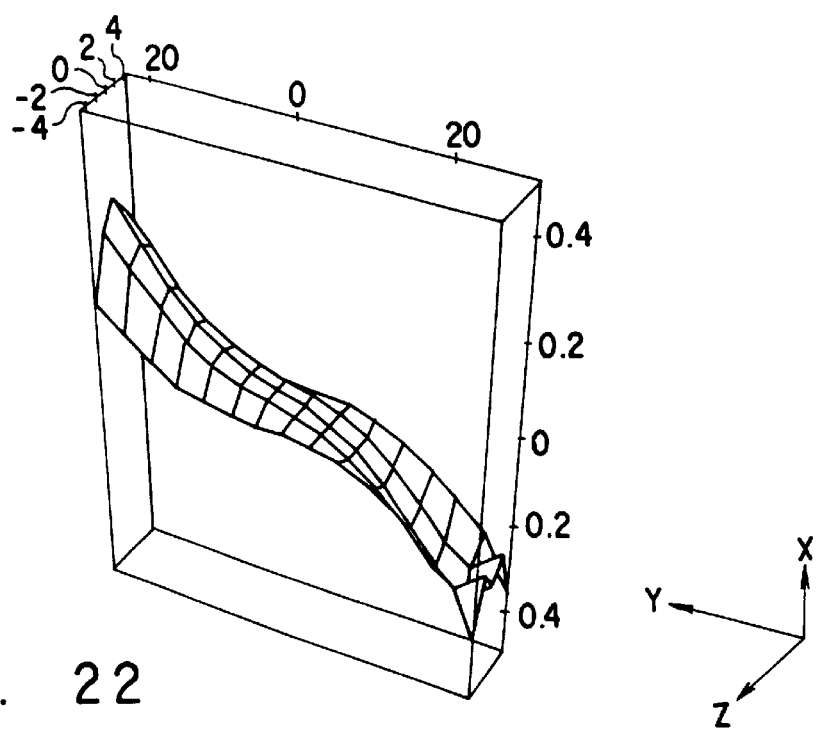
FIG. 22 is a schematic view showing an asymmetrical component to the surface expanding to the sub-scanning direction and including the optical axis with respect to the shape of the the incident surface of the first lens.

FIG. 22 shows an asymmetrical component to the surface expanding to the sub-scanning direction and including the optical axis with respect to the shape of the first surface of the lens 30a.

In other words, FIGS. 21 and 22 show the first surface of the lens 30a includes no rotation symmetrical surface in the main-scanning direction and the sub-scanning direction. As shown in FIG. 21, at least the term of m or n is 4 or more in the equation (1) of the sub-scanning direction is controlled independently of the shape of the line where the light scanning surface, which includes the optical axis and expands to the main-scanning direction, and the lens surface cross each other, and the curvature of the sub-scanning direction. Thereby, various aberration characteristics of the main-scanning direction and the sub-scanning direction can be satisfactorily set.

Figure 23:
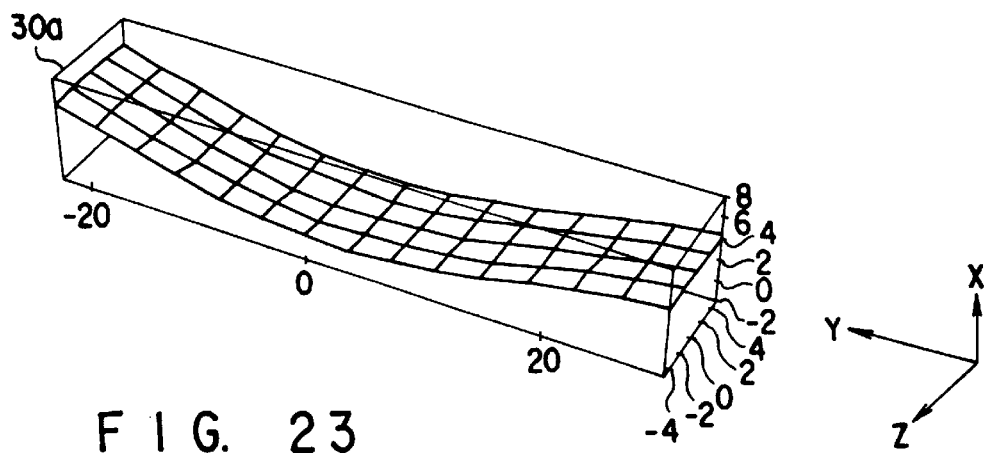
FIG. 23 is a perspective view showing the shape of a light emission surface of the first lens of the optical exposer unit of FIG. 2.

FIG. 23 shows the shape of the second surface (light emission surface) of the first image-forming lens 30a. As shown in FIG. 23, the second surface of the first image-forming lens 30a is formed to be asymmetrical to the optical axis (y, z)=(0, 0).

Figure 24:
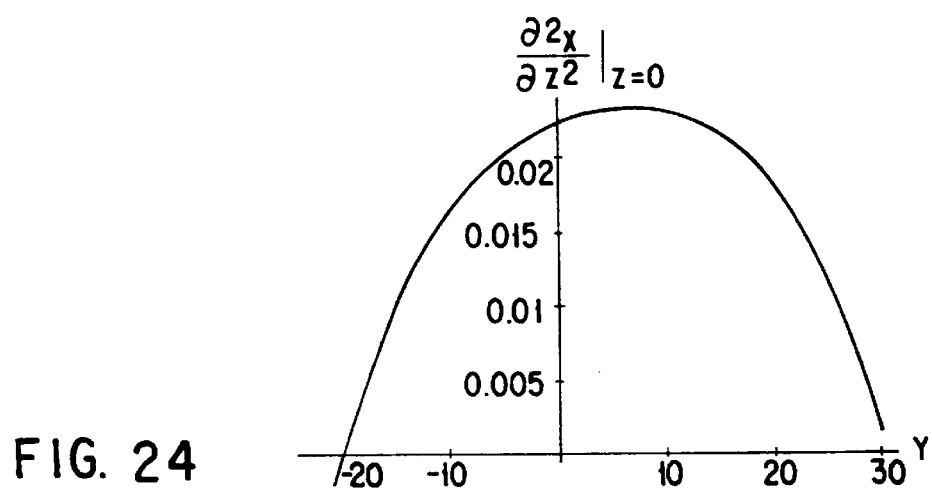
FIG. 24 is a graph showing a curvature of the emission surface of the first lens of the sub-scanning direction at a cross point between a light scanning surface and a lens surface (that is, a plane, which includes an optical axis of the optical system and is expanded to the main-scanning direction)

FIG. 24 shows a curvature of the second surface of the lens 30a of the sub-scanning direction at a cross point between a light scanning surface and a lens surface (that is, a plane, which includes an optical axis of the optical system and is expanded to the main-scanning direction).

Figure 25:
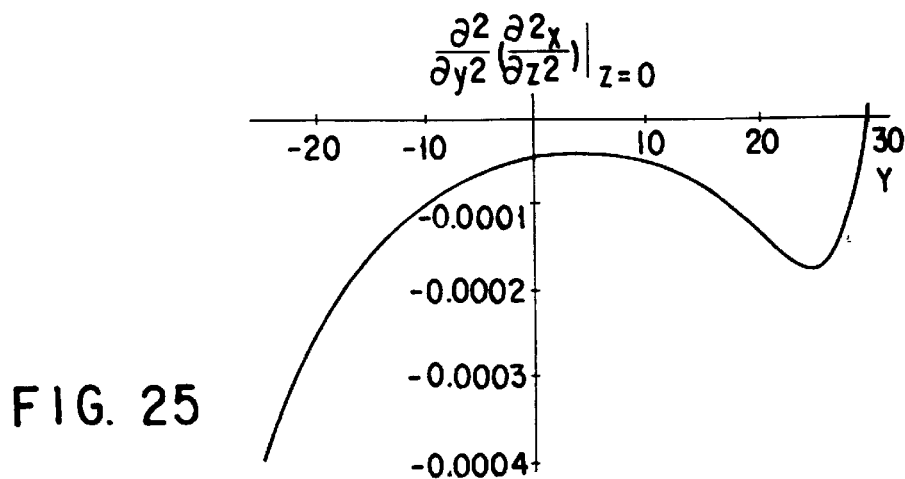
FIG. 25 is a graph showing a secondary differential value between the curvature of the sub-scanning direction and the coordinates of the main-scanning direction at the cross point between the light scanning surface and the lens surface, in connection with the emission surface of the first lens of the optical exposer unit of FIG. 2.

FIG. 25 shows a secondary differential value between the curvature of the sub-scanning direction and the coordinates of the main-scanning direction at the cross point between the light scanning surface and the lens surface.

Figure 26:
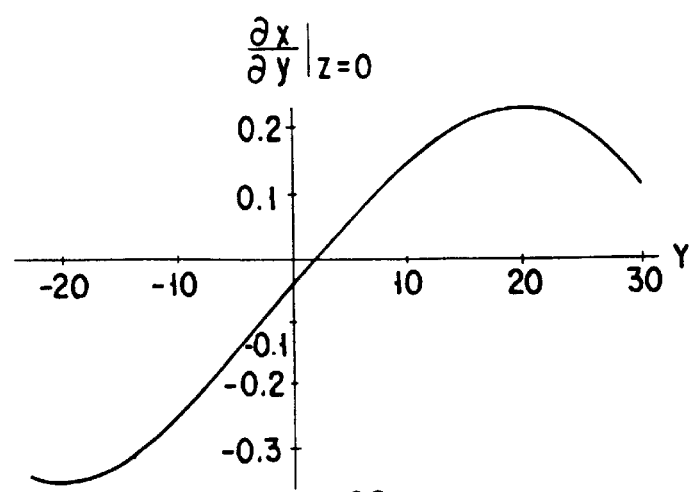
FIG. 26 is a graph showing a differential value between the coordinates of the main-scanning direction and the coordinates of the direction of the optical axis at the cross point between the light scanning surface and the lens surface, in connection with the emission surface of the first lens of the optical exposer unit of FIG. 2.

FIG. 26 shows a differential value between the coordinates of the main-scanning direction and the coordinates of the direction of the optical axis at the cross point between the light scanning surface and the lens surface.

Figure 27:
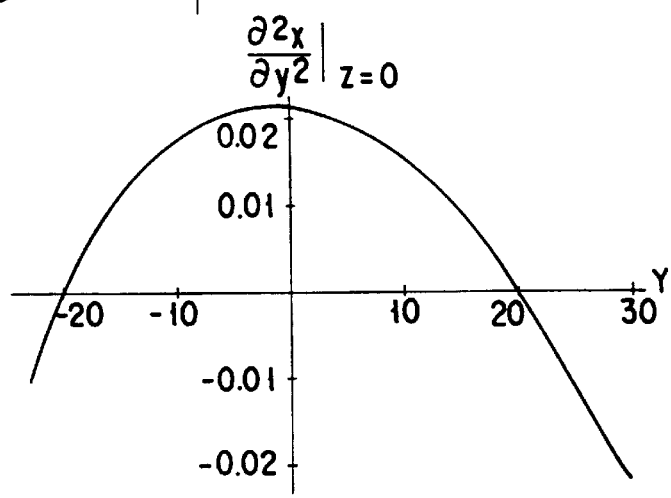
FIG. 27 is a graph showing a curvature of the emission surface of the first lens of the main-scanning direction at the cross point between the light scanning surface and the lens surface (that is, the plane, which includes the optical axis of the optical system and is expanded to the main-scanning direction)

FIG. 27 shows a curvature of the second surface of the lens 30a of the main-scanning direction at the cross point between the light scanning surface and the lens surface (that is, the plane, which includes the optical axis of the optical system and is expanded to the main-scanning direction).

Figure 28:
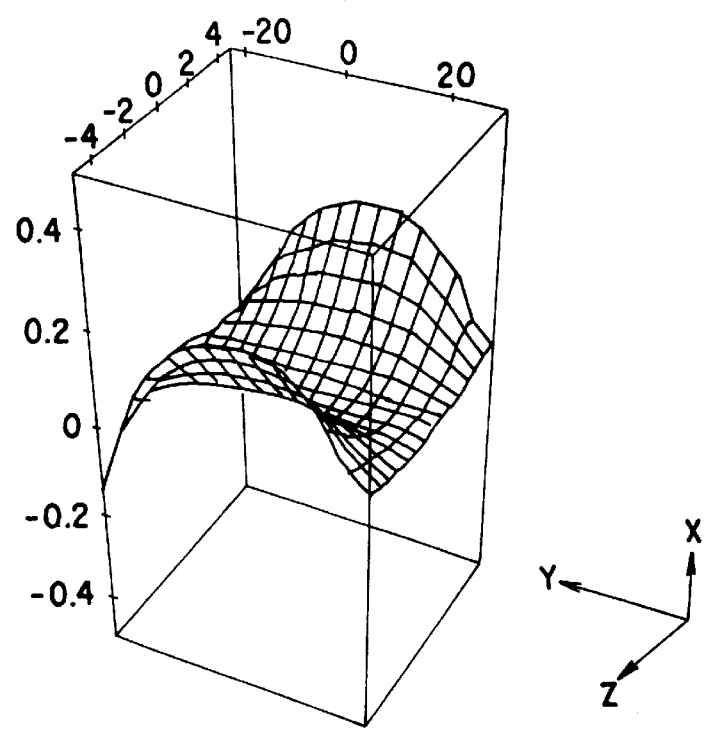
FIG. 28 is a graph showing the offset shape of the emission surface of the first lens of the sub-scanning direction at each point of the lens surface based on the cross point between the light scanning surface and the lens surface (that is, the plane, which includes the optical axis of the optical system and is expanded to the main-scanning direction)

FIG. 28 shows the shape of the second surface of the first image-forming lens 30a of the sub-scanning direction at each point of the main-scanning direction of the lens surface based the cross point between the light scanning surface and the lens surface (that is, the plane, which includes the optical axis of the optical system and is expanded to the main-scanning direction).

FIG. 29 shows the shift of the shape of the second surface of the lens 30a of the sub-scanning direction based on an arc having curvature in a condition that the sub-scanning direction z=0.

FIG. 30 shows an asymmetrical component to the surface expanding to the sub-scanning direction and including the optical axis with respect to the shape of the second surface of the lens 30a.

FIG. 24 shows that the curvature of the lens surface of the sub-scanning direction changes a sign in mid course of the main-scanning direction. Thereby, various characteristics of the lens surface of the sub-scanning direction can be optimized against the wide deflection angle without increasing an absolute value of power of the lens surface in the sub-scanning direction. It is well known that aberration is easily generated as the absolute value of power of the lens surface becomes large. In order to avoid such a disadvantage, the above-mentioned point can improve the performance of the lens.

FIG. 26 shows that a primary differential value between the main-scanning direction and the coordinates of the optical axis at the cross point between the light scanning surface and the lens surface has two extreme values. Thereby, fθ characteristic of the main-scanning direction can be corrected without increasing the thickness of the lens against the wide deflection angle. Particularly, in the case of the plastic-formed lens, it takes much time to mold the lens and the manufacturing cost is increased if the thickness of the lens becomes thick.

FIG. 27 shows that the curvature of the lens surface of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

FIG. 28 shows the shape of the lens surface of the sub-scanning direction when the coordinates of the cross point are set to 0. Moreover, the relative relationship between the peripheral section of the sub-scanning direction and the optical section of the sub-scanning direction is reversed in mid course of the main-scanning direction. This point is largely helpful to improve the various characteristics of the sub-scanning direction over the large width of the sub-scanning direction.

FIG. 29 shows the shift of the shape of the second surface of the lens 30a of the sub-scanning direction based on an arc having curvature in a condition that the sub-scanning direction z=0. In other words, FIG. 29 shows that the second surface of the lens 30a is shaped such that in which at least the term of n is 2 or more in the equation (1), that is, $A_{mn} Y^m \cdot Z^{2n}$ to the sub-scanning direction. Thereby, the second surface of the lens 30a can be shaped such that the relative relationship between the peripheral section of the sub-scanning direction and the optical section of the sub-scanning direction is reversed in mid course of the main-scanning direction.

As shown in FIGS. 23 to 30, similar to the first surface of the first image-forming lens 30a, the second surface is formed to be asymmetrical to the optical axis (y=0, z=0) in the main-scanning direction and the sub-scanning direction. The inclination of the curvature of the sub-scanning direction and that of the main-scanning direction are symmetrically changed with respect to the point crossing point with the optical axis of the main-scanning direction, and no rotation symmetrical surface is included in the main-scanning direction and the sub-scanning direction. Therefore, various characteristics of the lens surface of the main-scanning direction and the sub-scanning direction against the wide deflection angle can be set.

From the above explanation, it can be understood that the both surfaces of the lens 30a have no rotation axis, and a primary differential value between the main-scanning direction and the coordinates of the optical axis at the cross point between the light scanning surface and the lens surface has two extreme values.

Figure 31:
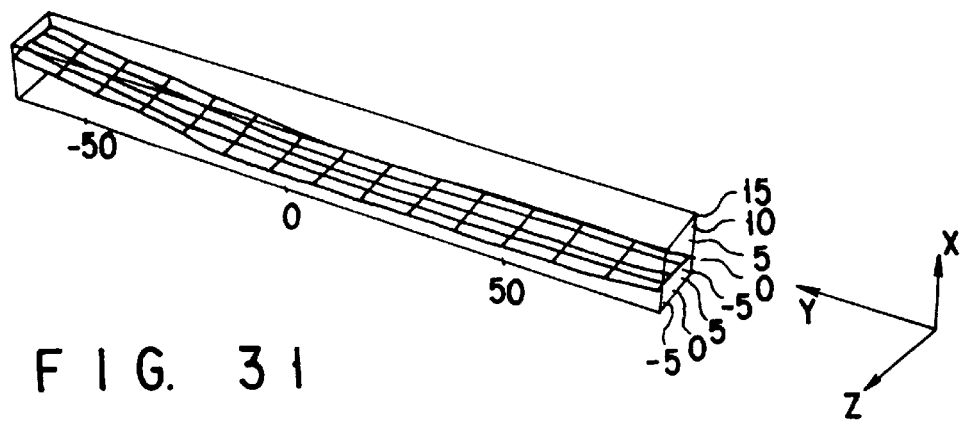
FIG. 31 is a perspective view showing the shape of a incident surface of a second lens of the optical exposer unit of FIG. 2.

FIG. 31 shows the shape of a first surface of the second image-forming lens 30b. As shown in FIG. 31, the first surface of the second image-forming lens 30b is formed to be asymmetrical to the optical axis (y, z)=(0, 0).

Figure 32:
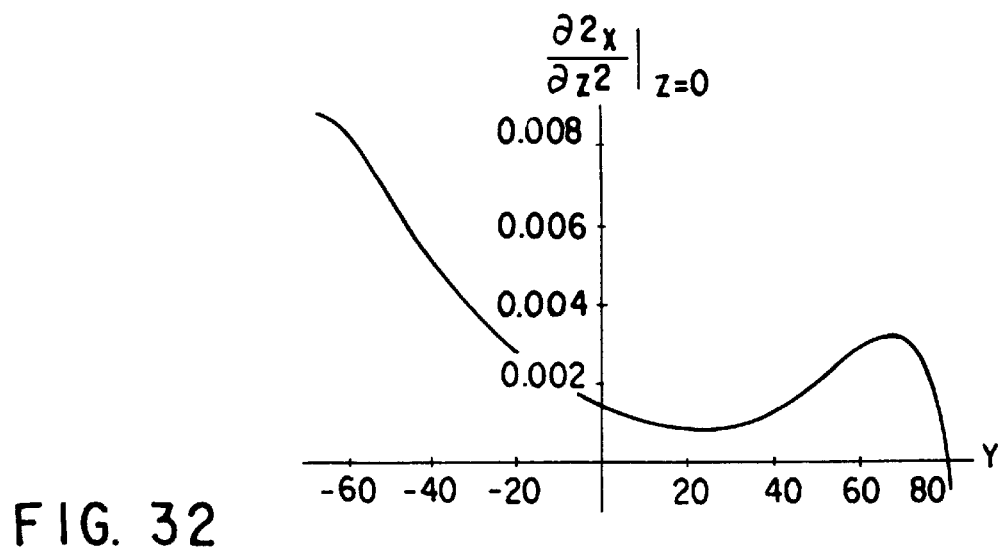
FIG. 32 is a graph showing a curvature of the incident surface of the second lens of the sub-scanning direction at a cross point between a light scanning surface and a lens surface (that is, a plane, which includes an optical axis of the optical system and is expanded to the main-scanning direction)

FIG. 32 shows a curvature of the first surface of the lens 30b in the sub-scanning direction at a cross point between a light scanning surface and a lens surface (that is, a plane, which includes an optical axis of the optical system and is expanded to the main-scanning direction).

Figure 33:
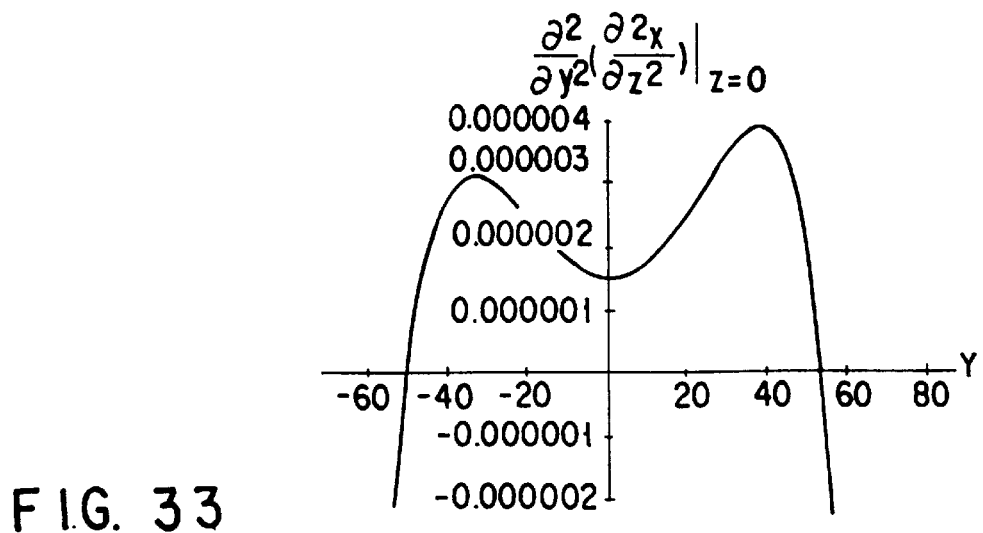
FIG. 33 is a graph showing a secondary differential value between the curvature of the sub-scanning direction and the coordinates of the main-scanning direction at the cross point between the light scanning surface and the lens surface, in connection with the incident surface of the second lens of the optical exposer unit of FIG. 2.

FIG. 33 shows a secondary differential value between the curvature of the sub-scanning direction and the coordinates of the main-scanning direction at the cross point between the light scanning surface and the lens surface.

Figure 34:
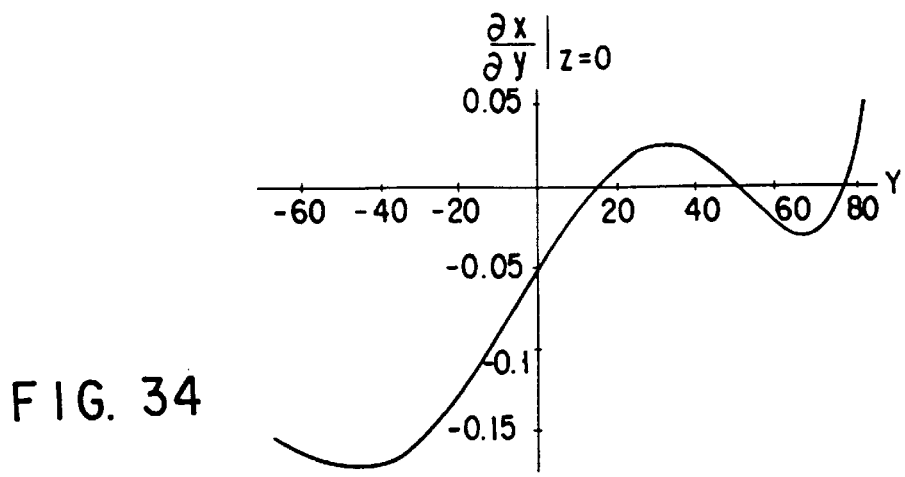
FIG. 34 is a graph showing a differential value between the coordinates of the main-scanning direction and the coordinates of the direction of the optical axis at the cross point between the light scanning surface and the lens surface, in connection with the incident surface of the second lens of the optical exposer unit of FIG. 2.

FIG. 34 shows a differential value between the coordinates of the main-scanning direction and the coordinates of the direction of the optical axis at the cross point between the light scanning surface and the lens surface.

Figure 35:
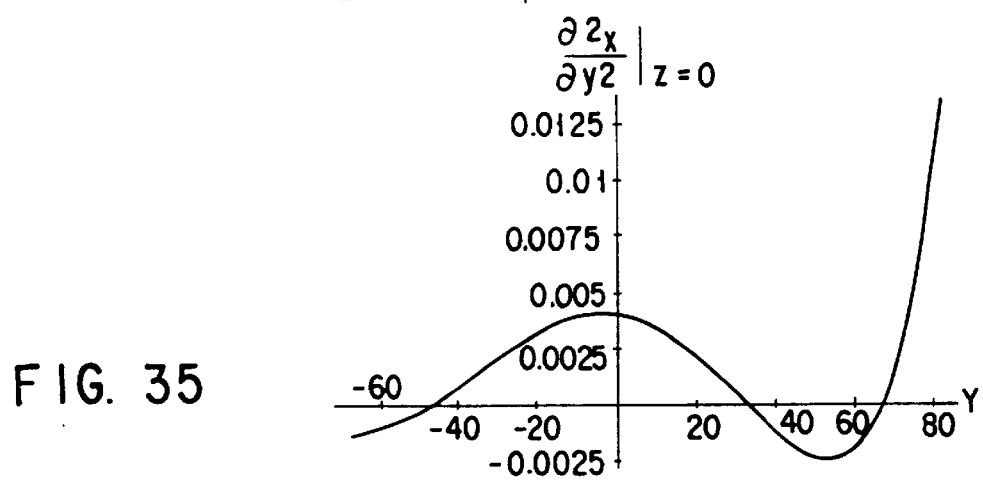
FIG. 35 is a graph showing a curvature of the incident surface of the second lens of the main-scanning direction at the cross point between the light scanning surface and the lens surface (that is, the plane, which includes the optical axis of the optical system and is expanded to the main-scanning direction)

FIG. 35 shows a curvature of the first surface of the lens 30b of the main-scanning direction at the cross point between the light scanning surface and the lens surface (that is, the plane, which includes the optical axis of the optical system and is expanded to the main-scanning direction).

Figure 36:
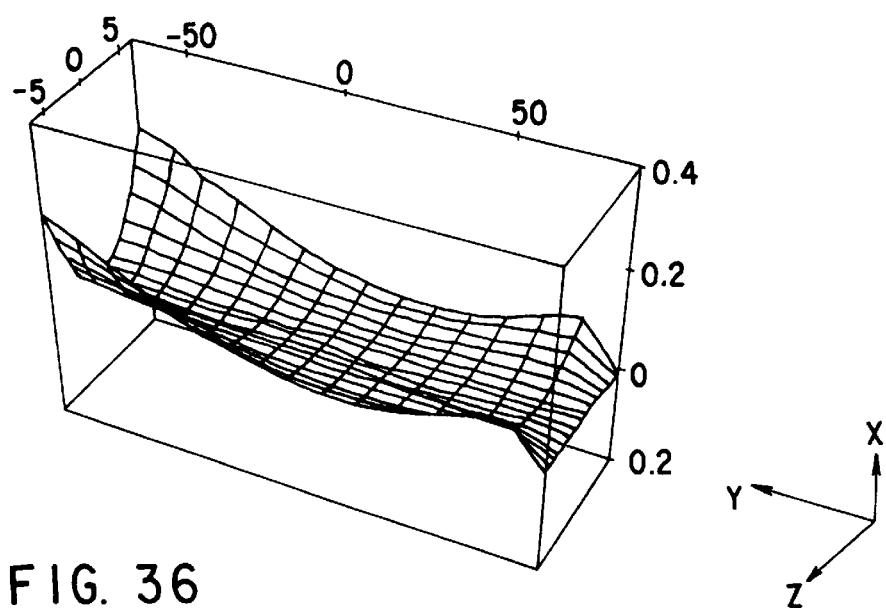
FIG. 36 is a graph showing the offset shape of the incident surface of the second second lens of the sub-scanning direction at each point of the lens surface based on the cross point between the light scanning surface and the lens surface (that is, the plane, which includes the optical axis of the optical system and is expanded to the main-scanning direction)

FIG. 36 shows the shape of the first surface of the second image-forming lens 30b of the sub-scanning direction at each point of the main-scanning direction of the lens surface based the cross point between the light scanning surface and the lens surface (that is, the plane, which includes the optical axis of the optical system and is expanded to the main-scanning direction).

FIG. 37 shows the shift of the shape of the first surface of the lens 30b of the sub-scanning direction based on an arc having curvature in a condition that the sub-scanning direction z=0.

FIG. 38 shows an asymmetrical component to the surface expanding to the sub-scanning direction and including the optical axis with respect to the shape of the first surface of the lens 30b.

As shown in FIGS. 31 to 38, similar to the first surface of the first image-forming lens 30a, the first surface of the lens 30b is formed to be asymmetrical to the optical axis (y=0, z=0) in the main-scanning direction and the sub-scanning direction. The inclinations and the curvatures of the sub-scanning direction and the main-scanning direction are symmetrically changed with respect to the point crossing point with the optical axis of the main-scanning direction, and no rotation symmetrical surface is included in the main-scanning direction and the sub-scanning direction, respectively. Therefore, various characteristics of the lens surface of the main-scanning direction and the sub-scanning direction against the wide deflection angle can be set.

FIG. 32 shows that the curvature of the lens surface of the sub-scanning direction changes a sign in mid course of the main-scanning direction (in the vicinity of y=80). Thereby, various characteristics of the lens surface of the sub-scanning direction can be optimized against the wide deflection angle without increasing an absolute value of power of the lens surface in the sub-scanning direction. It is well known that aberration is easily generated as the absolute value of power of the lens surface becomes large. In order to avoid such a disadvantage, the above-mentioned point can improve the performance of the lens.

FIG. 34 shows that the inclination of the lens in the main-scanning direction changes a sign in mid course of the main-scanning direction. Thereby, the depth of the lens in the optical direction can be reduced, the manufacture of the die can be easier, and the warp of the lens generated in forming the lens can be controlled.

FIG. 35 shows that the curvature of the lens of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

FIG. 37 shows that the shift of the shape of the first surface of the lens 30b of the sub-scanning direction based on an arc having curvature in a condition that the sub-scanning direction z=0. In other words, FIG. 37 shows that the first surface of the lens 30b is shaped such that in which at least the term of n is 2 or more in the equation (1), that is, $A_{mn} Y^m \cdot Z^{2n}$ to the sub-scanning direction. This point is largely helpful to improve the various characteristics of the sub-scanning direction over the large width of the sub-scanning direction.

Figure 39:
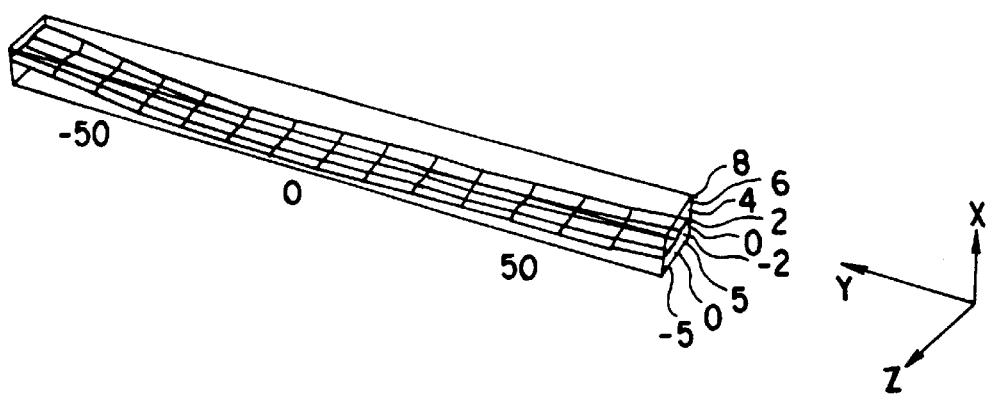
FIG. 39 is a perspective view showing the shape of the emission surface of the second lens of the optical exposer unit of FIG. 2.

FIG. 39 shows the shape of the second surface of the second image-forming lens 30b. As shown in FIG. 39, the second surface of the second image-forming lens 30b is formed to be asymmetrical to the optical axis (y, z)=(0, 0).

Figure 40:
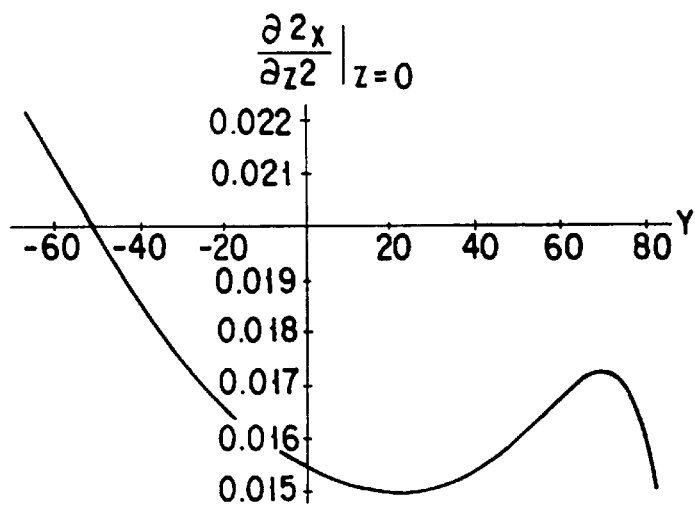
FIG. 40 is a graph showing a curvature of the emission surface of the second lens of the sub-scanning direction at a cross point between a light scanning surface and a lens surface (that is, a plane, which includes an optical axis of the optical system and is expanded to the main-scanning direction)

FIG. 40 shows a curvature of the second surface of the lens 30b of the sub-scanning direction at a cross point between a light scanning surface and a lens surface (that is, a plane, which includes an optical axis of the optical system and is expanded to the main-scanning direction).

Figure 41:
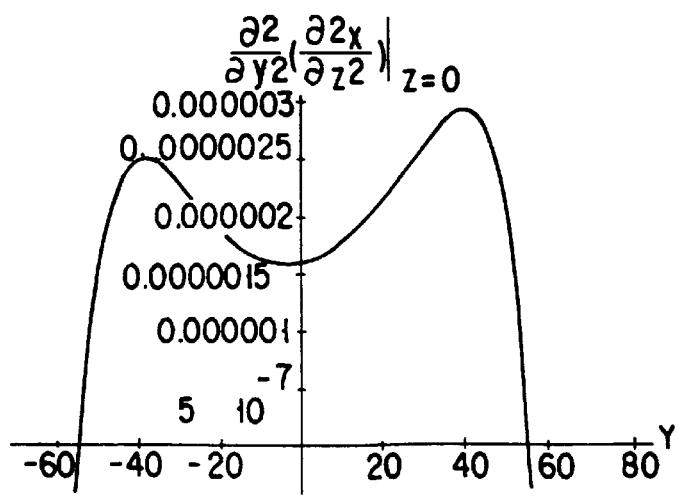
FIG. 41 is a graph showing a secondary differential value between the curvature of the sub-scanning direction and the coordinates of the main-scanning direction at the cross point between the light scanning surface and the lens surface, in connection with the emission surface of the second lens of the optical exposer unit of FIG. 2.

FIG. 41 shows a secondary differential value between the curvature of the sub-scanning direction and the coordinates of the main-scanning direction at the cross point between the light scanning surface and the lens surface.

Figure 42:
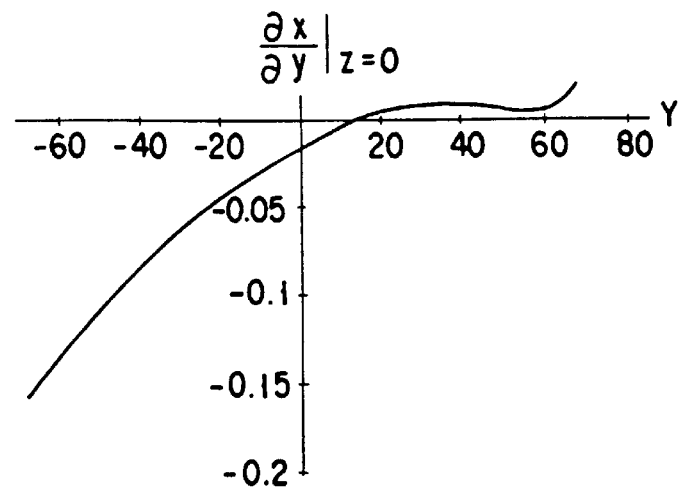
FIG. 42 is a graph showing a differential value between the coordinates of the main-scanning direction and the coordinates of the direction of the optical axis at the cross point between the light scanning surface and the lens surface, in connection with the emission surface of the second lens of the optical exposer unit of FIG. 2.

FIG. 42 shows a differential value between the coordinates of the main-scanning direction and the coordinates of the direction of the optical axis at the cross point between the light scanning surface and the lens surface.

Figure 43:
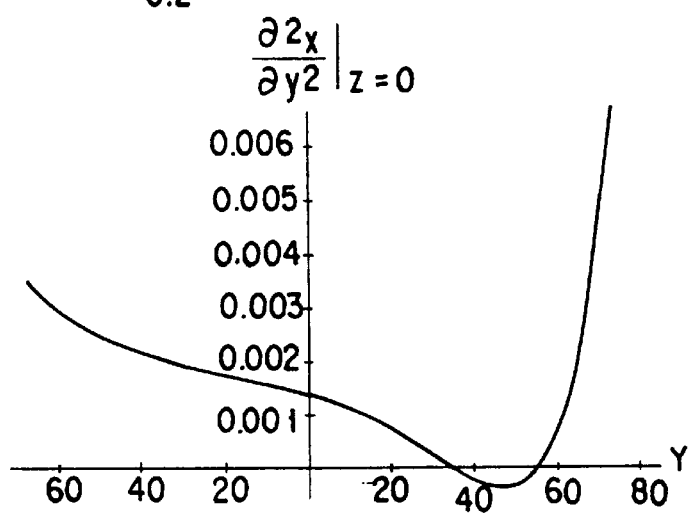
FIG. 43 shows a curvature of the emission surface of the second lens of the main-scanning direction at the cross point between the light scanning surface and the lens surface (that is, the plane, which includes the optical axis of the optical system and is expanded to the main-scanning direction)

FIG. 43 shows a curvature of the second surface of the lens 30b of the main-scanning direction at the cross point between the light scanning surface and the lens surface (that is, the plane, which includes the optical axis of the optical system and is expanded to the main-scanning direction).

Figure 44:
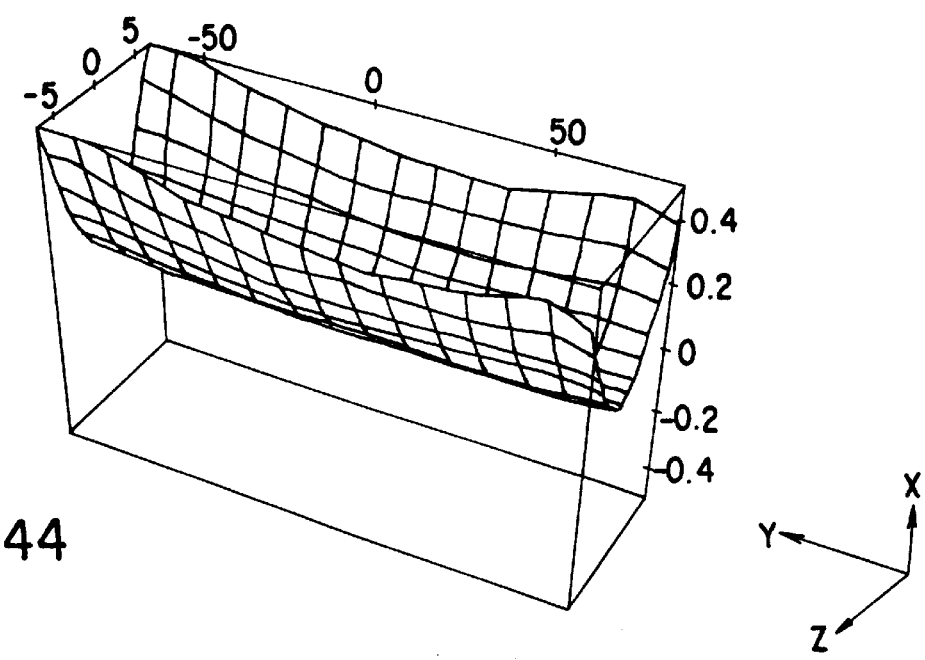
FIG. 44 is a graph showing the offset shape of the emission surface of the second image-forming second lens of the sub-scanning direction at each point of the main-scanning direction of the lens surface based the cross point between the light scanning surface and the lens surface (that is, the plane, which includes the optical axis of the optical system and is expanded to the main-scanning direction)

FIG. 44 shows the shape of the second surface of the second image-forming lens 30b of the sub-scanning direction at each point of the main-scanning direction of the lens surface based the cross point between the light scanning surface and the lens surface (that is, the plane, which includes the optical axis of the optical system and is expanded to the main-scanning direction).

FIG. 45 shows the shift of the shape of the second surface of the lens 30b of the sub-scanning direction based on an arc having curvature in a condition that the sub-scanning direction z=0.

FIG. 46 shows an asymmetrical component to the surface expanding to the sub-scanning direction and including the optical axis with respect to the shape of the second surface of the lens 30b.

As shown in FIGS. 39 to 46, similar to the first surface of the lens 30b, the second surface of the lens 30b is formed to be asymmetrical to the optical axis (y=0, z=0) in the main-scanning direction and the sub-scanning direction. The inclinations and the curvatures of the sub-scanning direction and the main-scanning direction are symmetrically changed with respect to the point crossing point with the optical axis of the main-scanning direction, and no rotation symmetrical surface is included in the main-scanning direction and the sub-scanning direction, respectively. Therefore, various characteristics of the lens surface of the main-scanning direction and the sub-scanning direction against the wide deflection angle. Therefore, various characteristics of the lens surface of the main-scanning direction and the sub-scanning direction against the wide deflection angle.

More specifically, FIG. 40 shows that the curvature of the lens surface of the sub-scanning direction changes a sign in mid course of the main-scanning direction. Thereby, various characteristics of the lens surface of the sub-scanning direction can be optimized against the wide deflection angle without increasing an absolute value of power of the lens surface in the sub-scanning direction. It is well known that aberration is easily generated as the absolute value of power of the lens surface becomes large. In order to avoid such a disadvantage, the above-mentioned point can improve the performance of the lens.

FIG. 42 shows that the inclination of the lens in the main-scanning direction changes a sign in mid course of the main-scanning direction. Thereby, the depth of the lens in the optical direction can be reduced, the manufacture of the die can be easier, and the warp of the lens generated in forming the lens can be controlled.

FIG. 43 shows that the curvature of the lens of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

FIG. 45 shows that the shift of the shape of the second surface of the lens 30b of the sub-scanning direction based on an arc having curvature in a condition that the sub-scanning direction z=0. In other words, FIG. 37 shows that the second surface of the lens 30b is shaped such that in which at least the term of n is 2 or more in the equation (1), that is, $A_{mn}Y^m \cdot Z^{2n}$ to the sub-scanning direction. This point is largely helpful to improve the various characteristics of the sub-scanning direction over the large width of the sub-scanning direction.

Figure 47:
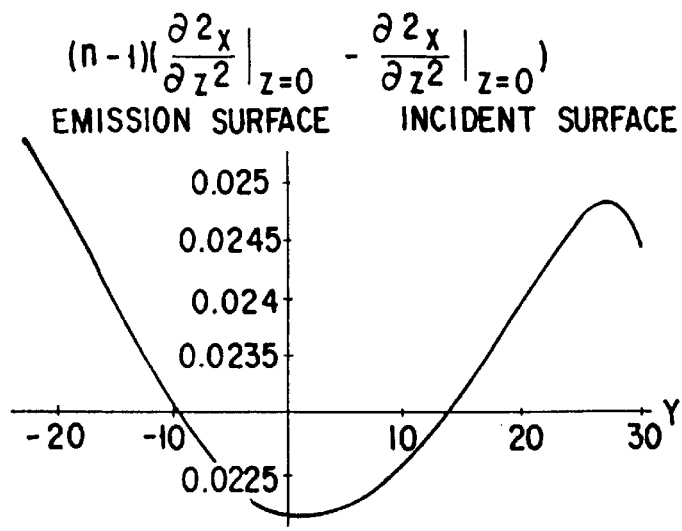
FIG. 47 is a graph showing a distribution of power, which is continuous in the sub-scanning direction of the first lens of the optical exposer unit of FIG. 2.

FIG. 47 shows a distribution of power, which is continuous in the sub-scanning direction in a state that the first image-forming lens 30a is regarded as a thin lens. The distribution can be obtained by the following method.

More specifically, the curvature of the first image forming lens 30a of the sub-scanning direction corresponding to the position of the main-scanning direction of the light incident surface of the lens 30a is subtracted from the curvature of the first image forming lens 30a of the sub-scanning direction corresponding to the position of the main-scanning direction of the light emission surface of the lens 30a. The resultant value is multiplied by a value, which is obtained by removing 1 (refractive index of air) from a refractive index n of PMMA, serving as a material of the lens 30a, thereby the above distribution of power can be obtained.

Figure 48:
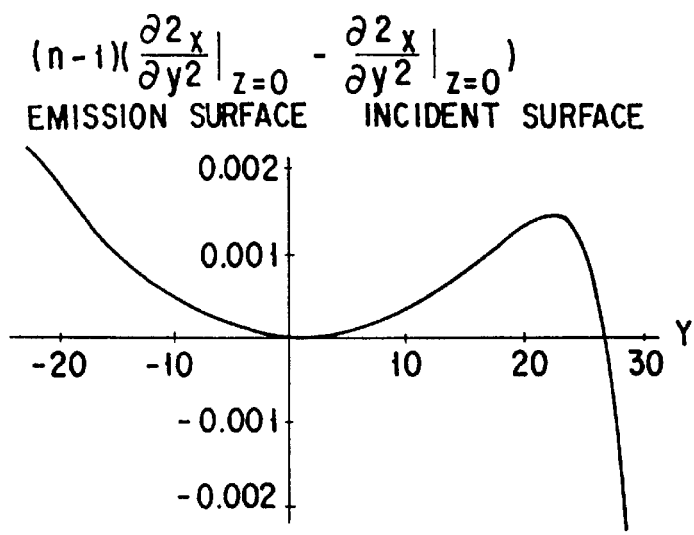
FIG. 48 is a graph showing a distribution of power, which is continuous in the main-scanning direction of the first lens of the optical exposer unit of FIG. 2.

FIG. 48 also shows a distribution of power, which is continuous in the main-scanning direction in a state that the first image-forming lens 30a is regarded as a thin lens. The distribution can be obtained by the same method as the case of FIG. 47.

Figure 49:
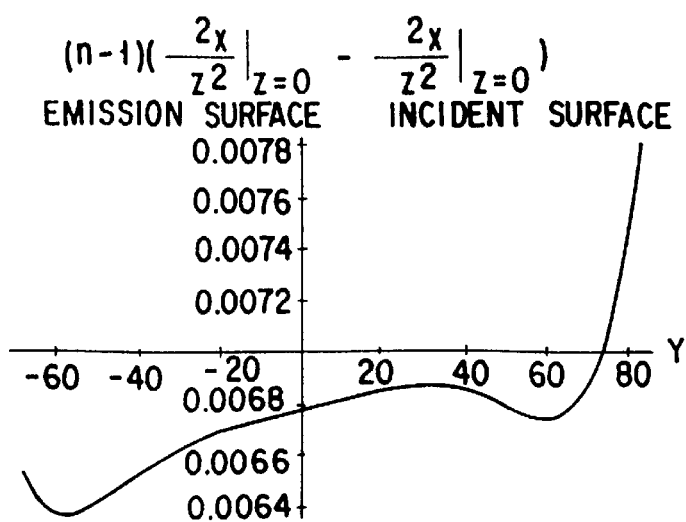
FIG. 49 is a graph showing a distribution of power, which is continuous in the sub-scanning direction of the second lens of the optical exposer unit of FIG. 2.

FIG. 49 shows a distribution of power, which is continuous in the sub-scanning direction in a state that the second image-forming lens 30b is regarded as a thin lens. The distribution can be obtained by the following method.

More specifically, the curvature of the second image forming lens 30b of the sub-scanning direction corresponding to the position of the main-scanning direction of the light incident surface of the lens 30b is subtracted from the curvature of the first image forming lens 30b of the sub-scanning direction corresponding to the position of the main-scanning direction of the light emission surface of the lens 30b. The resultant value is multiplied by a value, which is obtained by removing 1 (refractive index of air) from a refractive index n of PMMA, serving as a material of the lens 30b, thereby the above distribution of power can be obtained.

Figure 50:
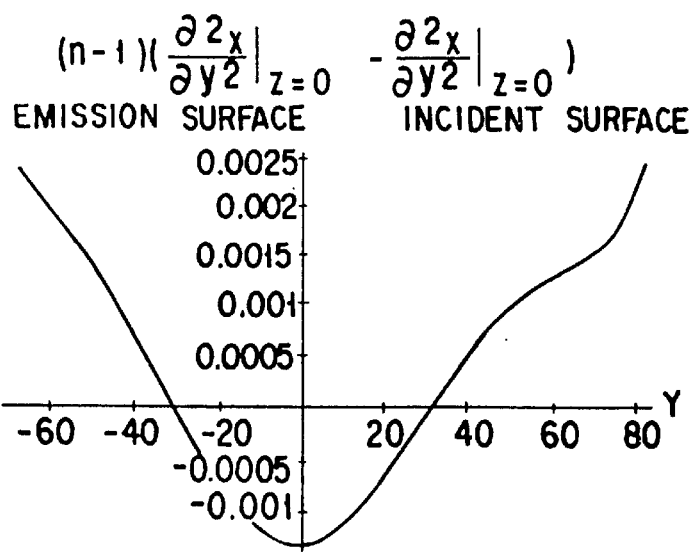
FIG. 50 is a graph showing a distribution of power, which is continuous in the main-scanning direction of the second lens of the optical exposer unit of FIG. 2.

FIG. 50 also shows a distribution of power, which is continuous in the main-scanning direction in a state that the first image-forming lens 30b is regarded as a thin lens. The distribution can be obtained by the same method as the case of FIG. 47.

As shown in FIGS. 47 and 49, it is recognized that the first and second image-forming lenses 30a and 30b have positive power in the sub-scanning direction in the entire areas including the portion close to the optical axis of the main-scanning direction and the peripheral section.

As shown in FIG. 48, it is recognized that power of the lens 30a in the main-scanning direction becomes "0" at the portion close the optical axis of the main-scanning direction. Also, shown in FIG. 50, it is recognized that power of the lens 30b in the main-scanning direction becomes "negative" at the portion close the optical axis of the main-scanning direction, and "positive" at the peripheral section.

Figure 51:
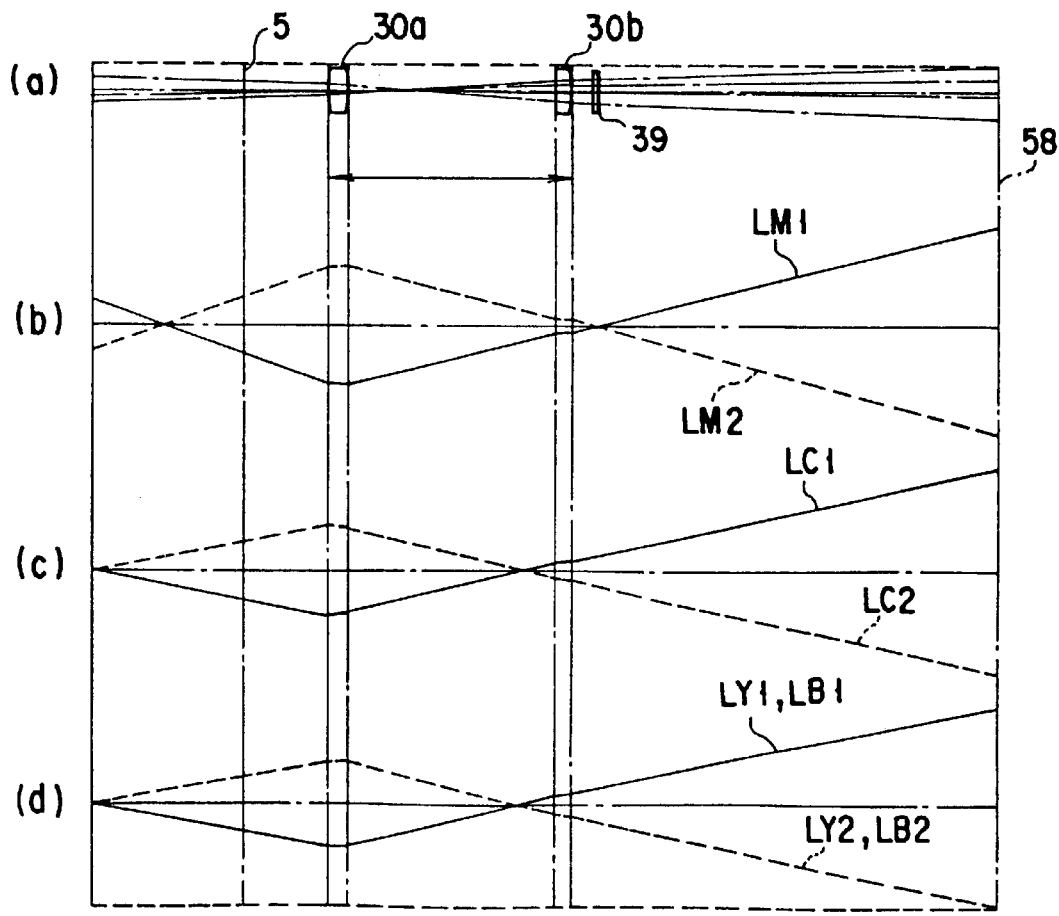
FIG. 51 is a schematic view showing the relative position of the laser beams in the sub-scanning direction after passing through a hybrid cylinder lens of the optical exposer unit of FIG. 2.

FIG. 51 shows the relative position of each pair of two laser beams (LYa and LYB, LMa and LMb, LCa and LCb, LBa and LBb) emitted from each pair of two light sources 3 (first yellow laser 3Ya and second yellow laser 3Yb, first magenta laser 3Ma and second magenta laser 3Mb, first cyan laser 3Ca and second cyan laser 3Cb, first black laser 3Ba and second black laser 3Bb) in the sub-scanning direction. As shown in FIG. 51, the characteristic of each of the lenses are defined such that the pair of two laser beams, that is, Ni (i is a positive integer number, i=2) laser beams are crossed each other between the first surface of the first image forming lens 30a (light incident surface) and the image surface, particularly between the first surface of the lens 30a and vicinity of the second surface of the lens 30b. Thereby, the beam space between the Ni (i=2) laser beams can be constantly maintained regardless of the change of the temperature and humidity.

FIGS. 52 to 64 specifically explain the various characteristics provided by the first and second image forming lenses 30a and 30b whose shapes are defined by the equation (1) in a state that the image surface beam position of the main-scanning direction is a horizontal axis.

Figure 52:
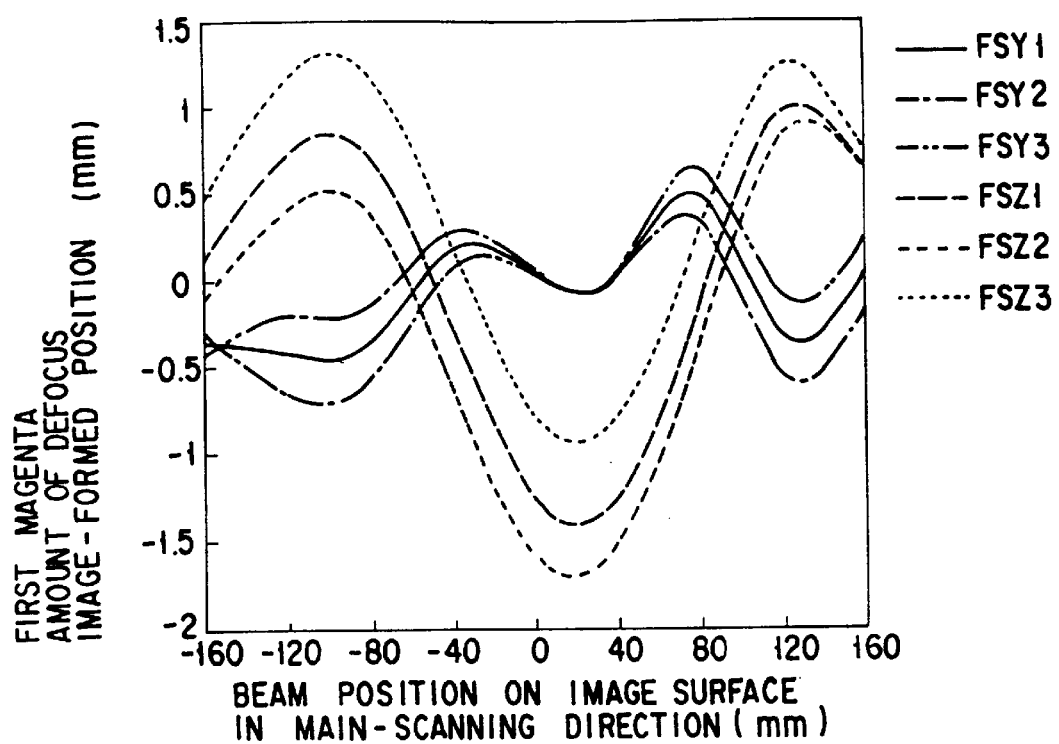
FIG. 52 is a graph showing the variation of the laser beam emitted from a first laser element for magenta in the direction of the main-scanning direction, that is, an amount of de-focus of the laser laser beam in each of the main-scanning direction and the sub-scanning direction from the image surface to an image-formed position.

FIG. 52 relates to the laser beam LMa emitted from the first magenta laser 3Ma. In other words, FIG. 52 shows the variation of the laser beam LMa in the direction of the main-scanning direction, that is, an amount of de-focus of the laser laser beam in each of the main-scanning direction and the sub-scanning direction on the image surface in a state that the refractive index is changed. In this case, FSY: main-scanning direction, FSZ: sub-scanning direction, and added numbers 1, 2, and 3 correspond to the conditions of refractive index n=1.4855, n=1.4821, and n=1.4889, respectively.

Figure 53:
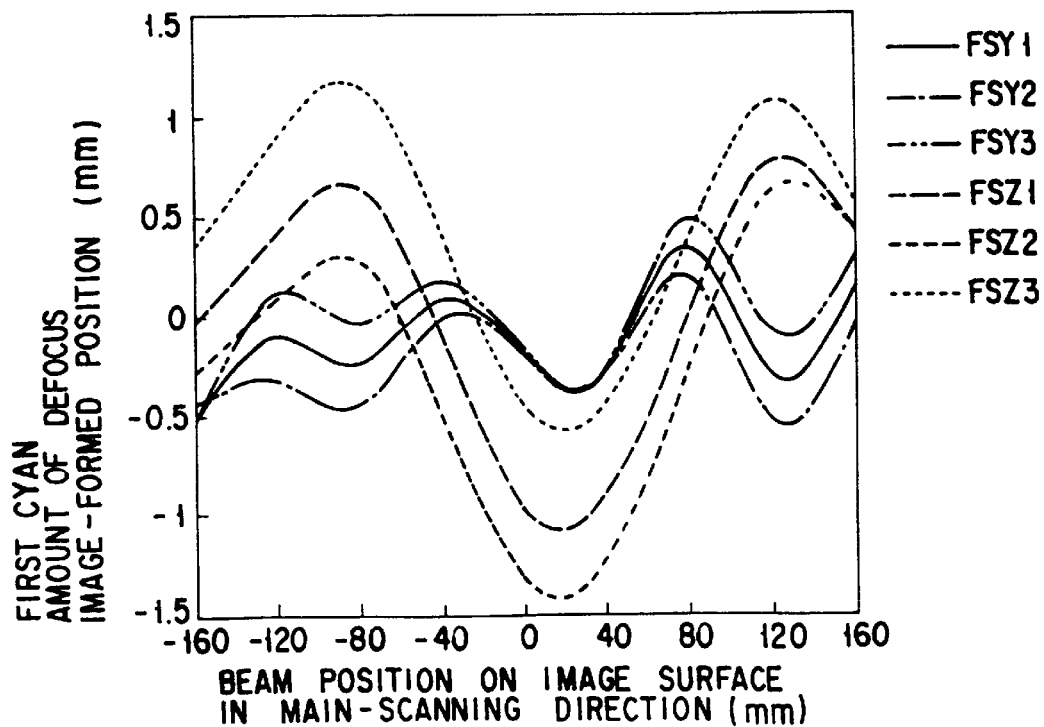
FIG. 53 is a graph showing the variation of the laser beam emitted from the first laser element for cyan in the direction of the main-scanning direction, that is, an amount of de-focus of the laser laser beam in each of the main-scanning direction and the sub-scanning direction from the image surface to an image-formed position.

FIG. 53 relates to the laser beam LCa emitted from the first cyan laser 3Ca. In other words, similar to the case of FIG. 52, FIG. 53 shows the variation of the laser beam LCa in the direction of the main-scanning direction, that is, an amount of de-focus of the laser laser beam in each of the main-scanning direction and the sub-scanning direction on the image surface in a state that the refractive index is changed. In this case, FSY: main-scanning direction, FSZ: sub-scanning direction, and added numbers 1, 2, and 3 correspond to the conditions of refractive index n=1.4855, n=1.4821, and n=1.4889, respectively.

Figure 54:
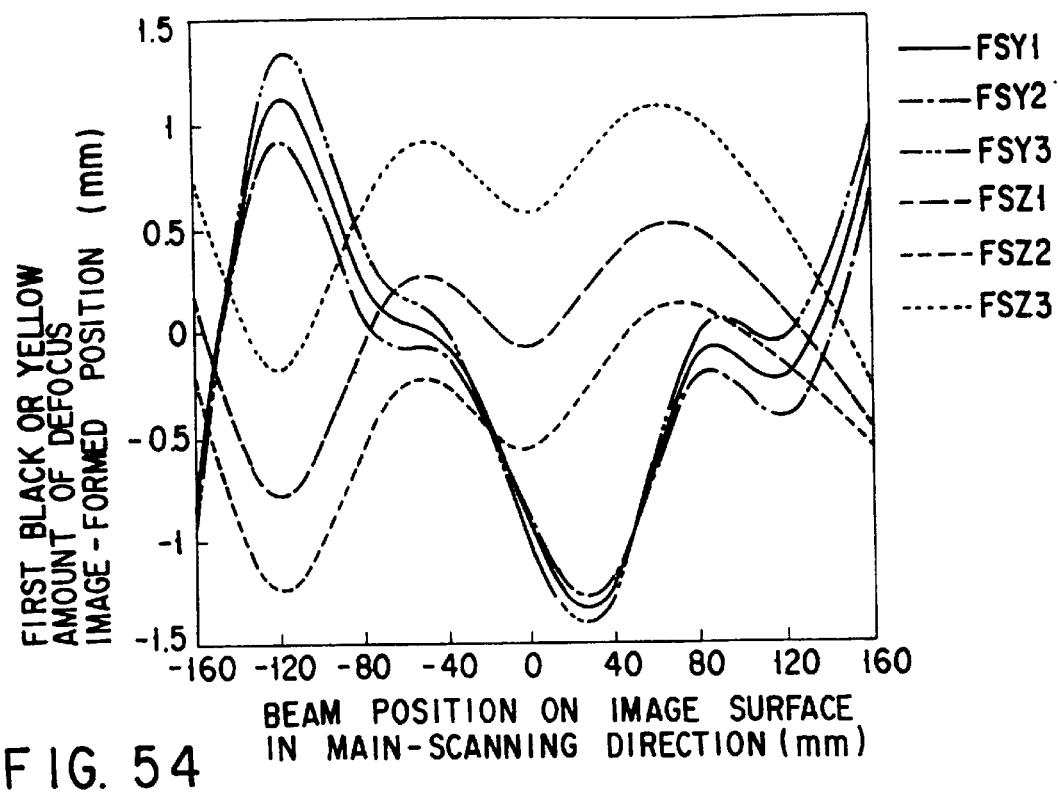
FIG. 54 is a graph showing the variation of the laser beams emitted from each of first laser elements for black or yellow in the direction of the main-scanning direction, that is, an amount of de-focus of the laser beam in each of the main-scanning direction and the sub-scanning direction from the image surface to an image-formed position.

FIG. 54 relates to the laser beams LBa and LYa, which are emitted from the first black laser 3B and the first yellow laser 3Ya, respectively (the laser beams LBa and LYa are symmetrical to the sub-scanning direction in a state that the optical axis of the optical system is sandwiched between these laser beams as shown in Table 1). In other words, similar to the case of FIG. 52, FIG. 54 shows the variation of each of the laser beams LBa and LYa in the direction of the main-scanning direction, that is, an amount of de-focus of the laser laser beam in each of the main-scanning direction and the sub-scanning direction on the image surface in a state that the refractive index is changed. In this case, FSY:

main-scanning direction, FSZ: sub-scanning direction, and added numbers 1, 2, and 3 correspond to the conditions of refractive index n=1.4855, n=1.4821, and n=1.4889, respectively.

As shown in FIGS. 52 to 54, the amount of de-focus of the laser beam is controlled to be within the range of ±1.5 mm at its maximum.

Figure 55:
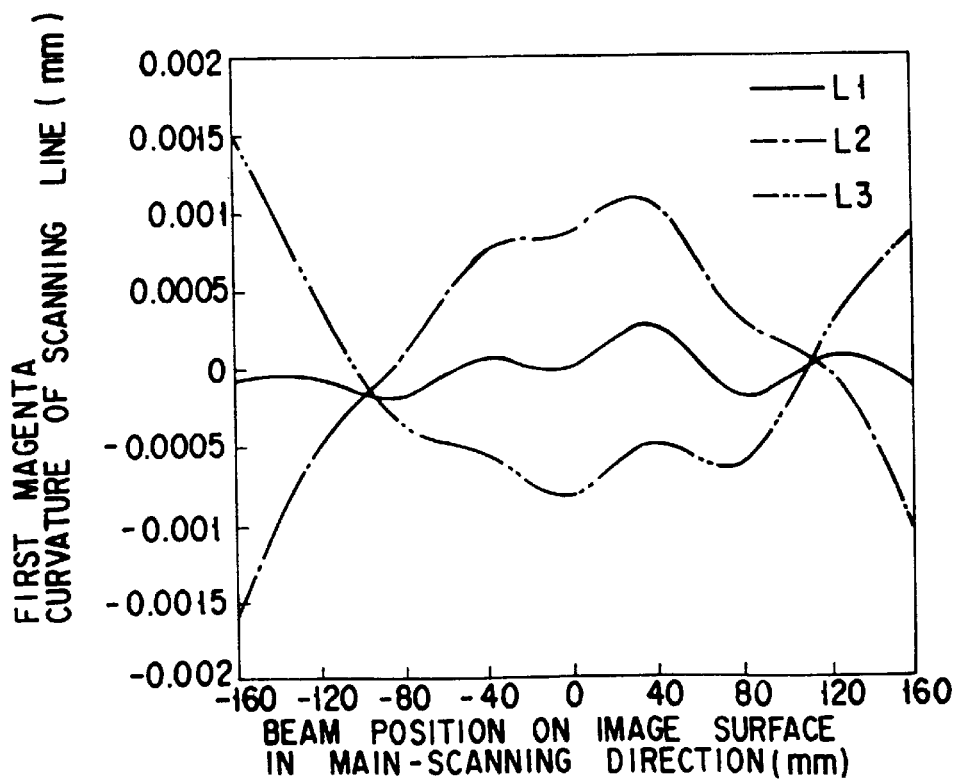
FIG. 55 is a graph showing the value of the scanning line curve of the laser beam emitted from the first laser element for magenta versus a position of the laser beam in the main-scanning direction.

FIG. 55 relates to the laser beam LMa emitted from the first magenta laser 3Ma. In other words, FIG. 55 shows the value of the scanning line curve of the laser beam in the main-scanning direction on the image surface in a state that the refractive index is changed. In this case, added numbers 1, 2, and 3 correspond to the conditions of refractive index n=1.4855, n=1.4821, and n=1.4889, respectively.

Figure 56:
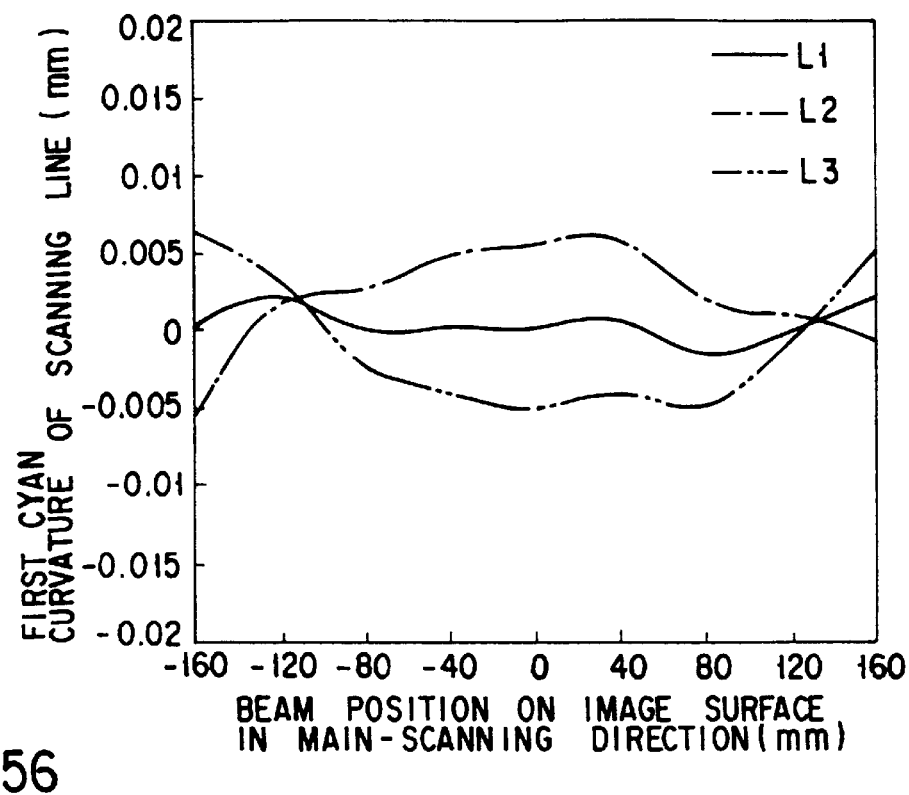
FIG. 56 is a graph showing the value of the scanning line curve of the laser beam emitted from the first laser element for cyan versus a position of the laser beam in the main-scanning direction.

FIG. 56 relates to the laser beam LCa emitted from the first magenta laser 3Ca. In other words, similar to the case of FIG. 55, FIG. 56 shows the value of the scanning line curve of the laser beam in the main-scanning direction on the image surface in a state that the refractive index is changed. In this case, added numbers 1, 2, and 3 correspond to the conditions of refractive index n=1.4855, n=1.4821, and n=1.4889, respectively.

Figure 57:
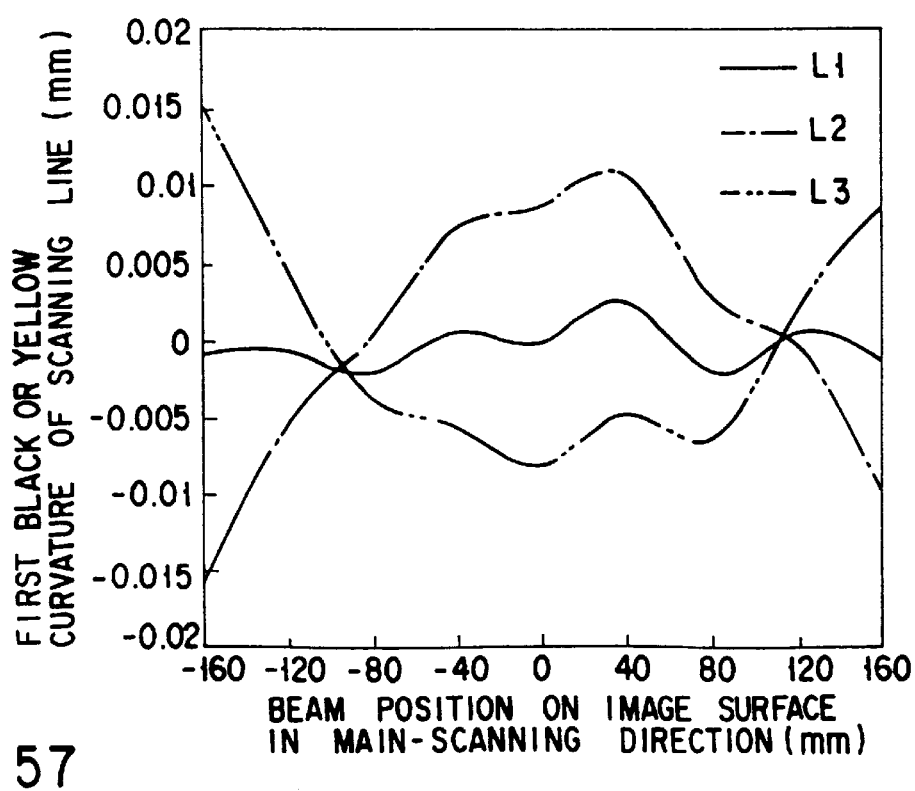
FIG. 57 is a graph showing the value of the scanning line curve of each of the laser beams emitted from each of the first laser elements for black or yellow versus a position of the laser beam in the main-scanning direction.

FIG. 57 relates to one of the laser beam LBa and laser beam LYa, which is emitted from the first black laser 3B or the first yellow laser 3Ya, respectively. In other words, similar to the case of FIG. 55, FIG. 57 shows the value of the scanning line curve of the laser beam in the main-scanning direction on the image surface in a state that the refractive index is changed. In this case, added numbers 1, 2, and 3 correspond to the conditions of refractive index n=1.4855, n=1.4821, and n=1.4889, respectively.

As shown in FIGS. 55 to 57, the value of the scanning line curve of the laser beam is controlled to be within the range of ±0.015 mm at its maximum.

Figure 58:
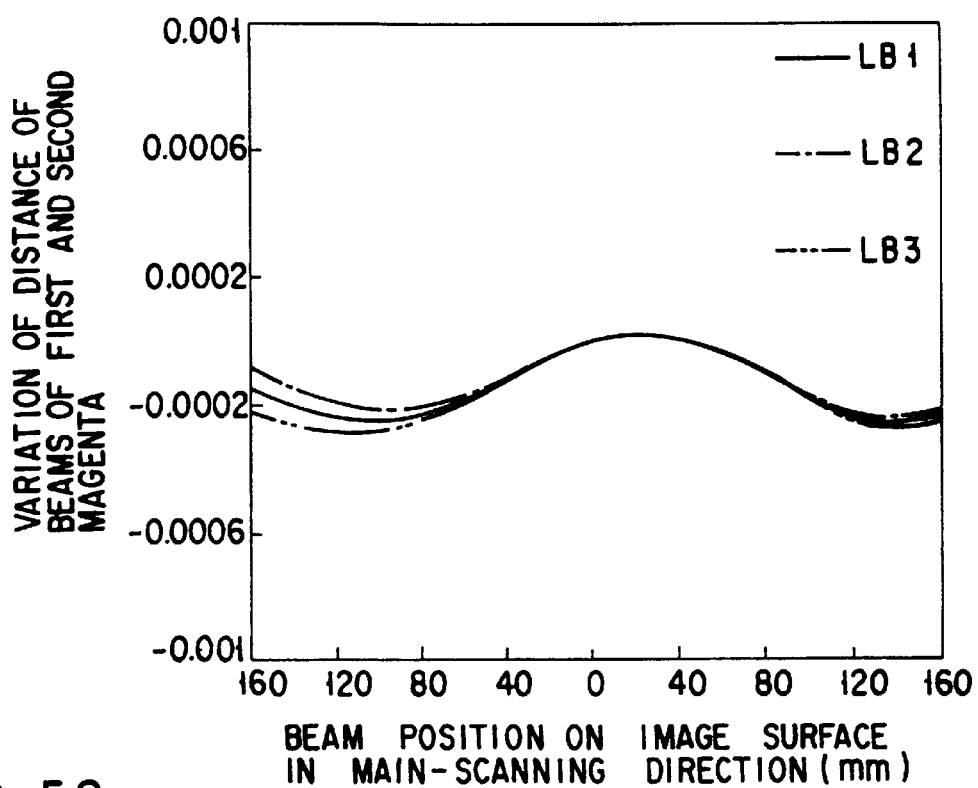
FIG. 58 is a graph showing the value of variation of distance of the positions of the laser beams emitted from the first and second laser elements for magenta versus a position of the laser beam in the main-scanning direction on the image surface.

FIG. 58 relates to the laser beams LMa and LMb emitted from the first and second magenta lasers 3Ma and 3Mb, respectively. In other words, FIG. 58 shows the value of the shift (variation of distance) between these laser beams in the sub-scanning direction on the image surface in a state that the refractive index is changed. In this case, added numbers 1, 2, and 3 correspond to the conditions of refractive index n=1.4855, n=1.4821, and n=1.4889, respectively.

Figure 59:
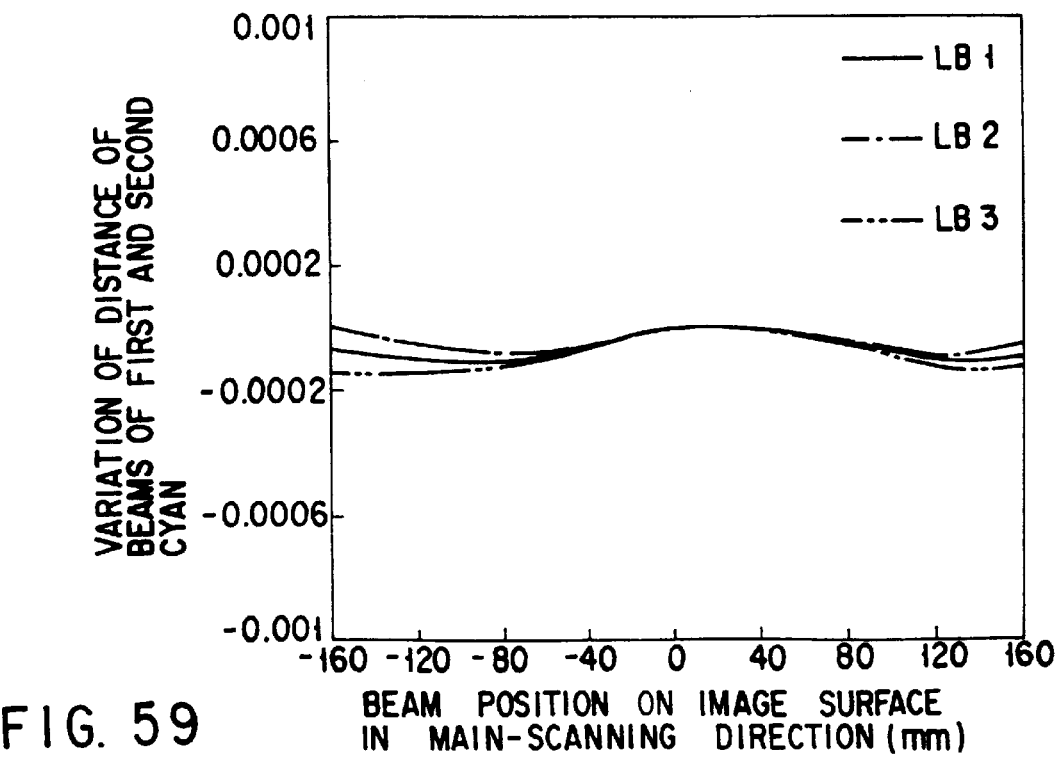
FIG. 59 is a graph showing the value of variation of distance of the positions of the laser beams emitted from the first and second laser elements for cyan versus a position of the laser beam in the main-scanning direction on the image surface.

FIG. 59 relates to the laser beams LCa and LCb emitted from the first and second cyan lasers 3Ca and 3Cb, respectively. In other words, similar to the case of FIG. 58, FIG. 59 shows the value of the shift (variation of distance) between these laser beams in the sub-scanning direction on the image surface in a state that the refractive index is changed. In this case, added numbers 1, 2, and 3 correspond to the conditions of refractive index n=1.4855, n=1.4821, and n=1.4889, respectively.

Figure 60:
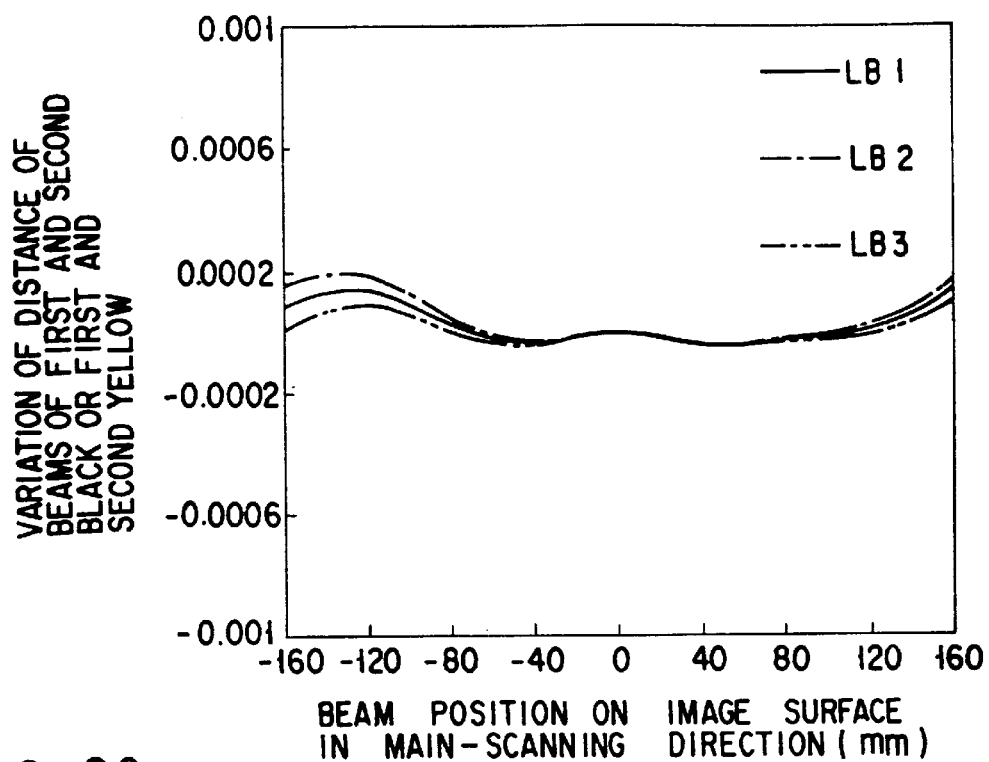
FIG. 60 is a graph showing the value of variation of distance of the positions of the laser beams, emitted from the first and second laser elements for black or first and second laser elements for yellow, versus a position of the laser beam in the main-scanning direction on the image surface.

FIG. 60 relates to a pair of the laser beams LBa and LBb, or LYa and LYB, which are emitted from the first and second black lasers 3Ba and 3Bb, or the first and second yellow lasers 3Ya and 3Yb, respectively. In other words, similar to the case of FIG. 58, FIG. 60 shows the value of the shift (variation of distance) between the laser beams in the sub-scanning direction on the image surface in a state that the refractive index is changed. In this case, added numbers 1, 2, and 3 correspond to the conditions of refractive index n=1.4855, n=1.4821, and n=1.4889, respectively.

As shown in FIGS. 58 to 60, the value of the variation of the beam distance is controlled to be within the range of +0.0002 mm at its maximum.

Figure 61:
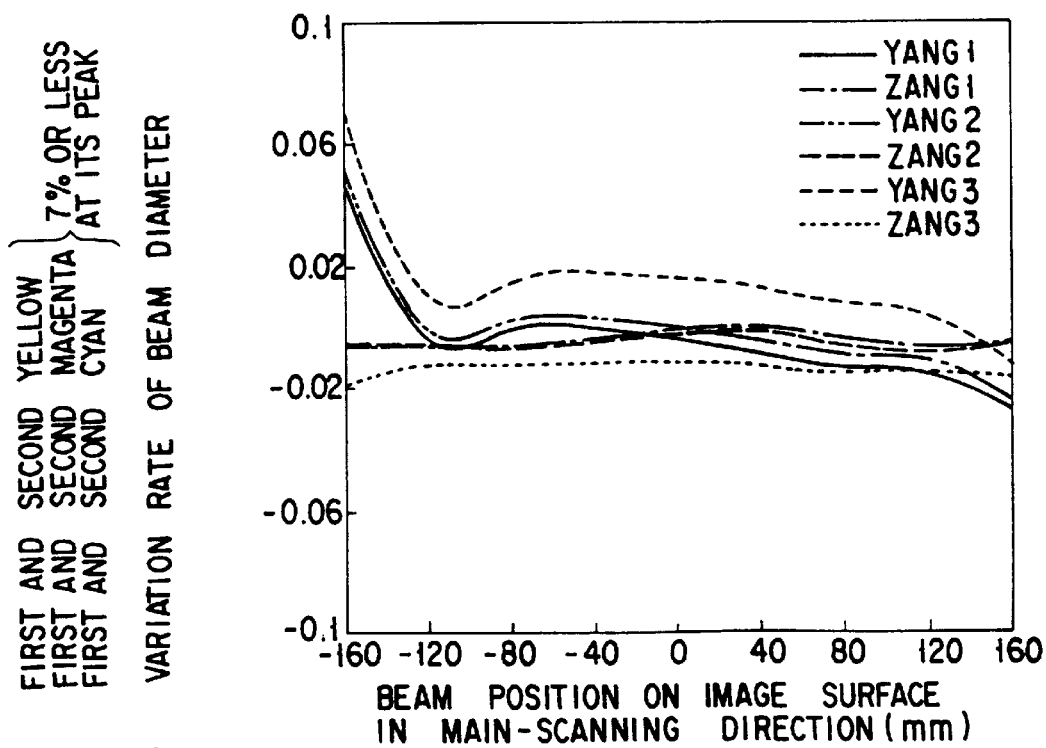
FIG. 61 is a graph showing the variation ratio of an inverse of a converging angle, that is, the variation ratio of each laser beam diameter in the main-scanning direction and the sub-scanning direction on the image surface, in connection with each of the laser beams emitted from each of the first laser element for magenta, the first laser element for black, and the first laser element for yellow.

FIG. 61 relates to the first to fourth laser beams LYa and LYb, LMa and LMb, LCa and LCb, and LBa and LBb. In other words, FIG. 60 shows the variation ratio of an inverse of a converging angle, that is, the variation ratio of each laser beam diameter in the main-scanning direction and the sub-scanning direction on the image surface. In this case, YANG: main-scanning direction, ZYAG: sub-scanning direction, and added numbers 1, 2, and 3 correspond to the conditions of refractive index n=1.4855, n=1.4821, and n=1.4889, respectively. As shown in FIG. 61, the variation ratio of the beam diameter is controlled to be about 7% at its peak.

Figure 62:
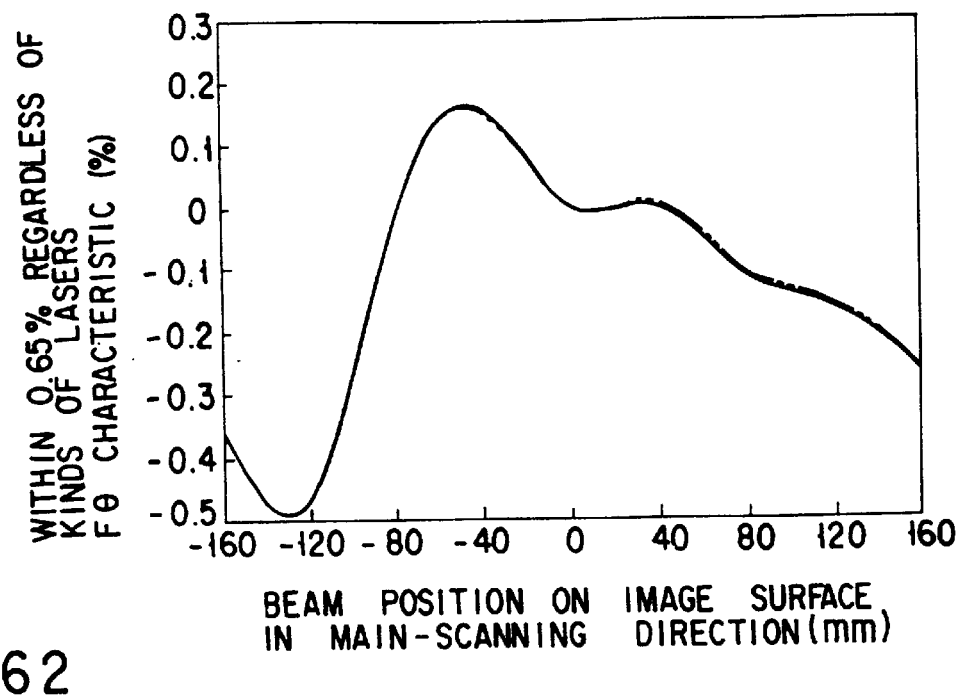
FIG. 62 is a graph showing the variation ratio of the fθ characteristic of each laser beam in the main scanning direction on the image surface, in connection with each of the laser beams emitted from each of the first laser element for magenta, the first laser element for cyan, the first laser element for black, and the first laser element for yellow.

FIG. 62 relates to the first to fourth laser beams LYa, LMa, LCa, and LBa. In other words, FIG. 62 shows the variation ratio of the fθ characteristic of each laser beam in the main scanning direction on the image surface. As shown in FIG. 62, the fθ characteristic is controlled to be within the range of about 0.65% regardless of the kinds of the laser beams.

Figure 63:
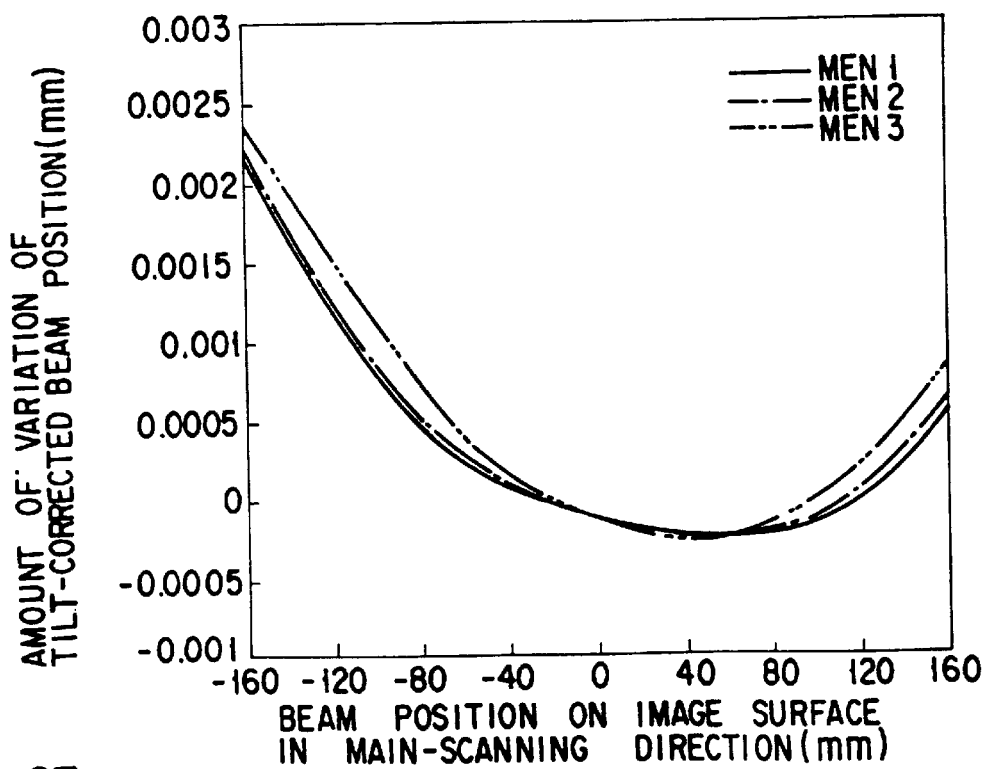
FIG. 63 is a graph showing the variation of the beam position of the sub-scanning direction on the image surface in a state that the tilts of the deflect surfaces of the polygon mirror is contained in one minute, in connection with each of the laser beams emitted from each of the first laser element for magenta, the first laser element for cyan, the first laser element for black, and the first laser element for yellow.

FIG. 63 relates to the first to fourth laser beams LYa, LMa, LCa, and LBa. In other words, FIG. 63 shows the variation of the beam position of the sub-scanning direction on the image surface in a state that the tilts of the deflect surface of the polygon mirror 5 is contained in one minute (1/60 degree). The added numbers 1 and 2 correspond to the laser beams LMa and LCa. The added number 3 corresponds to both laser beams LBa and LYa since the laser beams LBa and LYa are symmetrical to sandwich the optical axis of the optical system therebetween. As shown in FIG. 63, the variation of the beam position is controlled to be 0.003 mm at its maximum. In a case where there is no need of correcting the position error of each of the tilts of the deflect surfaces of the polygon mirror 5 against the wide deflection angle, the variation of the beam position is 0.186, and the correction ratio of the position error of the tilt is 1/62 in the optical system having the image forming lenses 30a and 30b.

FIG. 64 relates to the first to fourth laser beams LYa, LMa, LCa, and LBa. In other words, FIG. 64 shows the variation ratio of transmissivity of each laser beam against the image surface beam position in the main scanning direction on the image surface. In this case, added numbers 1 and 2 correspond to the laser beams LMa and LCa, respectively, and added number 3 corresponds to both laser beams LYa and LBa. As shown in FIG. 64, the variation ratio of the transmissivity is controlled to be within the range of about 3.5% regardless of the kinds of the laser beams.

As explained above, the shapes of the light incident surface and the light emission surface of the first image forming lens 30a and those of the second image forming lens 30b are optimized based on the equation (1). Thereby, the aberration characteristics such as spherical aberration on the image surface, comma aberration, image surface curvature, or multiplication error can be controlled to be within a predetermined range by only two image forming lenses.

In other words, the scanning surface expanding to the main-scanning direction and the shape of the line crossing the lens surface are formed to be asymmetrical to the optical axis passing through the lens surface. Thereby, the image-formed surface of the main-scanning direction can be prevented from largely deviating from the image surface. Also, the fθ characteristics can be prevented from being shifted in a state that the optical axis of the main-scanning direction is sandwiched therebetween. Moreover, in the laser beam, which is largely shifted from the optical axis, the amounts of the scattering laser beam and ghost laser beams in the main-scanning direction and the sub-scanning direction can be reduced. Further, the amount of variation of the intensity distribution of the beam passing through any positions of the main-scanning direction can be controlled to be less than a predetermined range. Also, since the curve of the main scanning line can be reduced, the number of the laser beams emitted from the light source is Ni (i=a positive integral number), the variation of the beam space of the respective laser beams in the sub-scanning direction can be controlled. Furthermore, the movement of the image surface in the sub-scanning direction, which is caused by the position error of each of the tilts of the deflect surfaces of the polygon mirror against the wide deflection angle, can be reduced.

The following will explain a modification of the first embodiment shown in FIGS. 1 to 64.

Figure 70:
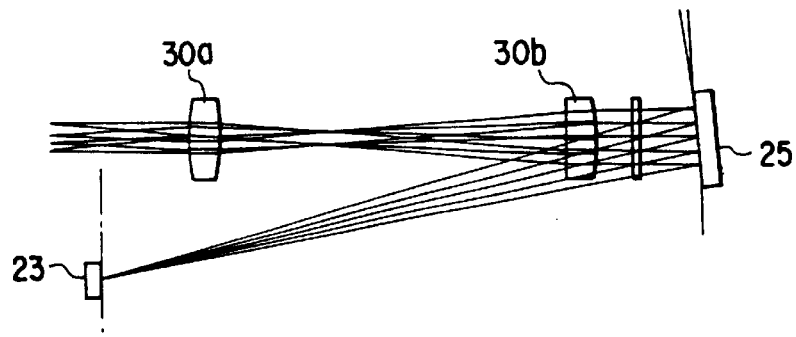
FIG. 70 is a cross sectional plane view showing a state that a distance between the beams is detected in the optical exposer unit of FIG. 65.
Figure 69:
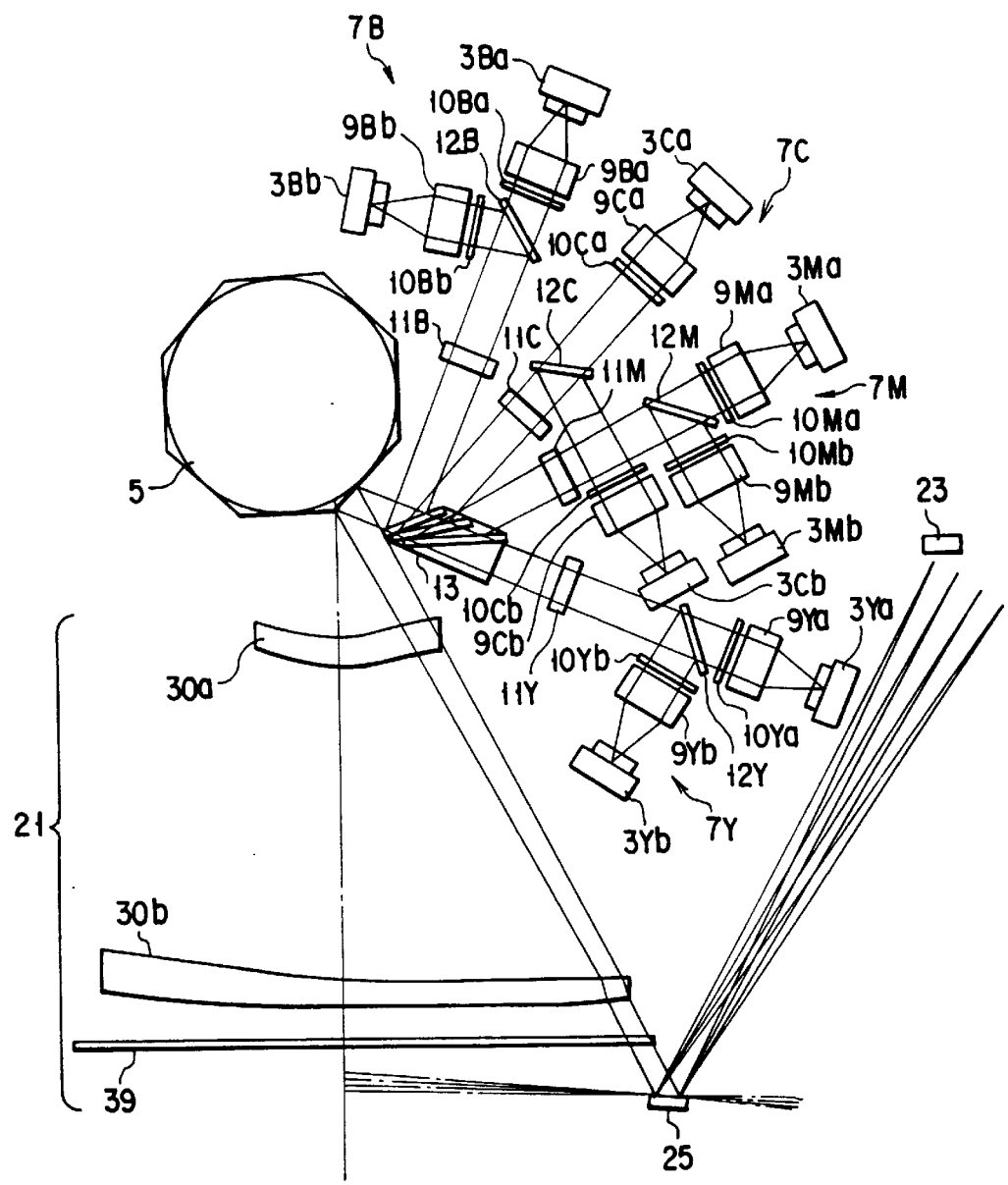
FIG. 69 is a schematic plane view showing a state that a distance between the beams is detected in the optical exposer unit of FIG. 65.

FIG. 69 is a schematic plane view showing only optical elements in a state that the mirrors of the optical exposer unit 1 is removed. FIG. 70 is a partial side view showing the position of the synchronization detector 23 of FIG. 69 and the horizontal synchronization mirror 25 having only one plane (reflection surface) in a state that the laser beam directing from the mirror 25 to the detector 23 is seen from the sub-scanning direction.

As shown in FIGS. 69 and 70, timing of each of the laser beams LYa and LYb, LMa and LMb, LCa and LCb, and LBa and LBb is changed so as to be incident onto a predetermined position of the detector 23 in order. The detector 23 is the general position for detecting the position of each of the laser beams. The mirror 25 bends the laser beam passed through the second image forming lens 30b. Due to this, in a case where the detector 23 detects that the laser beam is shifted by some reason, the beam distance of the respective laser beams can be fed back to the light source having a beam distance change mechanism of a second embodiment of FIG. 68 (to be described later) in order to correct the shift of the beam distance in the sub-scanning direction.

The following will explain the detection of the horizontal synchronization of the respective laser beams.

First, the first yellow laser 3Ya of the first light source 3Y is emitted. Thereby, the laser beam LYa, which is bent by the mirror 25 and separated from the optical axis by a predetermined distance in the sub-scanning direction, is made incident onto a predetermined position of the synchronization detector 23. The synchronization detector 23 is one dimensional (1-axis) position sensor detector, which can detect sub-scanning directions beam position. Thereby, the horizontal syn signal of the laser beam LYa can be obtained from a slope signal of a sum signal of the detector 23 when the laser beam LYa reaches the detector 23. Sequentially, the position of the laser beam LYa in the z axial direction can be measured from a differential signal of the detector 23.

Thereafter, the emission of the first yellow laser 3Ya is stopped, and the second yellow laser 3Yb is emitted. In this case, the position of the laser beam LYb in the z axial direction can be measured from the differential signal of the detector 23. Sequentially, the horizontal syn signal of the laser beam LYb can be obtained from a slope signal of a sum signal of the detector 23 when the laser beam LYb deviates from the detector 23.

Similarly, the horizontal syn signal and position data of the z direction can be obtained in connection with the laser beams LMa and LMb, LCa and LCb, and LBa and LBb.

Thereby, timing when the first to fourth light sources 3 (Ya, Yb; Ma, Mb; Ca, Cb; Ba, Bb) are emitted, that is, the main-scanning direction writing timing is defined. Also, in order to correct the shift of the beam distance in the sub-scanning direction, the beam distance between two laser beams (LYa, LYb; LMa, LMb; LCa, LCb; LBa, LBb) is fed back to the beam distance change mechanism.

Figure 65:
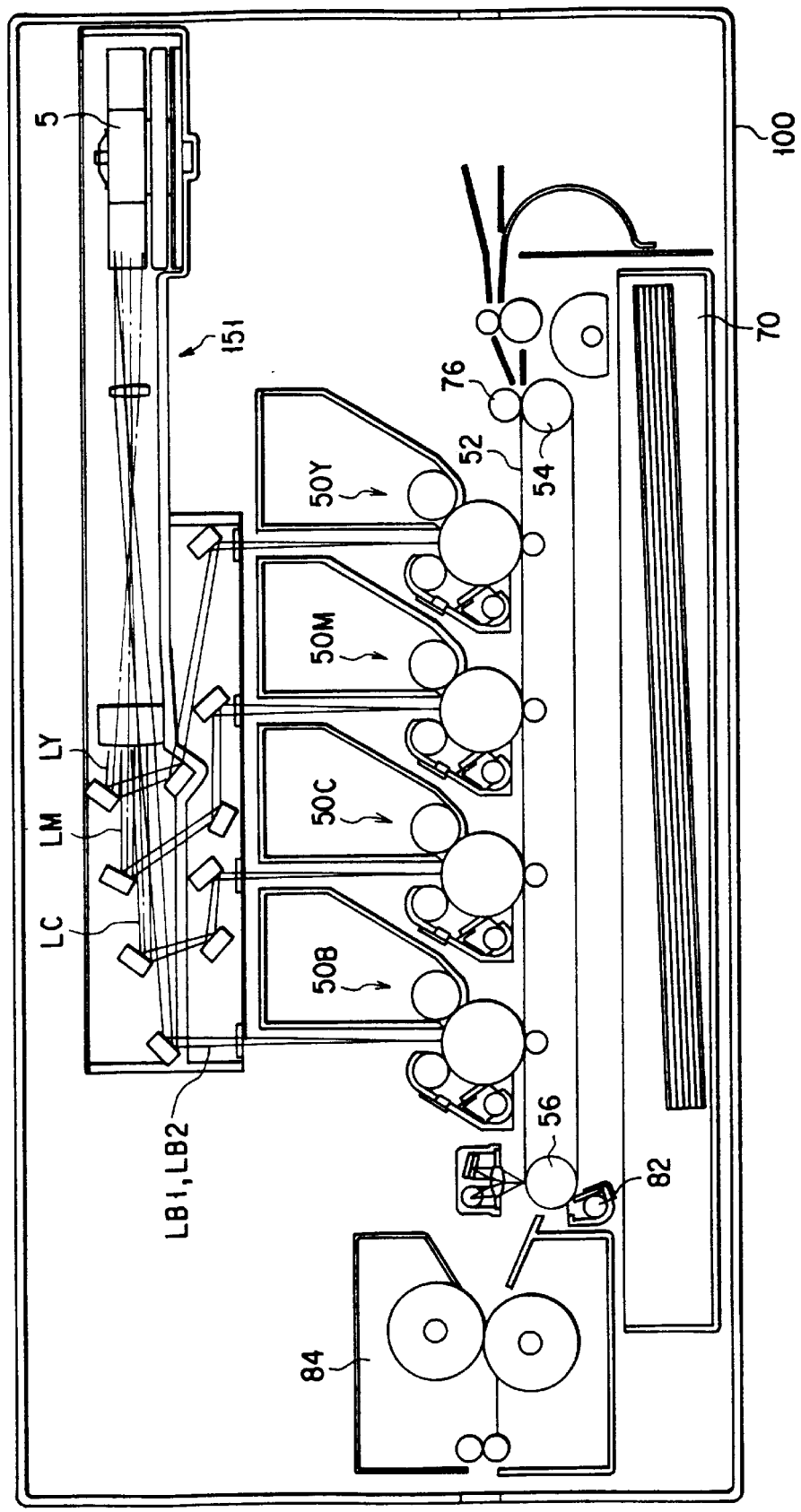
FIG. 65 is a schematic cross sectional view showing an image forming apparatus, which is different from the image forming apparatus of FIG. 1.

FIG. 65 shows a transfer typed color image forming apparatus to which the optical exposer unit of the second embodiment. The same reference numerals as the case of FIGS. 1 to 64 are added to the structure as already explained in FIGS. 1 to 64 and the structure, which is substantially the same as the structure of FIGS. 1 to 64, and the specific explanation is omitted.

As shown in FIG. 65, the image forming apparatus has first to fourth image forming sections 50Y, 50M, 50C, and 50B each forming an image of each of the color-separated components, that is, Y=Yellow, M=Magenta, C=Cyan, and B=Black.

The image forming sections 50 (Y, M, C, B) are arranged in series in order of 50Y, 50M, 50C, and 50B at the lower portion of an optical exposer unit 151 (described later in FIGS. 66 to 71) so as to correspond to the positions where the laser beams L (Y, M, C, B) corresponding to the respective color components through the third mirrors 37 (Y, M, C) and the first mirror 33B of the optical exposer unit 151 are emitted.

FIG. 66 shows the optical exposer unit used in the color image forming apparatus of FIG. 65.

As shown in FIG. 66, the optical exposer unit 151 has only one polygon mirror 5, serving as deflecting means for deflecting the laser beam emitted from the laser device to a predetermined position of the image surface provided at a predetermined position at a predetermined linear speed.

The post-deflection optical system 21 is provided between the polygon mirror 5 and the image surface. The post-deflection optical system 21 has first and second image forming lens 30a and 30b, which provide a predetermined optical characteristic to the laser beam deflected to a predetermined direction by the reflection surface of the polygon mirror 5.

The following will explain the post-deflection optical system 21 provided between the polygon mirror 5 and the laser device as a light source.

The optical exposer unit 1 has first to fourth light sources 3Y, 3M, 3C, and 3B (M is a positive integral number, 4 in this case), which include a laser device satisfying Ni (i is a positive integral number, and N4=2, N1=N2=N3=1, and N4=2 shows that the number of black beams is two) and which generates the laser beams corresponding to the color-separated components.

The first to third light sources 3Y, 3M and 3C have the yellow laser 3Y for emitting the laser beam corresponding to the yellow image, magenta laser 3M for emitting the laser beam corresponding to the magenta, cyan laser 3C for emitting the laser beam corresponding to the cyan image, first and second block lasers 3Ba and 3Bb for emitting the laser beam corresponding to the black image, respectively. In other words, the first to third light sources 3Y, 3M, and 3C satisfy the equation of N1=N2=N3=1, and the fourth light source 3B satisfies the equation of N4=2. Therefore, one laser beam (LY, LM, LC) is emitted form each of the third light sources 3Y, 3M, and 3C, and two laser beams LBa and LBb, which are paired and positioned to have a beam distance with a predetermined value, are emitted from the fourth light source 3B in the sub-scanning direction.

The following will explain the pre-deflection optical system 7Y in which the laser beam LY directing to the polygon mirror 5 from the yellow laser 3Y is typically shown.

A predetermined convergence is provided to the divergent laser beam emitted from the yellow laser 3Y by the finite focus lens 9Y. Thereafter, the cross section of the beam is formed to have a predetermined shape by a diaphragm 10Y.

A predetermined convergence is further provided to the laser beam LY, which is passed through the diaphragm 10Y, through the hybrid cylinder lens 11Y in only the sub-scanning direction, and the laser beam LY is emitted to the polygon mirror 5.

Similarly, the laser beam emitted from the magenta laser 3M is passed through the finite focus lens 9M, a diaphragm 10M, and the hybrid cylinder lens 11M to be directed to the polygon mirror 5. Also, the laser beam emitted from the cyan laser 3C is passed through the finite focus lens 9C, the diaphragm 10C, and the hybrid cylinder lens 11C to be directed to the polygon mirror 5.

In contrast, regarding the divergent laser beam emitted from the first black laser 3Ba, a predetermined convergence is provided to the divergent laser beam by the finite focus lens 9Ba. Thereafter, the cross section of the beam is formed to have a predetermined shape by a diaphragm 10Ba. A predetermined convergence is further provided to the laser beam LBa, which is passed through the diaphragm 10Ba, through the hybrid cylinder lens 11B in only the sub-scanning direction, and the laser beam LBa is guided to the polygon mirror 5. The half mirror 12B is inserted between the finite focus lens 9Ba and the hybrid cylinder lens 11B at a predetermined angle to the optical axis provided between the finite focus lens 9Ba and the hybrid cylinder lens 11B. In the half-mirror 12B, the laser beam LBb is made incident onto the surface on which the laser beam LBa is made incident from the first black laser 3Ba and the opposite surface at a predetermined angle to have a predetermined beam distance between the laser beams LBa and LBb in the sub-scanning direction. The finite focus lens 9Bb and the diaphragm 10Bb are provided between the second laser 3Bb and the half mirror 12B so as to provide a predetermined convergence to the laser beam LBb sent from the second laser 3Bb.

The laser beam LY passed through the hybrid cylinder 11Y, the laser beam LM passed through the hybrid cylinder 11M, the laser beam LC passed through the hybrid cylinder 11C, and the pair of the laser beams Lba and LBb passed through the hybrid cylinder 11B are substantially put together with the other laser beams as a flux of light beam by the laser synthetic mirror unit 13, which is substantially the same as the laser synthetic mirror unit 13 of FIG. 8, thereby these beams are guided to the polygon mirror 5. It is noted that the optical elements used in each of the predeflection optical systems 7 (Y, M, C, B) are substantially the same as the optical elements used in the first embodiment of FIGS. 1 to 64, so that the specific examination is omitted.

Figure 67:
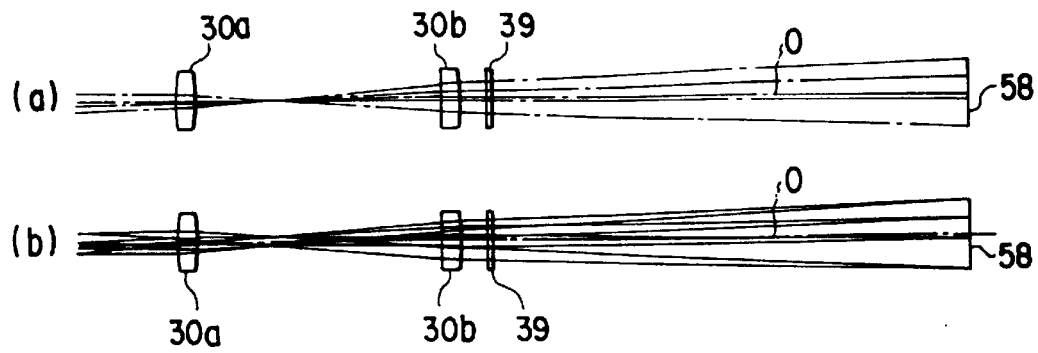
FIG. 67 is an expanded view of the optical path of the post-deflection optical system, which is expressed in a state that the optical exposer unit of FIG. 65 is cut at a deflection angle of 0° of the deflector and mirrors are removed.

FIG. 67 shows a cross section of the laser beam directing to the image surface from the polygon mirror 5 in the sub-scanning direction in a state that the deflection angle of the laser beam at the respective reflection surfaces of the polygon mirror 5 is 0°.

As shown in FIG. 67, the first to fourth laser beams LY, LM, LC and the laser beam LB in which two laser beams LBa and LBb are put together as one beam cross the optical axis of the optical system in the sub-scanning direction between the first and second image forming lenses 30a and 30b so as to be guided to the image surface (photosensitive drum 58).

As already explained in the prior art, as compared the frequency of the case in which the color image is output with the frequency of the case in which the black image is output in the color image forming apparatus, there is a tendency for the frequency of the black image to be higher than that of the color image. In the block image, the sharpness of the image is more required compared with the color image. However, resolution is not required in the optical apparatus, which is suitable for the laser beam corresponding to the color image, as compared with the optical apparatus, which is suitable for the laser beam corresponding to the black image. Due to this, the use of the optical apparatus, which is suitable for the laser beam corresponding to the black image, increases the manufacturing cost. Therefore, in N4 (=2), as the value, which is different from the other N1=N2=N3=1,600 dpi (dots per inch) is provided to block. In the case of the color images, 300 dpi is provided to the respective colors. Moreover, the image forming apparatus of FIG. 65 is formed such that two steps of resolution, at least 600 dpi and 400 dpi can be provided to the black image. It is noted that the fixed value of 300 dpi is provided to the color image of each of the first to third light sources 3Y, 3M, and 3C.

The following will explain the resolution change mode of the image forming apparatus of FIG. 65.

Generally, an effective power diameter of the laser beam is shown by $1/e^2$. At this time, the $1/e^2$ diameter Do of the sub-scanning direction satisfies the following equation in connection with the beam distance (GP), which is defined based on the resolution of the image to be recorded:

AMP×GP=Do ($1.2 \leq AMP \leq 1.6$) wherein the suitable value of AMP differs by depending on the processes.

In other words, the effective energy diameter Do is set to be slightly larger than GP defined by depending on resolution. Thereby, for example, it is well known that variation of density, which is caused by jitter generated by the drive of the photosensitive drum, can be reduced. In this case, the line distance at the time of writing the image under the conditions of single beam and a required resolution DPI is set to LGP.

Figure 71:
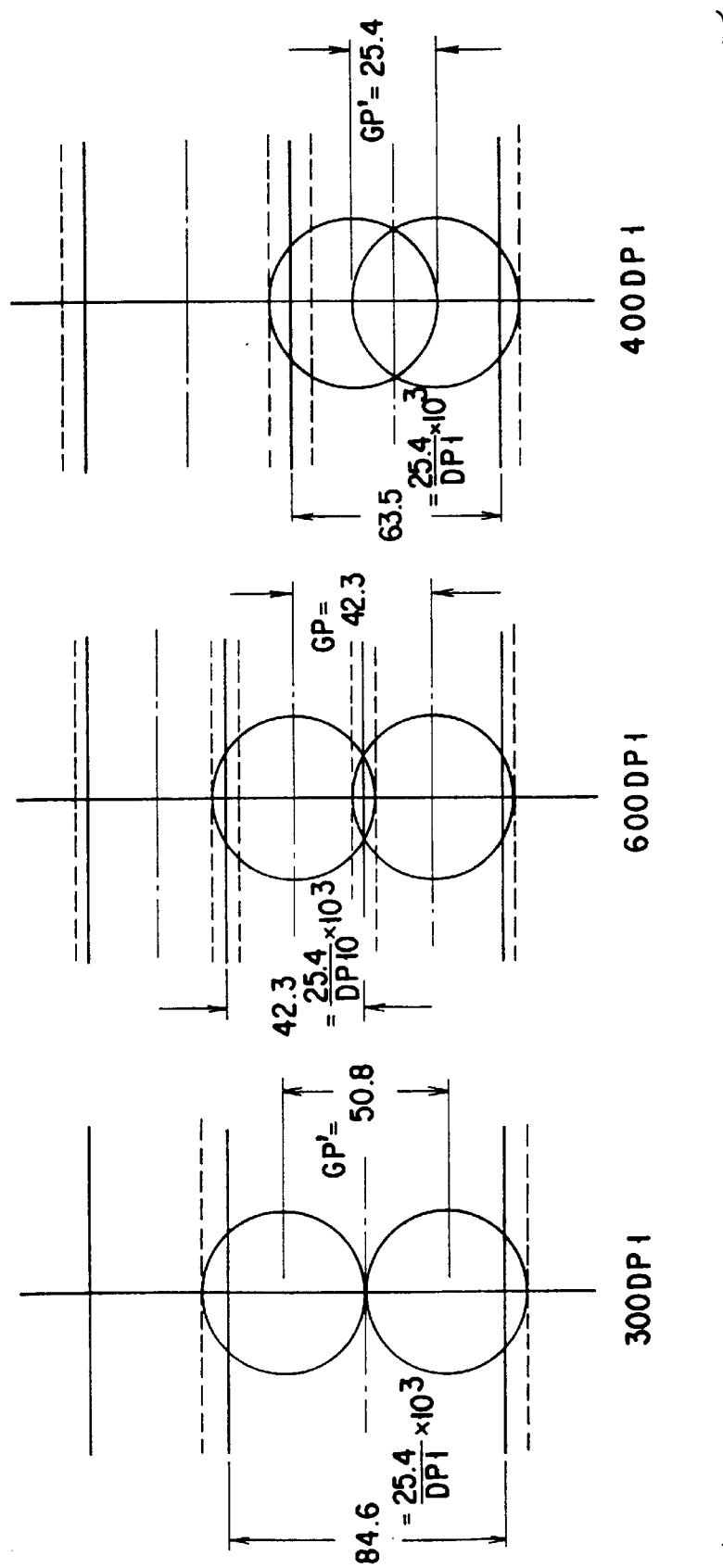
FIG. 71 is a schematic view showing an example in which the distance between the laser beams is changed in order to change resolution in the optical exposer unit of FIG. 65.

As shown in FIG. 71, in order to record the image under the conditions that resolution is 600 dpi and N1=two laser beams, it is useful to set the effective energy diameter Do of each of the laser beams to be 1.2 to 1.6 times as large as GP. Also, in order to effectively reduce the variation of density, it is useful to change the distance between the laser beams such that AMP, which is defined by depending on resolution, is about 1.2 to 1.6 and the beam distance is set to GP'. Therefore, for example, for obtaining GP' with respect to various resolution, the beam distance of two paired laser beams in the sub-scanning direction may be changed by a resolution change mechanism (to be described later with reference to FIG. 68) as to satisfy the following equation (2):

GP'=(25.4 AMP/DPI−25.4 AMP/DPIo)/(Pi−1)=AMP× LGP×{1−(DPI/DPIo)}/(Pi−1) wherein DPIo=maximum resolution by which the image forming forming apparatus can form the image, and DPI=the required resolution to be changed.

In the optical exposer unit 151 of the image forming apparatus of FIG. 65, it is defined that the maximum resolution DPIo=600 dp] and that changeable resolution $DPI \geq 1/P1 \times DPIo^2$.

If the required DPI is 400 dpi and AMP is 1.2, the beam distance on the image surface under the condition of N1=2 is reduced from 42.3 μm to 25.4 μm. Also, by use of a plurality of Pi beams (Pi is an integral number of 2 or more and Pi=2 in this case), an image corresponding to one pixel can be formed.

In this case, in order to keep the process speed constant, it is needless to say that the image frequency is changed to $DPI^2 \times Pi/DPIo^2 = 0.8888$.

Also, it is needless to say that the deflection speed of the deflector is changed to DPI×Pi/DPIo=1.3333.

Just for reference, if DPI is set to 300 dpi, the beam distance is changed to 50.8 μm, the deflection speed of the deflector is changed to the same value at the time of DPIo (at the time when the first and second lasers simultaneously emitted), and the image frequency is changed to ½.

Figure 68:
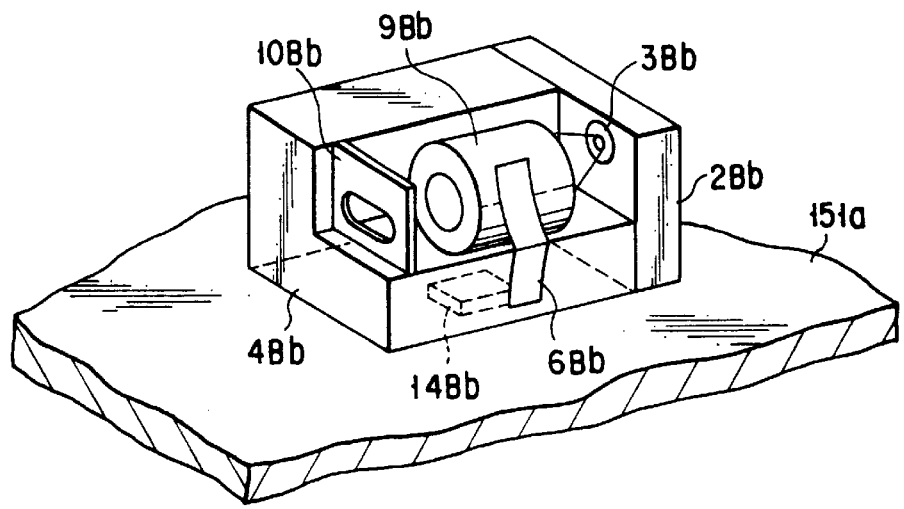
FIG. 68 is a schematic view showing one example of the light source, that is, light emission unit, of the optical exposer unit of FIG. 65.

FIG. 68 shows the resolution change mechanism, that is, a holding section for holding the second laser 3Bb of the fourth light source 3B used in the optical exposer unit 151 of FIG. 65.

As shown in FIG. 68, the second black laser 3Bb is inserted to a laser holder section formed at a predetermined position of the laser holding section 2Bb for holding the second black laser 3Bb so as to be fixed thereto by adhesive (not shown). A lens holding section 4Bb for holding the finite focus lens 9Bb is provided in a direction where the laser beam LBb is emitted from the second black laser 3Bb held by the laser holder section. The finite focus lens 9Bb has a lens housing in itself, and the outer shape is cylindrical. Thereby, the finite focus lens 9Bb is pressed in a predetermined direction of the lens holding section 4Bb by, for example, a plate spring 6Bb. A diaphragm 10Bb is inserted to a groove, which is formed at a predetermined position of the lens holding section 4Bb in advance, and fixed to the lens holding section 4Bb with adhesive (not shown). The optical axis is adjusted with respect to the laser beam LBb emitted from the laser device 3Bb by a positioning projection (not shown), which is formed in the lens holding section 4Bb in advance. Thereafter, the finite focus lens 9Bb is fixed to a lens holding section 4Bb with adhesive.

The lens holding section 4Bb and the laser holding section 2Bb are arranged at a predetermined position of a housing 151a of the optical exposer unit 151 in a state that a piezo actuator 14Bb whose thickness is changed in accordance with a voltage to be applied is provided between the housing 151a and the holding sections.

In order to change the beam distance of the sub-scanning direction between the laser beam LBa emitted from the first black laser 3Ba and the laser beam LBb emitted from the second black laser 3Bb in accordance with the change of the above-mentioned resolution, the thickness of the electromagnetic actuator 14Bb, which is predetermined in accordance with resolution of, for example, 600 dpi, 400 dpi, and 300 dpi, can be provided. The thickness of the piezo actuator 14Bb is changed in accordance with resolution supplied through a voltage supply section (not shown). The amounts of these resolution is fed back to a drive section (not shown) of the piezo actuator 14Bb by a difference between the laser beams LBa and LBb of the z direction, which generates the differential signal of the detector 23. As the piezo actuator 14Bb, for example, the well-known piezo element is used.

In the optical exposer unit 151 of FIG. 65, the second black laser 3Bb is guided to a predetermined position of the image surface by the hybrid cylinder lens 11B, and the first and second image forming lenses 30a and 30b. As one example, the electromagnetic actuator 14Bb is displaced, the shift of the laser beam reaching onto the image surface is −0.636·dx if the distance where the lens holding section 4Bb and the laser holding section 2Bb are moved is dx. The second embodiment of FIGS. 65 to 68 explained only the case in which the beam distance adjusting mechanism is N4−1=2−1=1, and N1−1=0 (Y), N2=1=0 (M), N3−1=0 (C), and N4−1=1 (B). However, the beam distance adjustment mechanism of FIG. 68 may be provided in the 3Ba. Also, the this embodiment, the beam incident position was adjusted. Another mechanism can be applied. In order to generate the inclination of the piezo element, the piezo element is provided at one end of the lens holding section 4Bb and a spring is provided at the other end, thereby the beam incident angle and position can be adjusted.

Figure 72:
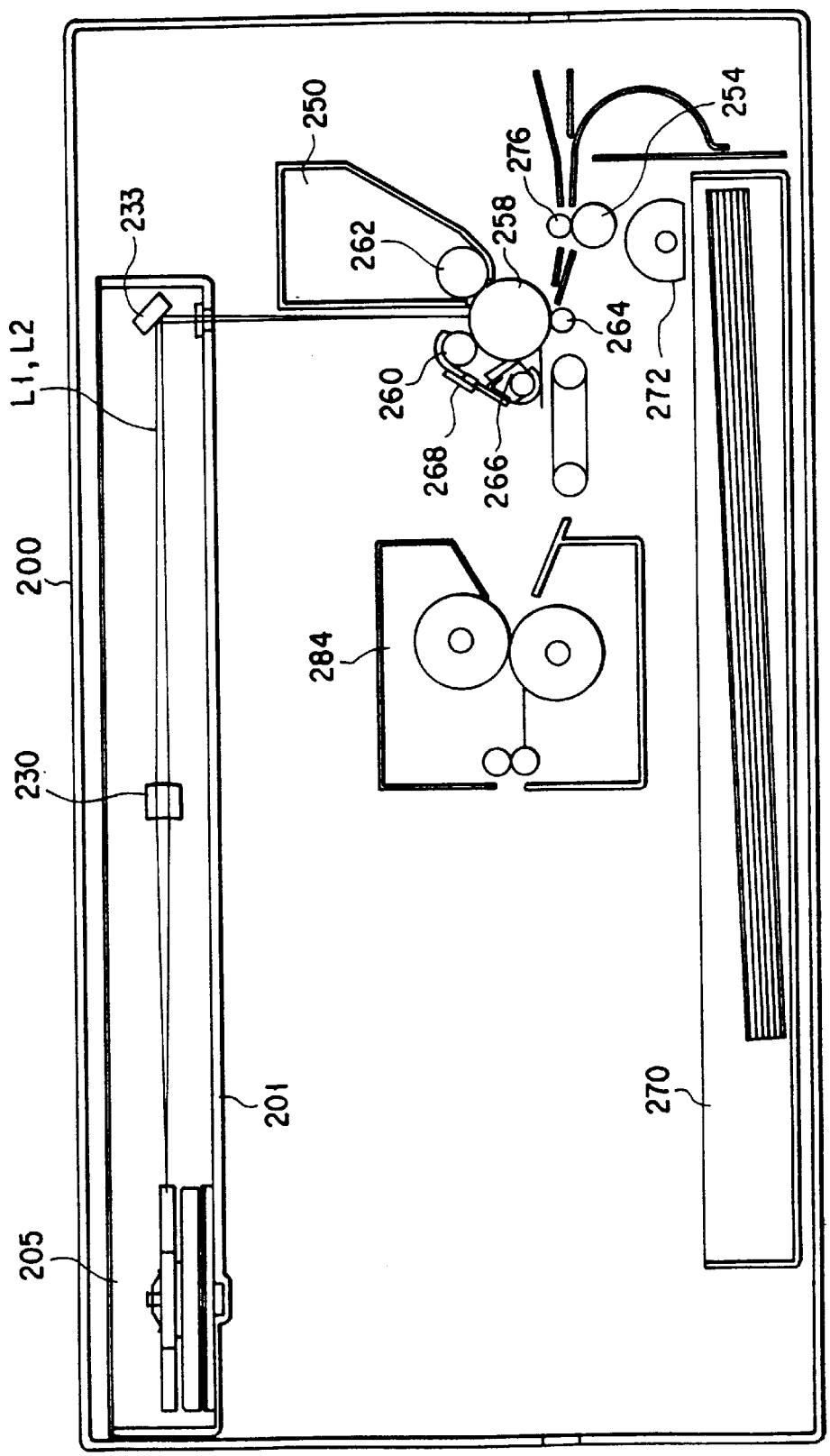
FIG. 72 is a schematic cross sectional view showing an image forming apparatus, which is different from the image forming apparatus of FIGS. 1 and 65.

FIG. 72 shows a monochromatic image forming apparatus to which a two-beam exposer unit of the third embodiment of the present invention is applied. Reference numeral 200 is added to substantially the same structure as the first embodiment of FIGS. 1 to 64, and substantially the same structure as the second embodiments of FIGS. 65 to 68, and the specific explanation is omitted.

As shown in FIG. 72, an image forming apparatus 200 has an image forming section 250 of the well-known laser beam printer system.

The image forming section 250 is provided at the position where the laser beams L1 and L2 are emitted through a mirror 233 of an optical exposer unit 201 (FIGS. 73 to 98 described later).

The image forming section 250 has a cylindrical drum shape and is formed to be rotatable in a predetermined direction. Also, the image forming section 250 has a photosensitive drum 258 on which an electrostatic image corresponding to an image is formed. There are arranged a charging unit 260, a developing unit 262, a transfer unit 264, a cleaner 266, and a discharge unit 268 along the rotation direction of the photosensitive drum 258 in order. The charging unit 260 provides a predetermined voltage onto the surface of the photosensitive drum 258. The developing unit 262 develops the electrostatic latent image formed on the surface of the photosensitive drum 258 with toner. The transfer unit 264 transfers an toner image, which is formed on the photosensitive member 258, to a recording medium, i.e., recording paper P. The cleaner 266 removes the residual toner, which is left on the photosensitive drum 258 after each toner image is transferred through the transfer unit 264. The discharge unit 268 removes the residual voltage, which is left on the photosensitive member 258 after each toner image is transferred through the transfer unit 264.

Irradiation of the laser beams L1 and L2, which are guided by the mirror 233 of the optical exposer unit 201, is provided between the charge units 260 and the developing unit 262.

A paper cassette 270, which contains the recording medium (paper P) for transferring the image formed by the image forming unit 250, is provided at the lower portion of the photosensitive drum 258.

A feeding roller 272 having a semicircular cross section is provided at the position, which is one end portion of the paper cassette 270 and a portion close to a tension roller 254, so as to pick up paper P contained in the paper cassette 270 one by one from the uppermost section.

A resist roller 276 is provided between the feeding roller 272 and the photosensitive drum 258. The resist roller 276 is used to conform the top end of one paper P, which is picked up from the cassette 270, to the top end of the toner image formed on the photosensitive drum 258.

A fixing unit 284 is provided in a direction where paper P to which the image formed on the photosensitive drum 258 is transferred by the transfer unit 264. The fixing unit 284 is used to fix the toner image, which is transferred onto the paper P, to paper P.

Figure 73:
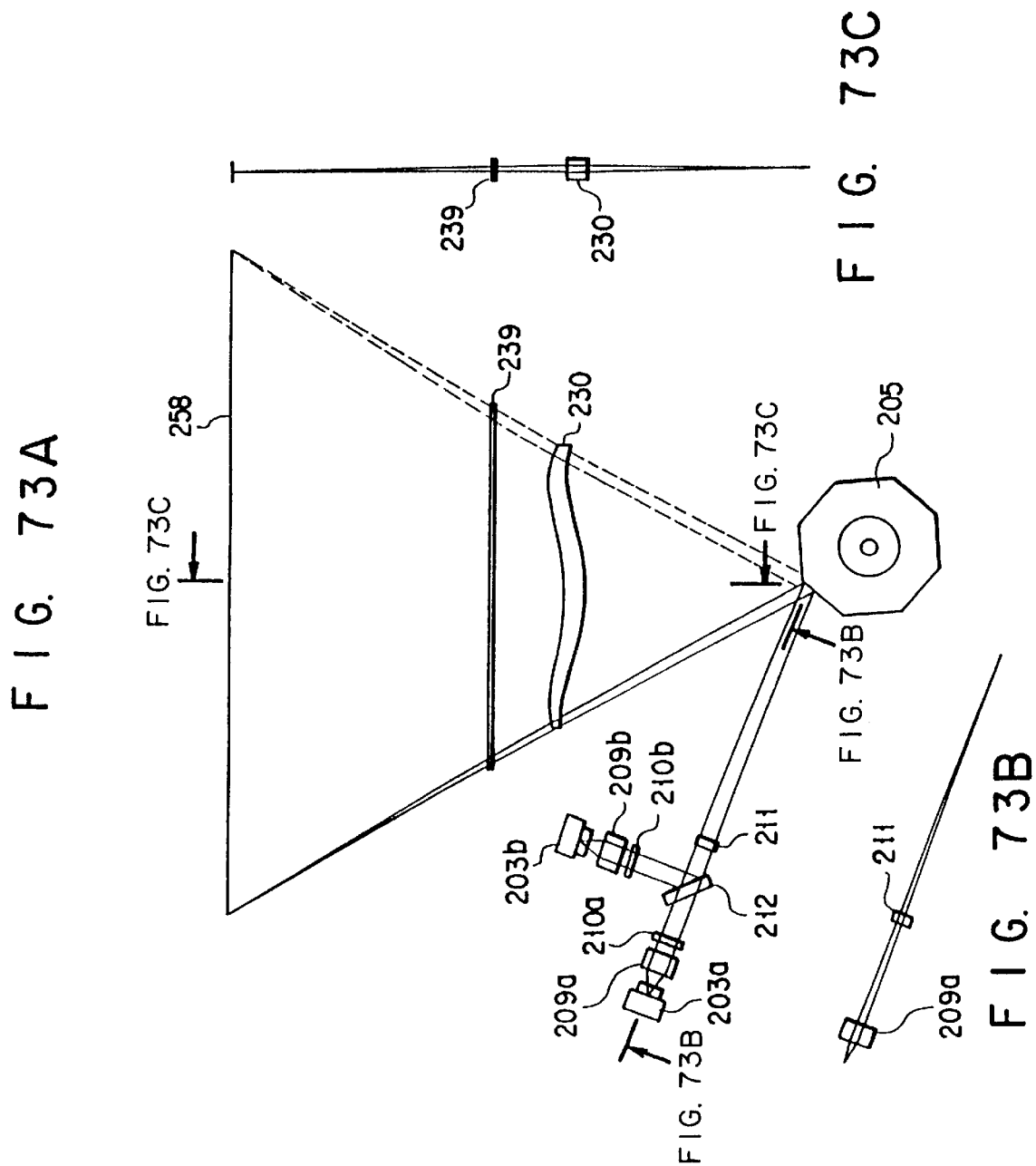
FIG. 73 is a schematic plane view showing the arrangement of optical members of an optical exposer unit, which is incorporated into the image forming apparatus of FIG. 72.

FIG. 73 shows the two-beam exposer unit, which is used in the image forming apparatus of FIG. 72.

As shown in FIG. 73, the optical exposer unit 201 has only one deflector 205, serving as deflecting means for deflecting (N1=2 (M=0)) two laser beams emitted from the first and second laser devices 203a and 203b toward a predetermined position of the image surface provided at a predetermined position at a predetermined linear speed. The direction where the laser beams are deflected by the deflector 205 is hereinafter called "main-scanning direction."

Only one image forming lens 230 is provided between the deflector 205 and the image surface to give a predetermined optical characteristic to the first and second laser beams deflected to the predetermined direction by the reflection surface of the deflector 205. A dustproof glass 239 is provided between the image forming lens 230 and the image surface.

The following will specifically explain the predeflection optical system between the laser element, serving as a light source, and the deflector 205.

The optical exposer unit 201 has a group of light sources 203 (M is a positive integral number, 1 in this case), which include two laser device satisfying Ni=2. As a pre-deflection optical system, there are arranged a finite focus lens 209a, a diaphragm 210a, a half mirror 212, and a hybrid cylinder lens 211 between a first laser 203a of the light source 203 and the deflector 205. Also, there are arranged a second laser 203b, a finite focus lens 209b, and a diaphragm 210b on the surface, which is opposite to the surface where the laser beam L1 is made incident from the first laser 203a of the half mirror 212. The optical characteristics, the shapes, and the materials of the respective optical elements used in the pre-deflection optical system are substantially the same as the first and second embodiments. Due to this, the specific explanation is omitted.

The following will explain the post-deflection optical system of one lens provided between the deflector 205 and the image surface.

FIGS. 73 to 98, and Tables 7 and 8 show the various optical characteristics and lens data of the first surface (light incident surface) and the second surface (light emission surface) of only one image forming lens 230.

TABLE 7

Reflection Angle   .508900241321739 (rad)
Separation Angle   .698131700000000 (rad)
Inradius of Refelction Surface of Optical Deflector                33.4
Coordinates of Center of Rotation of Reflection Surface of
Optical Deflector Seen from Reflection Surface when
Deflecting in Optical Axis
              26.468884942958                                      20.44

| curvature | | thickness | material | others |
|---|---|---|---|---|
| main-scanning | sub-scanning | 15.55 | air | LD |
|  |  | 50.0 | air | f = 15.18 |
| inclination of main beam | | −5.307477294346321 | | |
| incident onto cylinder lens 17 | | E-004 (rad) | | |
| eccentricity of main beam | | 0.259928089343881 | | |
| incident onto cylinder lens 17 | | | | |
| (beam 2: inverse sign) | | | | |
| plane | plane | 0.1 | PMMA | |
| plane | 2.295084102E-2 | 5.0 | glass | |
| main-scanning | sub-scanning | | | |
| plane | plane | 132.4 | air | |
| Beam advances from + to − due to reflection here | | | | |
| incident | | | | eccentricity in |
| surface | | | | main-scanning |
| | | | | direction 1.31 |
| see data of | | −106.2 | air | |
| emission | | −10.0 | PMMA | |
| surface | | −29.0 | air | |
| plane | plane | 2.0 | | |
| plane | plane | −194.8 | air | |

TABLE 8

Coefficient $A_{mn}$ of Polynomial of First Surface

AY = 1                        AZ = 1
CUY = −1.122E-2               CUZ = 1.813E-2

| | | | m | | | |
|---|---|---|---|---|---|---|
| n | 0 | 1 | 2 | 3 | 4 | 5 |
| 0 | 0 | 1.169E-3 | 0 | −5.147E-6 | 1.139E-6 | −8.178E-10 |
| 1 | 0 | 5.011E-6 | −2.960E-6 | 1.627E-9 | −1.375E-10 | 2.867E-13 |
| 2 | 9.198E-5 | 2.347E-6 | −9.338E-8 | −1.534E-10 | −3.368E-12 | −6.837E-14 |
| 3 | −8.238E-7 | 5.802E-9 | −3.424E-10 | −2.080E-12 | −2.037E-15 | 9.811E-17 |

| | | | m | | |
|---|---|---|---|---|---|
| n | 6 | 7 | 8 | 9 | 10 |
| 0 | −3.201E-11 | −1.137E-13 | −1.495E-15 | 3.466E-18 | 8.526E-19 |
| 1 | 5.970E-15 | 2.146E-17 | −6.581E-19 | −5.646E-21 | −6.050E-22 |
| 2 | −1.318E-15 | −6.656E-18 | 3.925E-18 | −3.121E-21 | −5.686E-22 |
| 3 | 9.037E-19 | −1.047E-20 | −1.197E-21 | 3.534E-24 | −8.572E-25 |

Coefficient $A_{mn}$ of Polynomial of Second Surface

AY = 1                        AZ = 1
CUY = −9.161E-3               CUZ = 4.241E-2

| | | | m | | | |
|---|---|---|---|---|---|---|
| n | 0 | 1 | 2 | 3 | 4 | 5 |
| 0 | 0 | 3.640E-2 | 0 | −5.366E-6 | 1.073E-6 | −8.369E-10 |
| 1 | 0 | 1.186E-5 | −2.029E-6 | −9.549E-10 | 4.149E-10 | −3.115E-13 |
| 2 | 5.254E-5 | 1.674E-6 | −4.482E-8 | −1.881E-10 | −1.399E-11 | 6.155E-14 |
| 3 | −7.519E-7 | −9.726E-9 | 6.052E-11 | 6.053E-12 | −6.517E-14 | −4.638E-16 |

TABLE 8-continued

| | m | | | | |
|---|---|---|---|---|---|
| n | 6 | 7 | 8 | 9 | 10 |
| 0 | −5.701E-11 | 6.098E-14 | 3.250E-15 | −2.906E-17 | 2.896E-19 |
| 1 | −6.900E-14 | −5.471E-17 | −1.080E-18 | −5.654E-21 | 9.384E-22 |
| 2 | −2.916E-15 | −9.897E-18 | 4.400E-18 | −5.103E-21 | −5.986E-22 |
| 3 | −1.587E-17 | −4.991E-20 | −2.206E-21 | −7.900E-24 | −6.759E-26 |

Figure 74:
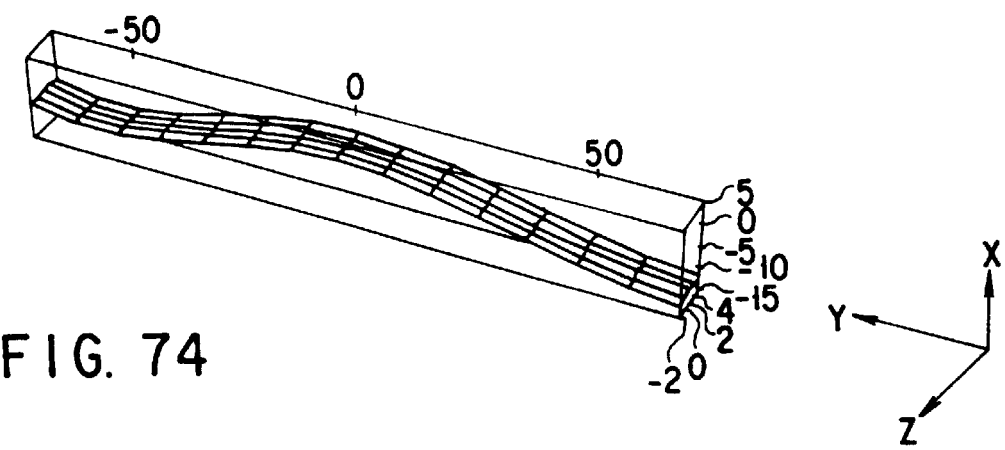
FIG. 74 is a perspective view showing the shape of the incident surface of the fθ lens of the optical exposer unit of FIG. 73.

FIG. 74 shows the shape of the first surface of the image-forming lens 230, that is, a light incident surface. As shown in FIG. 74, the first surface of the image-forming lens 230 is formed to be asymmetrical to the optical axis (y=0, z=0).

Figure 75:
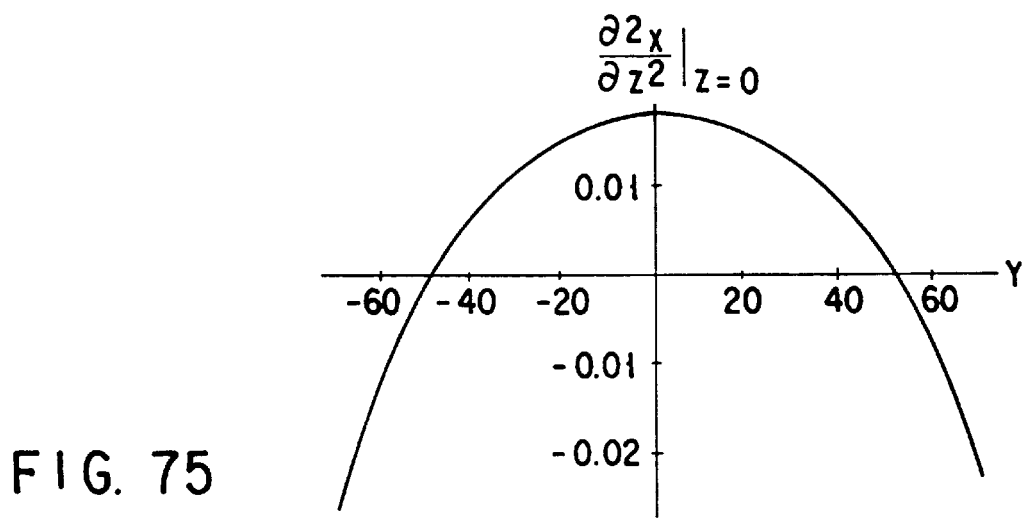
FIG. 75 is a graph showing a curvature of the incident surface of the fθ lens (of the optical exposer unit of FIG. 73) of the sub-scanning direction at a cross point between a light scanning surface and a lens surface (that is, a plane, which includes an optical axis of the optical system and is expanded to the main-scanning direction)

FIG. 75 shows a curvature of the first surface of the lens 230 of the sub-scanning direction at a cross point between a light scanning surface and a lens surface (that is, a plane, which includes an optical axis of the optical system and is expanded to the main-scanning direction). In other words, FIG. 75 shows the characteristic of the shape of the first surface of the image-forming lens 230 of the sub-scanning direction shown in FIG. 74, that is, the first surface of the image-forming lens 230 is formed to be asymmetrical to the optical axis (y=0, z=0). Also, FIG. 75 shows that the curvature of the lens surface of the sub-scanning direction changes a sign in mid course of the main-scanning direction. Thereby, various characteristics of the lens surface of the sub-scanning direction can be optimized against the wide deflection angle without increasing an absolute value of power of the lens surface in the sub-scanning direction. It is well known that aberration is easily generated as the absolute value of power of the lens surface becomes large. In order to avoid such a disadvantage, the above-mentioned point can improve the performance of the lens.

Figure 76:
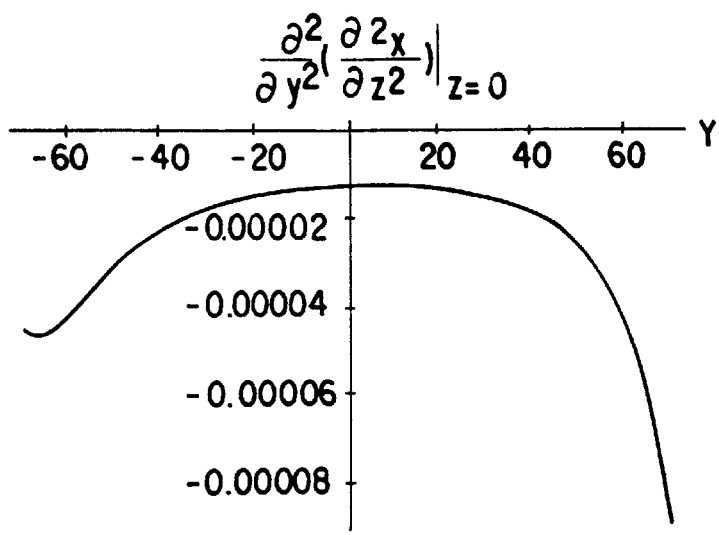
FIG. 76 is a graph showing a secondary differential value between the curvature of the sub-scanning direction and the coordinates of the main-scanning direction at the cross point between the light scanning surface and the lens surface, in connection with the incident surface of the fθ lens of the optical exposer unit of FIG. 73.

FIG. 76 shows a secondary differential value between the curvature of the sub-scanning direction and the coordinates of the main-scanning direction at the cross point between the light scanning surface and the lens surface.

Figure 77:
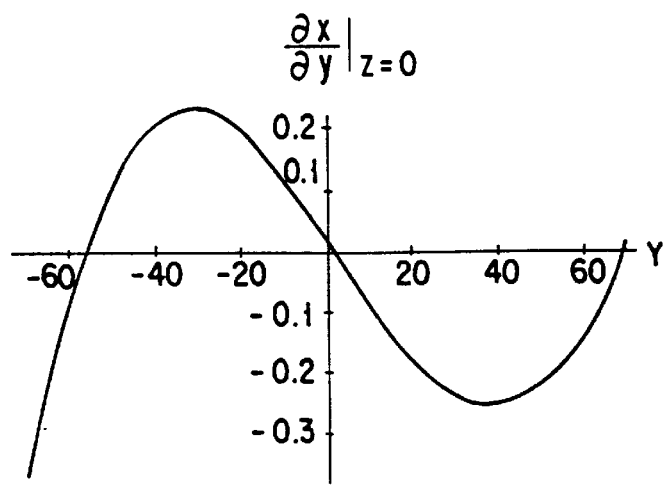
FIG. 77 is a graph showing a differential value between the coordinates of the main-scanning direction and the coordinates of the direction of the optical axis at the cross point between the light scanning surface and the lens surface, in connection with the incident surface of the fθ lens of the optical exposer unit of FIG. 73.

FIG. 77 shows a differential value between the coordinates of the main-scanning direction and the coordinates of the direction of the optical axis at the cross point between the light scanning surface and the first lens surface of the lens 230.

In other words, it can be understood that a primary differential value between the main-scanning direction and the coordinates of the optical axis at the cross point between the light scanning surface and the lens surface has two extreme values. Therefore, in a state that the characteristic of the main-scanning direction (FIG. 75) is maintained, fθ characteristic of the main-scanning direction can be corrected without increasing the thickness of the lens against the wide deflection angle. Particularly, in the case of the plastic-formed lens, it takes much time to mold the lens and the manufacturing cost is increased if the thickness of the lens becomes thick.

Figure 78:
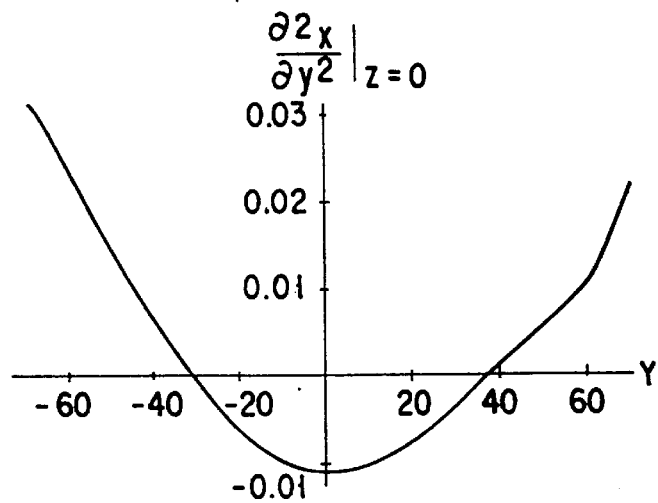
FIG. 78 is a graph showing a curvature of the incident surface of the main-scanning direction at a cross point between a light scanning surface and a lens surface (that is, a plane, which includes an optical axis of the optical system and is expanded to the main-scanning direction), in connection with the incident surface of the fθ lens of the optical exposer unit of FIG. 73.

FIG. 78 shows a curvature of the first surface of the lens 230 of the main-scanning direction at the cross point between the light scanning surface and the lens surface (that is, the plane, which includes the optical axis of the optical system and is expanded to the main-scanning direction). In other words, FIG. 78 shows the characteristic of the shape of the first surface of the lens 230 of the main-scanning direction shown in FIG. 74, that is, the first surface of the first image-forming lens 230 is formed to be asymmetrical to the optical axis (y=0, z=0). Also, the curvature of the lens surface of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

Figure 79:
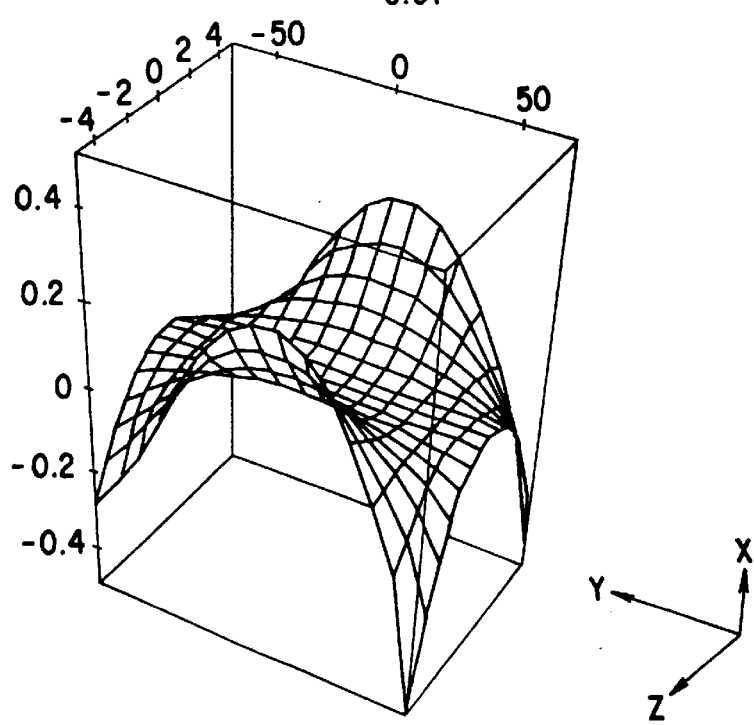
FIG. 79 is a graph showing the shape of the incident surface of the fθ lens of the sub-scanning direction at each point of the main-scanning direction of the lens surface based the cross point between the light scanning surface and the lens surface (that is, the plane, which includes the optical axis of the optical system and is expanded to the main-scanning direction).

FIG. 79 shows the shape of the first surface of the lens 230 of the sub-scanning direction at each point of the main-scanning direction of the lens surface based the cross point between the light scanning surface and the lens surface (that is, the plane, which includes the optical axis of the optical system and is expanded to the main-scanning direction). In other words, FIG. 79 shows that the shape of the first surface (FIG. 74) in sub-scanning direction is formed to be asymmetrical to the main-scanning direction.

Figure 80:
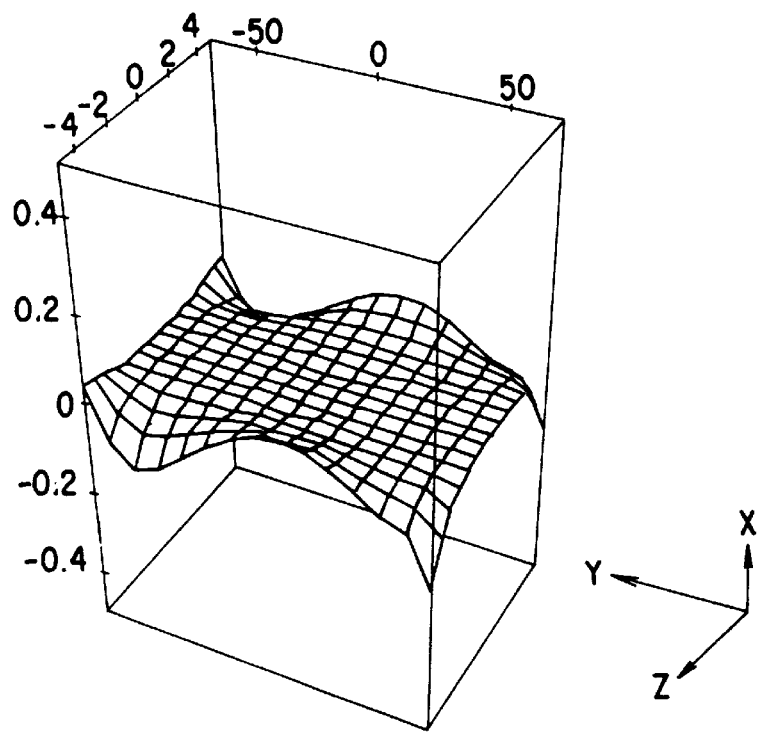
FIG. 80 is a graph showing the shift of the shape of the incident surface of the fθ lens of the sub-scanning direction based on an arc having curvature in a condition that the sub-scanning direction z=0.

FIG. 80 shows the shift of the shape of the first surface of the lens 230 of the sub-scanning direction based on an arc having curvature in a condition that the sub-scanning direction z=0. In other words, FIG. 80 shows that the first surface of the lens 30a is shaped such that in which at least the term of n is 2 or more in the equation (1), that is, $A_{mn} Y^m \cdot Z^{2n}$ to the sub-scanning direction.

Figure 81:
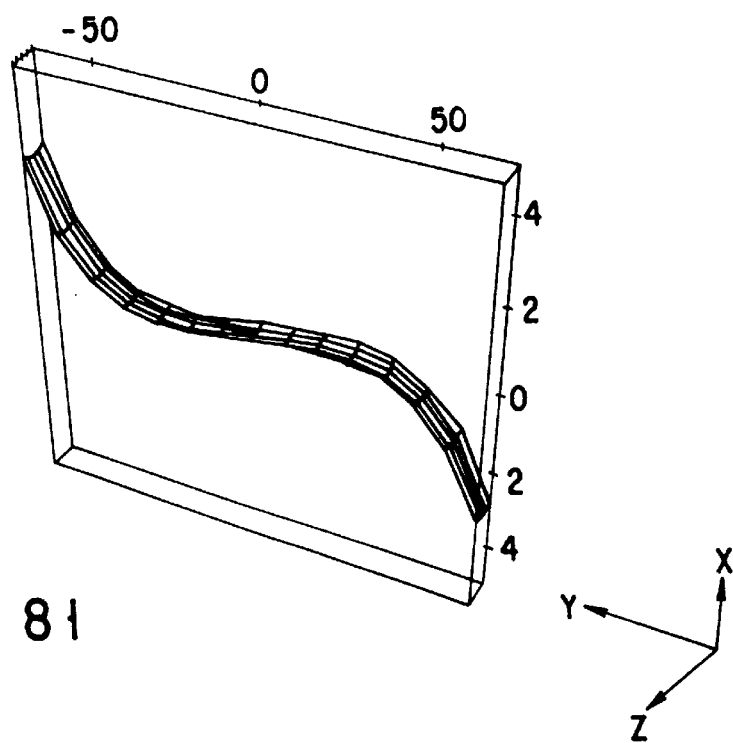
FIG. 81 is a schematic view showing an asymmetrical component to the surface expanding to the sub-scanning direction and including the optical axis with respect to the shape of the the incident surface of the fθ lens.

FIG. 81 shows an asymmetrical component to the surface expanding to the sub-scanning direction and including the optical axis with respect to the shape of the first surface of the lens 230.

In other words, FIGS. 80 and 81 show the first surface of the lens 230 includes no rotation symmetrical surface in the main-scanning direction and the sub-scanning direction. As shown in FIG. 80, at least the term of n is 2 or more in the equation (1) of the sub-scanning direction is controlled independently of the shape of the line where the light scanning surface, which includes the optical axis and expands to the main-scanning direction, and the lens surface cross each other, and the curvature of the sub-scanning direction. Thereby, various aberration characteristics of the main-scanning direction and the sub-scanning direction can be satisfactorily set.

Figure 82:
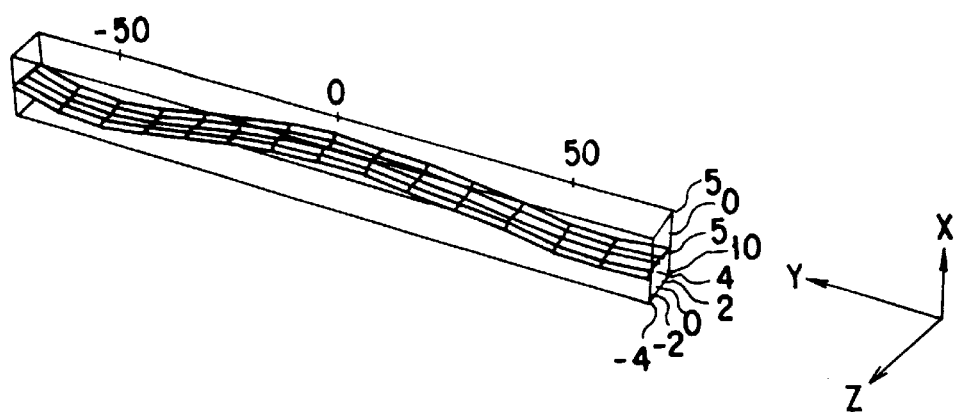
FIG. 82 is a perspective view showing the shape of the emission surface of the fθ lens of FIG. 73.

FIG. 82 shows the shape of the second surface (light emission surface) of the image-forming lens 230. As shown in FIG. 82, the second surface of the image-forming lens 230 is formed to be asymmetrical to the optical axis (y, z )=(0, 0).

Figure 83:
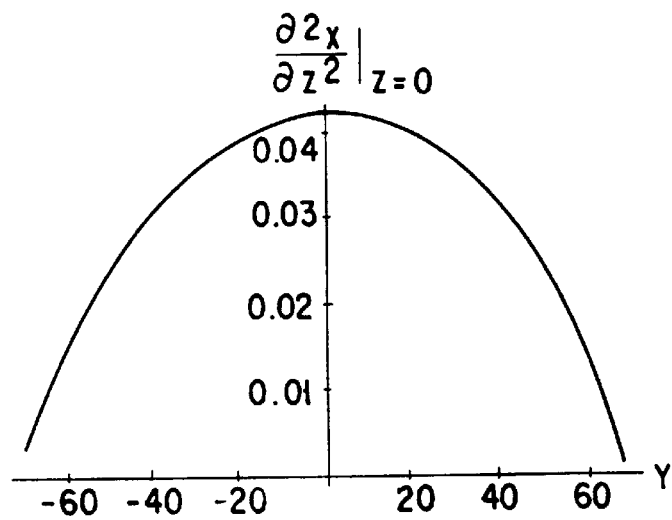
FIG. 83 is a graph showing a curvature of the emission surface of the fθ lens of the sub-scanning direction at a cross point between a light scanning surface and a lens surface (that is, a plane, which includes an optical axis of the optical system and is expanded to the main-scanning direction)

FIG. 83 shows a curvature of the second surface of the lens 230 of the sub-scanning direction at a cross point between a light scanning surface and a lens surface (that is, a plane, which includes an optical axis of the optical system and is expanded to the main-scanning direction).

Figure 84:
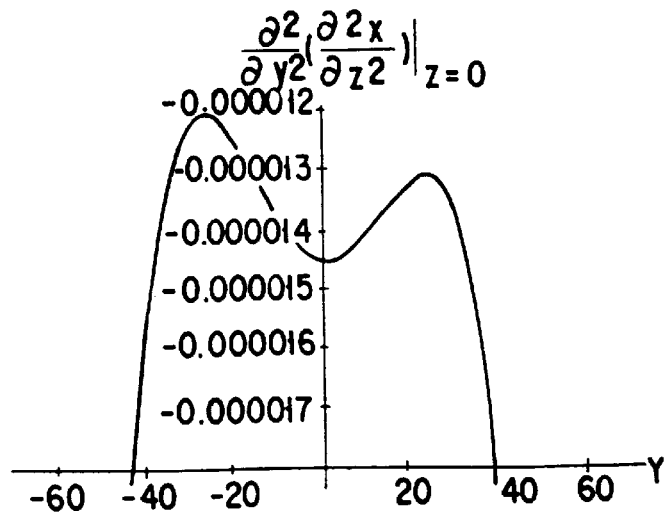
FIG. 84 is a graph showing a secondary differential value between the curvature of the sub-scanning direction and the coordinates of the main-scanning direction at the cross point between the light scanning surface and the lens surface, in connection with the emission surface of the fθ lens of the optical exposer unit of FIG. 73.

FIG. 84 shows a secondary differential value between the curvature of the sub-scanning direction and the coordinates of the main-scanning direction at the cross point between the light scanning surface and the lens surface.

Figure 85:
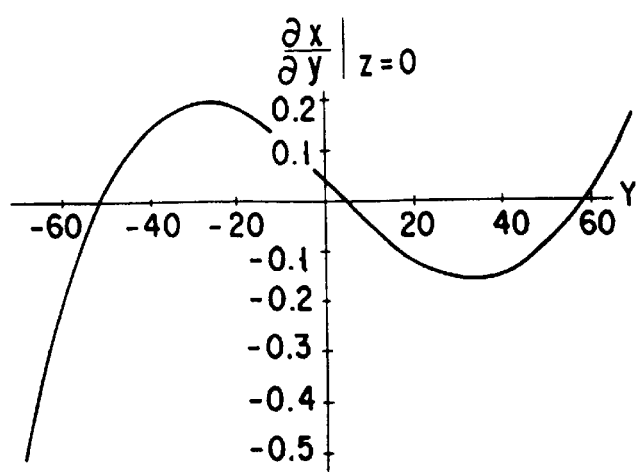
FIG. 85 is a graph showing a differential value between the coordinates of the main-scanning direction and the coordinates of the direction of the optical axis at the cross point between the light scanning surface and the lens surface, in connection with the emission surface of the fθ lens of the optical exposer unit of FIG. 73.

FIG. 85 shows a differential value between the coordinates of the main-scanning direction and the coordinates of the direction of the optical axis at the cross point between the light scanning surface and the second lens surface of the lens 230.

Figure 86:
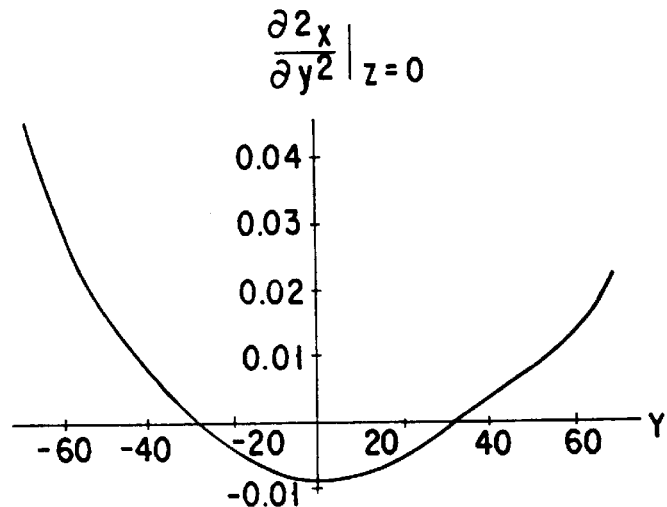
FIG. 86 is a graph showing a curvature of the emission surface of the fθ lens of the main-scanning direction at the cross point between the light scanning surface and the lens surface (that is, the plane, which includes the optical axis of the optical system and is expanded to the main-scanning direction)

FIG. 86 shows a curvature of the second surface of the lens 230 of the main-scanning direction at the cross point between the light scanning surface and the lens surface (that is, the plane, which includes the optical axis of the optical system and is expanded to the main-scanning direction).

Figure 87:
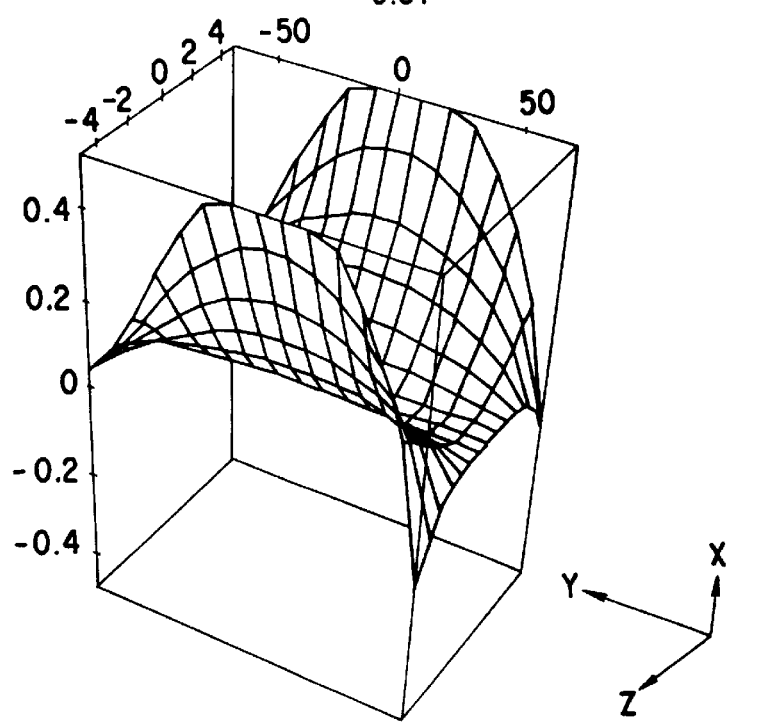
FIG. 87 is a graph showing the shape of the emission surface of the fθ lens of the sub-scanning direction at each point of the main-scanning direction of the lens surface based the cross point between the light scanning surface and the lens surface (that is, the plane, which includes the optical axis of the optical system and is expanded to the main-scanning direction)

FIG. 87 shows the shape of the second surface of the image-forming lens 230 of the sub-scanning direction at each point of the main-scanning direction of the lens surface based the cross point between the light scanning surface and the lens surface (that is, the plane, which includes the optical axis of the optical system and is expanded to the main-scanning direction).

Figure 88:
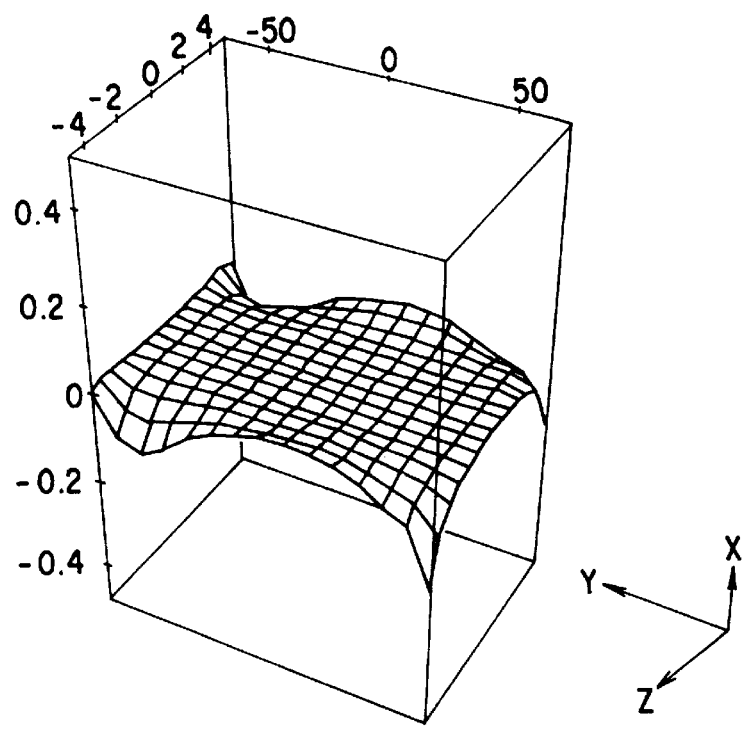
FIG. 88 is a graph showing the shift of the shape of the emission surface of the fθ lens of the sub-scanning direction based on an arc having curvature in a condition that the sub-scanning direction z=0.

FIG. 88 shows the shift of the shape of the second surface of the lens 230 of the sub-scanning direction based on an arc having curvature in a condition that the sub-scanning direction z=0.

Figure 89:
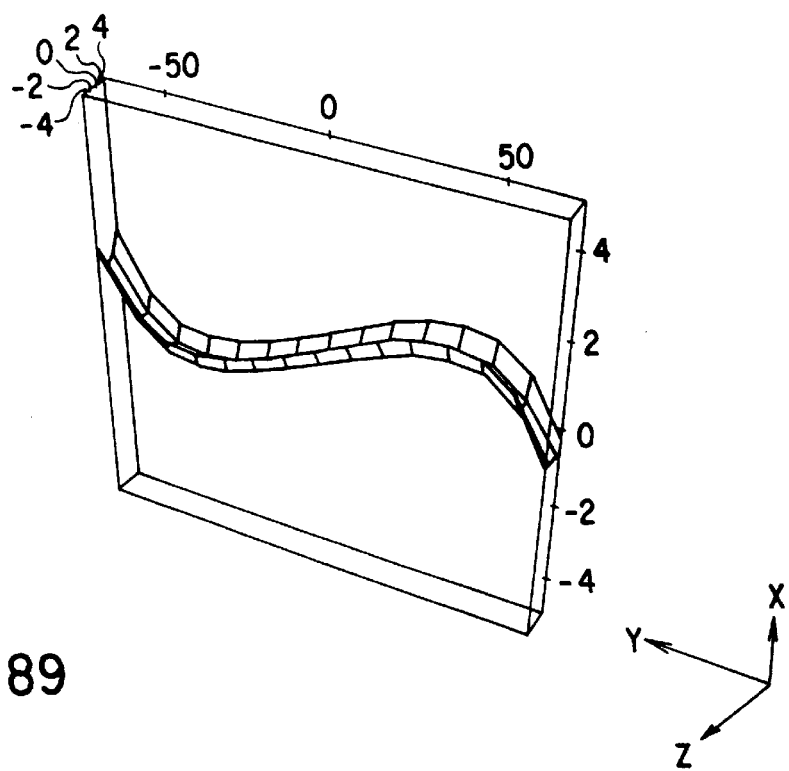
FIG. 89 is a schematic view showing an asymmetrical component to the surface expanding to the sub-scanning direction and including the optical axis with respect to the shape of the emission surface of the fθ lens of the main-scanning direction.

FIG. 89 shows an asymmetrical component to the surface expanding to the sub-scanning direction and including the optical axis with respect to the shape of the second surface of the lens 230.

As shown in FIGS. 83 to 89, similar to the first surface of the image-forming lens 230, the second surface is formed to be asymmetrical to the optical axis (y=0, z=0) in the main-scanning direction and the sub-scanning direction. The inclination of the curvature of the sub-scanning direction is symmetrically changed with respect to the point crossing point with the optical axis of the main-scanning direction, and no rotation symmetrically surface is included in the main-scanning direction and the sub-scanning direction.

As already explained in FIG. 23, the light emission surface of the lens 30a has no rotation symmetrical surface. Therefore, various characteristics of the lens surface of the main-scanning direction and the sub-scanning direction against the wide deflection angle.

Also, FIG. 24 shows that the curvature of the lens surface of the sub-scanning direction changes a sign in mid course of the main-scanning direction. Thereby, various characteristics of the lens surface of the sub-scanning direction can be optimized against the wide deflection angle without increasing an absolute value of power of the lens surface in the sub-scanning direction. It is well known that aberration is easily generated as the absolute value of power of the lens surface becomes large. In order to avoid such a disadvantage, the above-mentioned point can improve the performance of the lens.

FIG. 26 shows the primary differential value between the main-scanning direction and the coordinates of the optical axis at the cross point between the light scanning surface, and the lens surface has two extreme values. Thereby, fθ characteristic of the main-scanning direction can be corrected without increasing the thickness of the lens against the wide deflection angle. Particularly, in the case of the plastic-formed lens, it takes much time to mold the lens and the manufacturing cost is increased if the thickness of the lens becomes thick.

Also, FIG. 27 shows that the curvature of the lens surface of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

Also, FIG. 28 shows the shape of the lens surface of the sub-scanning direction when the coordinates of the cross point are set to 0. Moreover, the relative relationship between the peripheral section of the sub-scanning direction and the optical section of the sub-scanning direction is reversed in mid course of the main-scanning direction. This point is largely helpful to improve the various characteristics of the sub-scanning direction over the large width of the sub-scanning direction.

Moreover, FIG. 29 shows the shift of the shape of the second surface of the lens 30a of the sub-scanning direction based on an arc having curvature in a condition that the sub-scanning direction z=0. In other words, FIG. 29 shows that the second surface of the lens 30a is shaped such that in which at least the term of n is 2 or more in the equation (1), that is, $A_{mn}Y^m \cdot Z^{2n}$ to the sub-scanning direction. Thereby, the second surface of the lens 30a can be shaped such that the relative relationship between the peripheral section of the sub-scanning direction and the optical section of the sub-scanning direction is reversed in mid course of the main-scanning direction.

From the above explanation, it can be understood that the both surfaces of the lens 30a have no rotation axis, and that the primary differential value between the main-scanning direction and the coordinates of the optical axis at the cross point between the light scanning surface and the lens surface has two extreme values.

In contrast, FIG. 86 shows that the curvature of the lens surface of the main-scanning direction changes a sign in mid course of the main-scanning direction. Thereby, various characteristics of the lens surface of the main-scanning direction can be optimized against the wide deflection angle without increasing an absolute value of power of the lens surface in the main-scanning direction. It is well known that aberration is easily generated as the absolute value of power of the lens surface becomes large. In order to avoid such a disadvantage, the above-mentioned point can improve the performance of the lens.

FIG. 87 shows the shape of the lens surface of the sub-scanning direction when the coordinates of the cross point are set to 0. Moreover, the relative relationship between the peripheral section of the sub-scanning direction and the optical section of the sub-scanning direction is reversed in mid course of the main-scanning direction. This feature is largely helpful to improve the various characteristics of the sub-scanning direction over the large width of the sub-scanning direction.

FIG. 88 shows the shift of the shape of the second surface of the lens 230 of the sub-scanning direction based on an arc having curvature in a condition that the sub-scanning direction z=0. In other words, FIG. 88 shows that the second surface of the lens 230 is shaped such that in which at least the term of n is 2 or more in the equation (1), that is, $A_{mn}Y^m \cdot Z^{2n}$ to the sub-scanning direction. Thereby, the second surface of the lens 230 can be shaped such that the relative relationship between the peripheral section of the sub-scanning direction and the optical section of the sub-scanning direction is reversed in mid course of the main-scanning direction.

From the above explanation, it can be understood that the both surfaces of the lens 230 have no rotation axis, and that the primary differential value between the main-scanning direction and the coordinates of the optical axis at the cross point between the light scanning surface and the lens surface has two extreme values.

Figure 90:
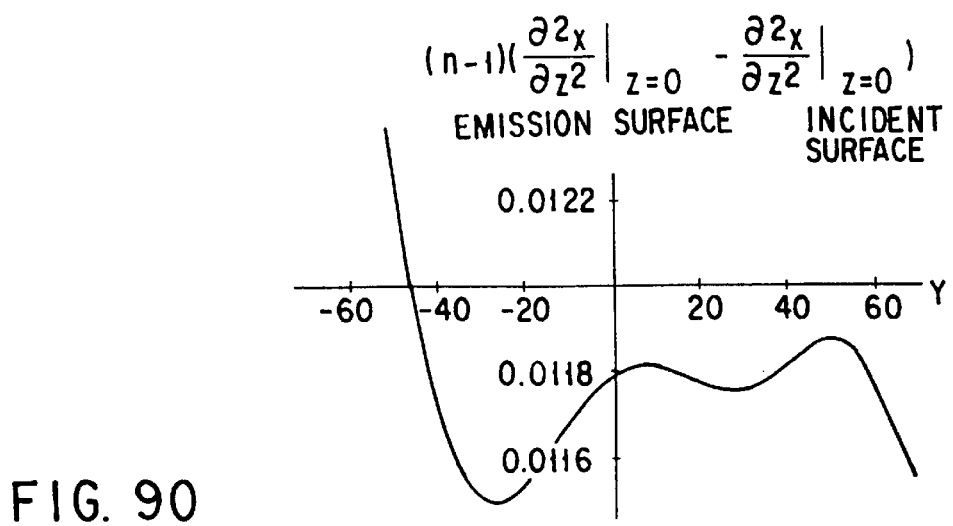
FIG. 90 is a graph showing a distribution of power, which is continuous in the sub-scanning direction in connection with the fθ lens of the optical exposer unit of FIG. 73.

FIG. 90 shows a distribution of power, which is continuous in the sub-scanning direction in a state that the image-forming lens 230 is regarded as a thin lens. The distribution can be obtained by the following method.

More specifically, in FIG. 90, the curvature of the image forming lens 230 of the sub-scanning direction corresponding to the position of the main-scanning direction of the light incident surface of the lens 230 is subtracted from the curvature of the image forming lens 230 of the sub-scanning direction corresponding to the position of the main-scanning direction of the light emission surface of the lens 230. The resultant value is multiplied by a value, which is obtained by removing 1 (refractive index of air) from a refractive index n of PMMA, serving as a material of the lens 230, thereby the above distribution of power can be obtained.

Figure 91:
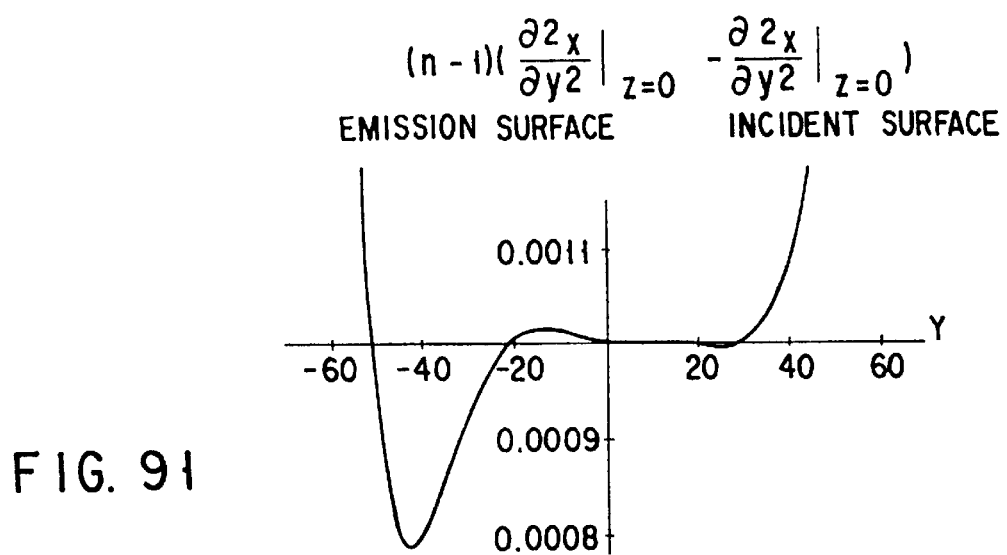
FIG. 91 is a graph showing a distribution of power, which is continuous in the main-scanning direction in connection with the fθ lens of the optical exposer unit of FIG. 73.

FIG. 91 shows a distribution of power, which is continuous in the main-scanning direction in a state that the image-forming lens 230 is regarded as a thin lens. The distribution can be obtained by the following method.

More specifically, in FIG. 91, the curvature of the lens 230 of the main-scanning direction corresponding to the position of the main-scanning direction of the light incident surface of the lens 230 is subtracted from the curvature of the lens 230 of the main-scanning direction corresponding to the position of the main-scanning direction of the light emission surface of the lens 230. The resultant value is multiplied by a value, which is obtained by removing 1 (refractive index of air) from a refractive index n of PMMA, serving as a material of the lens 230, thereby the above distribution of power can be obtained.

Figure 92:
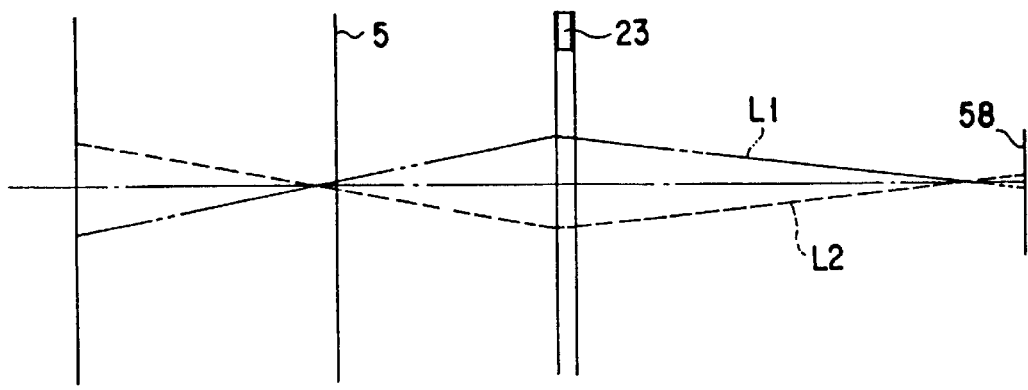
FIG. 92 is a schematic view showing the relative position of the laser beams in the sub-scanning direction against the optical axis of a hybrid cylinder lens after passing through the hybrid cylinder lens of the optical exposer unit of FIG. 73.

FIG. 92 shows the relative position of the pair of two laser beams L1 and L2, each emitted from from the first and second lasers 203a and 203b, in the sub-scanning direction. As shown in FIG. 92, the characteristics of the lens are defined such that the pair of two laser beams, that is, N1=2 laser beams cross the optical axis of the optical system between the first surface of the lens 230 (light incident surface) and the image surface. Thereby, the beam space between N1=2 laser beams can be constantly maintained regardless of the change of the temperature and humidity.

FIGS. 93 to 98 specifically explain the various characteristics provided by the image forming lens 230 in a state that the image surface beam position of the main-scanning direction is a horizontal axis.

Figure 93:
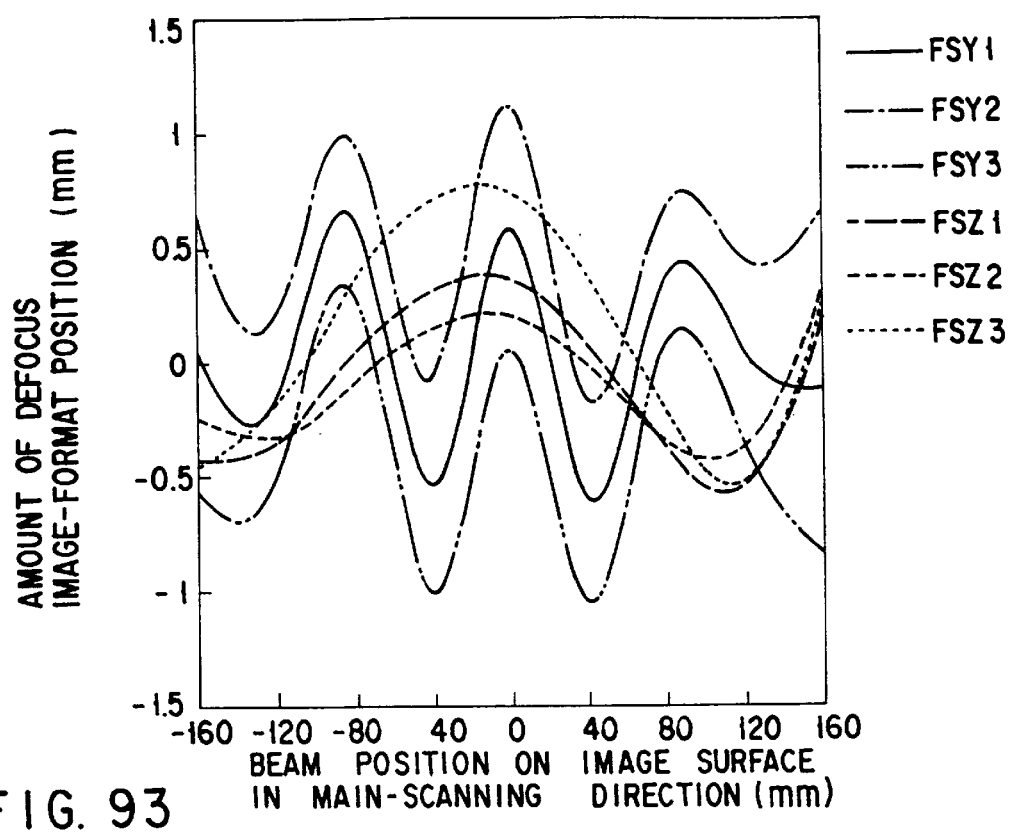
FIG. 93 is a graph showing the variation of the laser beam in the direction of the main-scanning direction, that is, an amount of de-focus of the laser laser beam in each of the main-scanning direction and the sub-scanning direction from the image surface to an image-formed position.

FIG. 93 shows the variation of the laser beam in the direction of the main-scanning direction, that is, an amount of de-focus of the laser laser beam in each of the main-scanning direction and the sub-scanning direction on the image surface in a state that the refractive index is changed. In this case, added numbers 1, 2, and 3 correspond to the conditions of refractive index n=1.4855, n=1.4821, and n=1.4889, respectively. As shown in FIG. 93, the amount of de-focus of the laser beam is controlled to be within the range of ±1.1 mm at its maximum.

Figure 94:
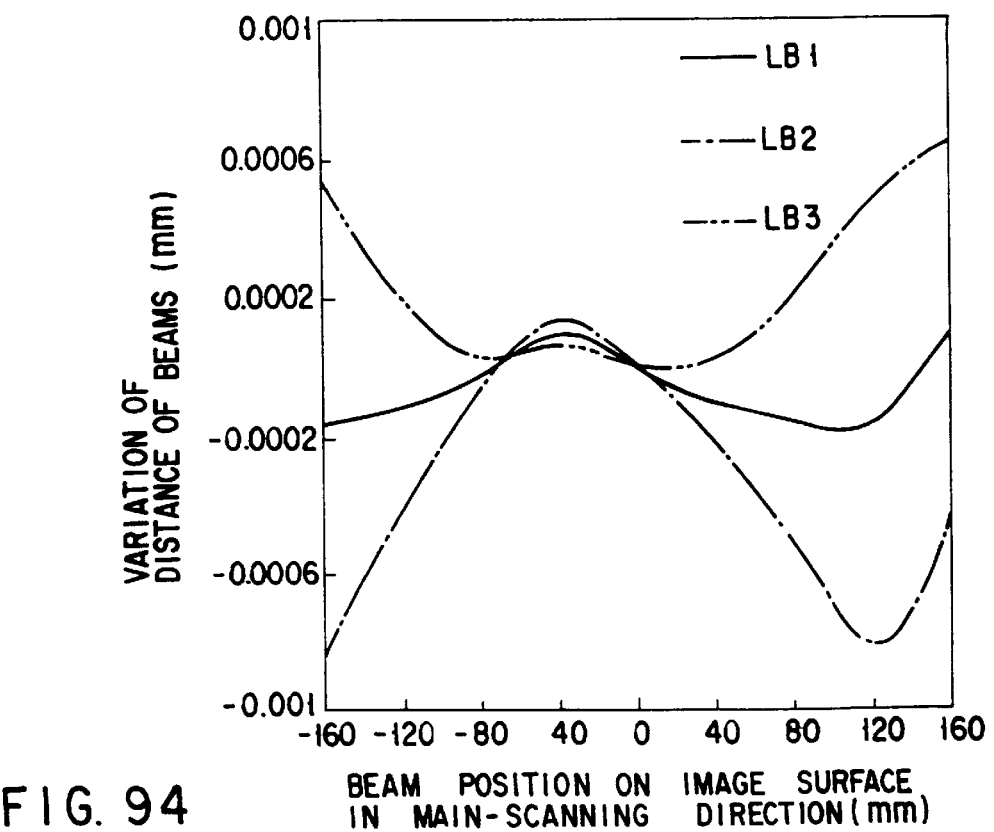
FIG. 94 is a graph showing the value of variation of distance of the positions of the laser beams versus the beam position in the main scanning direction on the image surface.

FIG. 94 shows the value of the shift (variation of distance) between the laser beams in the sub-scanning direction on the image surface in a state that the refractive index is changed. In this case, added numbers 1, 2, and 3 correspond to the conditions of refractive index n=1.4855, n=1.4821, and n=1.4889, respectively. As shown in FIG. 94, the value of the variation of the beam distance is controlled to be within the range of ±0.0009 mm at its maximum.

Figure 95:
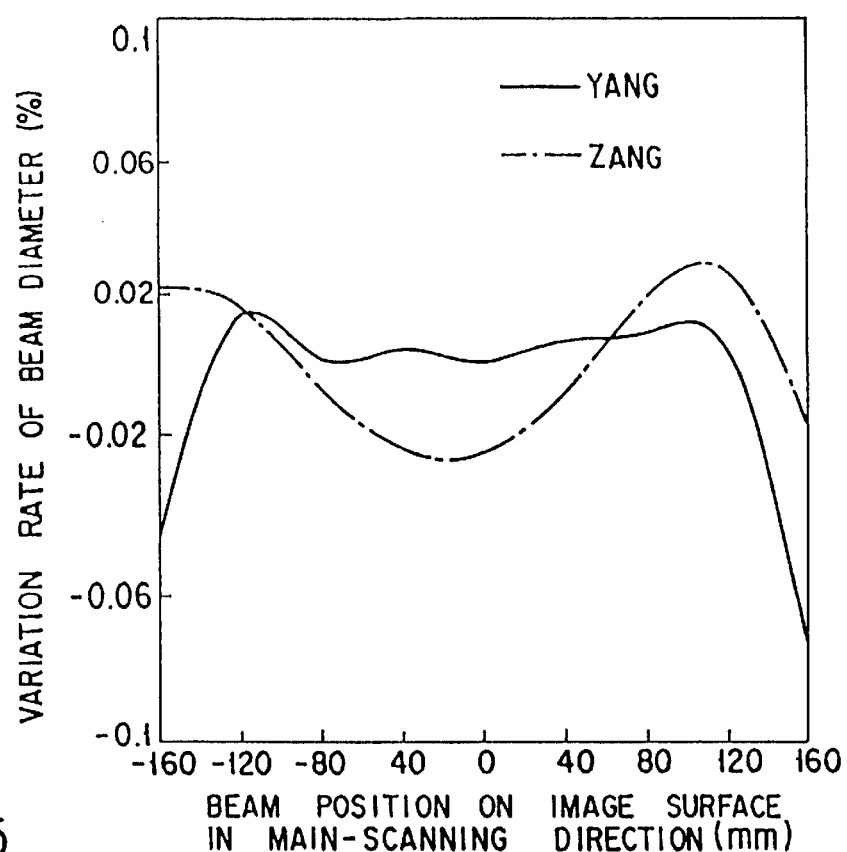
FIG. 95 is a graph showing the variation ratio of an inverse of a converging angle, that is, the variation ratio of each laser beam diameter in the main-scanning direction and the sub-scanning direction on the image surface.

FIG. 95 shows the variation ratio of an inverse of a converging angle, that is, the variation ratio of each laser beam diameter in the main-scanning direction and the sub-scanning direction on the image surface. In this case, YANG: main-scanning direction, ZYAG: sub-scanning direction. As shown in FIG. 95, the variation ratio of the beam diameter is controlled to be about 8% at its peak to peak.

Figure 96:
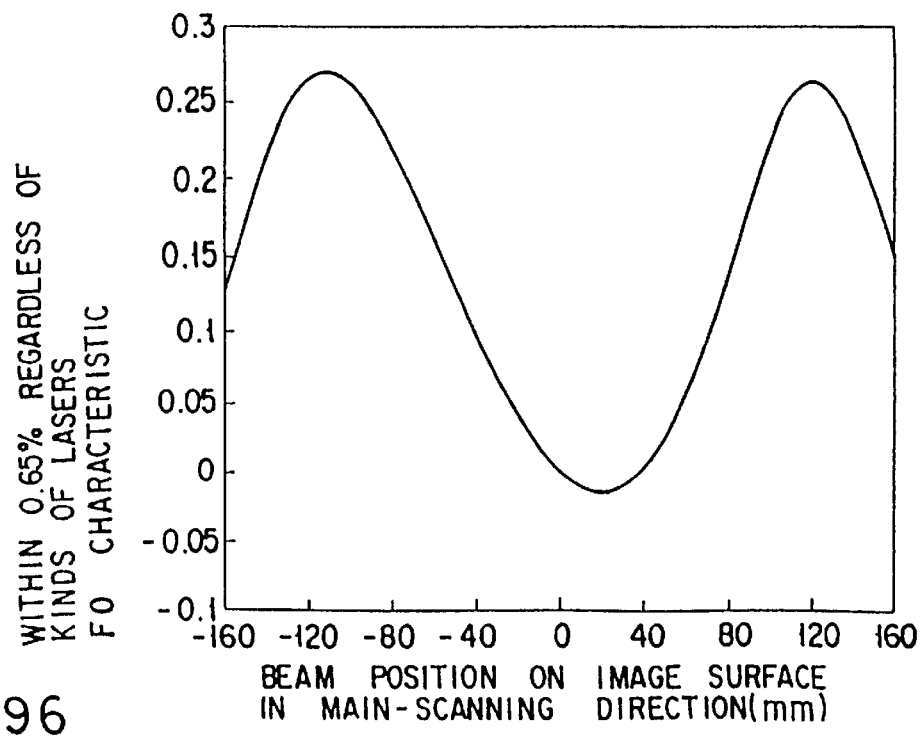
FIG. 96 is a graph showing the variation ratio of the fθ characteristic of each laser beam in the main scanning direction on the image surface.

FIG. 96 shows the variation ratio of the fθ characteristic of each laser beam in the main scanning direction on the image surface. As shown in FIG. 96, the fθ characteristic is controlled to be within the range of about 0.3% regardless of the kinds of the laser beams.

FIG. 97 shows the variation of the beam position of the sub-scanning direction on the image surface in a state that the tilts of the deflect surface of the polygon mirror 5 is contained in one minute. As shown in FIG. 97, the variation of the beam position is controlled to be 0.001 mm at its maximum. In a case where there is no need of correcting the position error of each of the tilts of the deflect surfaces of the polygon mirror 5 against the wide deflection angle, the variation of the beam position is 0.186, and the correction ratio of the position error of the tilt is $\frac{1}{186}$ in the optical system having the lens 230.

FIG. 98 shows the variation ratio of transmissivity of each laser beam against the image surface beam position in the main scanning direction on the image surface. As shown in FIG. 98, the variation ratio of the transmissivity is controlled to be within the range of about 4% regardless of the kinds of the laser beams.

As explained above, according to the above-mentioned optical exposer unit, the shapes of the first surface (light incident surface) and the second surface (light emission surface) of the image forming lens are optimized at the position of each of the main-scanning direction and the sub-scanning direction. Thereby, the aberration characteristics such as spherical aberration on the image surface, comma aberration, image surface curvature, or multiplication error can be controlled to be within a predetermined range by only two image forming lenses. In other words, the scanning surface expanding to the main-scanning direction and the shape of the line crossing the lens surface are formed to be asymmetrical to the optical axis passing through the lens surface. Thereby, the image-formed surface of the main-scanning direction can be prevented from largely deviating from the image surface. Also, the fθ characteristics can be prevented from being shifted in a state that the optical axis of the main-scanning direction is sandwiched therebetween. Moreover, in the laser beam, which is largely shifted from the optical axis, the amounts of the scattering laser beam and ghost laser beams in the main-scanning direction and the sub-scanning direction can be reduced. Further, the amount of variation of the intensity distribution of the beam passing through any positions of the main-scanning direction can be controlled to be less than a predetermined range. Therefore, influence of the variation of the refractive index due to the temperature and humidity and that of the variation of the shapes of the lens, which are exerted on the Ni laser beam distance, can be reduced. Similarly, the same effect can be applied to the M group of the laser beams. Moreover, influence of the variation of the temperature and humidity of the beam waist position can be controlled at the position close to the image surface. Due to this, the variation of the beam diameter can be reduced. Further, the incident light can be input to the deflecting means from the direction other than the front. Due to this, various characteristics of the main-scanning direction, which are caused by asymmetry of the rotation mirror of the deflecting means, can be improved. Also, the reflection angle or the scanning width can be improved. Furthermore, since the correction ratio of the position error of the tilt is increased, the beam distance of the sub-scanning direction can be equalized. Moreover, the second surface of the lens. 230 is shaped such that in which at least the term of n is 2 or more in the equation (1), that is, $A_{mn} Y^m \cdot Z^{2n}$ to the sub-scanning direction. Thereby, spherical aberration on the image surface and comma aberration can be improved. Also, the variation of the beam position of the sub-scanning direction can be reduced.

Moreover, timing of image writing of the respective beams can be conformed to each other. Also, repeatability of timing can be prevented from being changed by the rise of temperature. Further, the positions of the Ni beams can be correctly detected even if the housing is deformed.

Furthermore, at least one of first resolution and second resolution, which is smaller than the first resolution, can be selected in accordance with the signal of the resolution setting means. In the case where the second resolution is selected, the Ni beam distance on the image surface can be expressed by the following equation:

$$GP'=AMP \times LGP \times \{1-(DPI/DPIo)\}/(Pi-1)$$

wherein DPIo=the maximum resolution of the image forming apparatus can form an image, and Pi=at least two or more number of beams.

Thereby, the suitable latent image corresponding to one pixel can be formed even if resolution is changed.

Therefore, the curve of the main scanning line or the fθ characteristics can be prevented from becoming unequal. Also, there can be eliminated various disadvantages in which the overlapped colors to be emitted are not the same as the predetermined color, the density of the same color is varied, or the outline of the image of the overlapped colors is shifted.

Moreover, regarding the intermediate color tone or the color image, the color density can be controlled. Also, there can eliminated the various disadvantages in which the line width is changed, the overlapped colors to be emitted are not the same as the predetermined color, or the outline of the image of the overlapped colors is shifted. Further, the first laser beam corresponding to the black color and the second laser beam corresponding to the color image can be provided onto the image surface based on resolution, which is required in each of these laser beams.

Furthermore, the number of the image forming lenses can be reduced to one by satisfying the above-mentioned all parameters in a condition that the group M is set to 1.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical exposer unit comprising:
    at least one or more light sources having a sum total of numbers $N_1$ to $N_M$ (M=one or more integral number), for respectively emitting light beams;
    first lens means for converting each of said light beams emitted from each of said light sources to either a convergent light beam or a parallel light beam, said first lens means including one of a finite lens and a collimate lens of the sum total of numbers $N_1$ to $N_M$;
    second lens means for providing lens power of a first direction so as to converge a light beam emitted from each of said first lens means to only the first direction, said second lens means provided to be M pairs;
    deflecting means for deflecting the light beams emitted from said second lens means to a second direction perpendicular to said first direction, said deflecting means including a reflection surface formed to be rotatable around a rotation axis extended to be parallel to said first direction; and
    image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means, a curvature of at least one surface of said lens in said first direction changing along the first direction and a curvature of said second direction chancing along the second direction in said image forming means.

2. The optical exposer unit according to claim 1, wherein said image forming means includes an optical axis perpendicular to each of said first and second directions, and a shape of a line, defined when at least one lens surface of the lens in said image forming means crosses the surface extended to said second direction, is asymmetrical to said optical axis.

3. The optical exposer unit according to claim 2, wherein the shape of the lens surface of said image forming means does not depend on a rotation symmetrical axis when the lens surface is formed.

4. The optical exposer unit according to claim 1, wherein a curvature of said first direction said image forming means changes in the entire area of said second direction.

5. The optical exposer unit according to claim 4, wherein a sign of the curvature of said first direction of at least one of the lens surfaces of the lens in said image forming means is reversed to correspond to a position of said second direction.

6. The optical exposer unit according to claim 1, wherein at least one of lens surfaces of said lens in said image forming means includes an optical axis, and two extreme values as a result of a primary differential value by showing a line, defined to cross the surface extended to the second direction, along the second direction on a coordinate defined along said optical axis.

7. The optical exposer unit according to claim 6, wherein the shape of lens surface of said image forming means does not depend on the rotation symmetrical axis when the lens surface is formed.

8. The optical exposer unit according to claim 1, wherein lens power of the second direction of at least one of the lens surfaces of said lens in said image forming means changes in the entire area of said second direction.

9. The optical exposer unit according to claim 8, wherein a sign of the power of said second direction of at least one of the lens surfaces of the lens in said image forming means is reversed to correspond to a position of said second direction.

10. The optical exposer unit according to claim 1, further comprising synthesizing means, provided at the side of a light source rather than said deflecting means, for synthesizing the light beams of the sum total of numbers $N_1$ to $N_M$ into one flux of beams.

11. An optical exposer unit comprising:

light sources having a sum total of numbers $N_1$ to $N_M$ (M=two or more integral number), for respectively emitting light beams, wherein at least one of $N_1$ to $N_M$ is two or more;

first lens means for converting each of said light beams emitted from each of said light sources to either a convergent light beam or a parallel light beam, said first lens means including one of a finite lens and a collimate lens of the sum total of numbers $N_1$ to $N_M$;

second lens means for providing lens power of a first direction so as to converge a light beam emitted from each of said first lens means to only a first direction, said second lens means provided to be M pairs;

deflecting means for deflecting the light beams emitted from said second lens means to a second direction perpendicular to said first direction, said deflecting means including a reflection surface formed to be rotatable around a rotation axis extended to be parallel to said first direction; and image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means.

12. The optical exposer unit according to claim 11, wherein said image forming means includes an optical axis perpendicular to each of said first and second directions, and a shape of a line, defined when at least one lens surface of the lens in said image forming means crosses the surface extended to said second direction, is asymmetrical to said optical axis.

13. The optical exposer unit according to claim 12, wherein the shape of the lens surface of said image forming means does not depend on a rotation symmetrical axis when the lens surface is formed.

14. The optical exposer unit according to claim 11, wherein a curvature of said first direction of at least one of lens surfaces of the lens in said image forming means changes in the entire area of said second direction.

15. The optical exposer unit according to claim 14, wherein a sign of the curvature of said first direction of at least one of the lens surfaces of the lens in said image forming means is reversed to correspond to a position of said second direction.

16. The optical exposer unit according to claim 11, wherein at least one of lens surfaces of said lens in said image forming means includes an optical axis, and two extreme values as a result of a primary differential value by showing a line, defined to cross the surface extended to the second direction, along the second direction on a coordinate defined along said optical axis.

17. The optical exposer unit according to claim 16, wherein the shape of a lens surface of said image forming means does not depend on the rotation symmetrical axis when the lens surface is formed.

18. The optical exposer unit according to claim 11, wherein lens power of the second direction of at least one of the lens surfaces of said lens in said image forming means changes in the entire area of said second direction.

19. The optical exposer unit according to claim 18, wherein a sign of the power of said second direction of at least one of the lens surfaces of the lens in said image forming means is reversed to correspond to a position of said second direction.

20. The optical exposer unit according to claim 11, further comprising synthesizing means, provided at the side of a light source rather than said deflecting means, for synthesizing the light beams of the sum total of numbers $N_1$ to $N_M$ into one flux of beams.

21. The optical exposer unit according to claim 20, wherein each of said beams synthesized by said synthesizing means is crossed between a lens surface closest to said deflecting means and an image plane.

22. The optical exposer unit according to claim 21, further comprising detecting means, provided on an image plane, for detecting each of the light beams passed through said image forming means.

23. The optical exposer unit according to claim 22, wherein said detecting means includes a position sensor.

24. The optical exposer unit according to claim 11, further comprising:

resolution changing means for providing a light beam emitted with a predetermined value of GP where a latent image corresponding to one pixel satisfies the following equation:

$$GP = AMP \times LGP \times \{1-(DPI/DPIo)\}/(Pi-1)$$

wherein AMP: a constant ranging from 1.2 to 1.6, LGP: line distance at the time of writing the image by a signal laser beam, DPIo: first resolution of an image forming apparatus, DPI: second resolution smaller than said first resolution, and Pi: number of light beams, Pi is two or more in number.

25. An optical exposer unit comprising:

light sources having a sum total of numbers $N_1$ to $N_M$ (M=two or more integral number), for respectively emitting light beams;

first lens means for converting each of said light beams emitted from each of said light sources to either a convergent light beam or a parallel light beam, said first lens means including one of a finite lens and a collimate lens of the sum total of numbers $N_1$ to $N_M$;

second lens means for providing lens power of a first direction so as to converge a light beam emitted from each of said first lens means to only the first direction, said second lens means provided to be M pairs;

deflecting means for deflecting the light beams emitted from said second lens means to a second direction perpendicular to said first direction, said deflecting means including a reflection surface formed to be rotatable around a rotation axis extended to be parallel to said first direction; and image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means, wherein at least one of the $N_1$ to $N_M$ of said light sources is different from the others.

26. The optical exposer unit according to claim 25, wherein said image forming means includes an optical axis perpendicular to each of said first and second directions, and a shape of a line, defined when at least one lens surface of the lens in said image forming means crosses the surface extended to said second direction, is asymmetrical to said optical axis.

27. The optical exposer unit according to claim 26, wherein the shape of the lens surface of said image forming means does not depend on a rotation symmetrical axis when the lens surface is formed.

28. The optical exposer unit according to claim 25, wherein a curvature of said first direction of at least one of lens surfaces of the lens in said image forming means changes in the entire area of said second direction.

29. The optical exposer unit according to claim 28, wherein a sign of the curvature of said first direction of at least one of the lens surfaces of the lens in said image forming means is reversed to correspond to a position of said second direction.

30. The optical exposer unit according to claim 25, wherein at least one of lens surfaces of said lens in said image forming includes an optical axis, and two extreme values as a result of a primary differential value by showing a line, defined to cross the surface extended to the second direction, along the second direction on a coordinate defined along said optical axis.

31. The optical exposer unit according to claim 30, wherein the shape of a lens surface of said image forming means does not depend on the rotation symmetrical axis when the lens surface is formed.

32. The optical exposer unit according to claim 25, wherein lens power of the second direction of at least one of the lens surfaces of said lens in said image forming means changes in the entire area of said second direction.

33. The optical exposer unit according to claim 32, wherein a sign of the power of said second direction of at least one of the lens surfaces of the lens in said image forming means is reversed to correspond to a position of said second direction.

34. The optical exposer unit according to claim 25, further comprising synthesizing means, provided at the side of a light source rather than said deflecting means, for synthesizing the light beams of the sum total of numbers $N_1$ to $N_M$ into one flux of beams.

35. An optical exposer unit comprising:
at least one or more light sources having a sum total of numbers $N_1$ to $N_M$ (M=one or more integral number), for respectively emitting light beams, wherein at least one of $N_1$ to $N_M$ is two or more;
first lens means for converting each of said light beams emitted from each of said light sources to either a convergent light beam or a parallel light beam, said first lens means including one of a finite lens and a collimate lens of the sum total of numbers $N_1$ to $N_M$;
second lens means for providing lens power of a first direction so as to converge a light beam emitted from each of said first lens means to only a first direction, said second lens means provided to be M pairs;
deflecting means for deflecting the light beams emitted from said second lens means to a second direction perpendicular to said first direction, said deflecting means including a reflection surface formed to be rotatable around a rotation axis extended to be parallel to said first direction; and
image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means, a curvature of at least one surface of said lens in said first direction changing along the first direction and a curvature of said second direction changing along the second direction in said image forming means.

36. An optical exposer unit comprising:
light sources having a sum total of numbers $N_1$ to $N_M$ (M=two or more integral number), for respectively emitting light beams, wherein at least one of $N_1$ to $N_M$ is two or more;
first lens means for converting each of said light beams emitted from each of said light sources to either a convergent light beam or a parallel light beam, said first lens means including one of a finite lens and a collimate lens of the sum total of numbers $N_1$ to $N_M$;
second lens means for providing lens power of a first direction so as to converge a light beam emitted from each of said first lens means to only the first direction, said second lens means provided to be M pairs;
deflecting means for deflecting the light beams emitted from said second lens means to a second direction perpendicular to said first direction, said deflecting means including a reflection surface formed to be rotatable around a rotation axis extended to be parallel to said first direction;
image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means, wherein each of said beams is crossed between a lens surface closet to said deflecting means and an image plane; and
detecting means, provided on an image plane, for detecting each of the light beams passed through said image forming means, wherein said detecting means includes a position sensor.

37. The optical exposer unit according to claim 36, further comprising resolution changing means for changing a position corresponding to the first direction of at least one light emission element of said light sources.

38. An optical exposer unit comprising:
light sources having a sum total of numbers $N_1$ to $N_M$ (M=one or more integral number), for respectively emitting light beams, wherein at least one of $N_1$ to $N_M$ is two or more;
first lens means for converting each of said light beams emitted from each of said light sources to either a convergent light beam or a parallel light beam, said first lens, means including one of a finite lens and a collimate lens of the sum total of numbers $N_1$ to $N_M$;
second lens means for providing lens power of a first direction so as to converge a light beam emitted from each of said first lens means to only a first direction, said second lens means provided to be M pairs;
deflecting means for deflecting the light beams emitted from said second lens means to a second direction perpendicular to said first direction, said deflecting means including a reflection surface formed to be rotatable around a rotation axis extended to be parallel to said first direction;
image forming means, including at least one lens, for image-forming each of said light beams deflected at an equal speed by said deflecting means at a predetermined position, said image forming means for correcting a shift of the image formed position against said predetermined position generated by a tilt of said reflection surface of said deflecting means; and
resolution changing means for providing a light beam emitted with a predetermined value of GP where a latent image corresponding to one pixel satisfies the following equation:

$$GP=AMP \times LGP \times \{1-(DPI/DPIo)\}/(Pi-1)$$

wherein AMP: a constant ranging from 1.2 to 1.6, LGP: line distance at the time of writing the image by a signal laser beam, DPIo: first resolution of an image forming apparatus, DPI: second resolution smaller than said first resolution, and Pi: number of light beams, Pi is two or more in number.

39. The optical exposer unit according to claim 38, wherein said resolution changing means changes a position corresponding to the first direction of at least one light emission element of said light sources.

40. The optical exposer unit according to claim 38, wherein said image forming means includes at least one lens, and each of said beams is crossed between a lens surface closest to said deflecting means and an image plane.

41. The optical exposer unit according to claim 40, further comprising detecting means, provided on an image plane, for detecting each of the light beams passed through said image forming means.

42. The optical exposer unit according to claim 41, wherein said detecting means includes a position sensor.

43. The optical exposer unit according to claim 38, further comprising resolution changing means for changing a position corresponding to the first direction of at least one light emission element of said light sources.

44. An optical exposer unit comprising:

at least one or more light sources having a sum total of numbers $N_1$ to $N_M$ (M=one or more integral number), for respectively emitting light beams;

deflecting means for deflecting a light beam, said deflecting means including a reflection surface formed to be rotatable around a rotation axis extended to be parallel to a first direction, said deflecting means deflecting light beams to a second direction perpendicular to said first direction; and image forming means, including at least one lens, for image-forming each light beam deflected at an equal speed by said deflecting means at a predetermined position, said image forming means for correcting a shift of the image formed position against said predetermined position generated by a tilt of said reflection surface of said deflecting means, a curvature of at least one surface of said lens in said first direction changing along the first direction and a curvature of said second dirction changing along the second direction in said image forming means.

* * * * *

UNITED STATES PATENT AND TRADEMARK OFFICE
CERTIFICATE OF CORRECTION

PATENT NO.　: 5,774,249

DATED　　　: June 30, 1998

INVENTOR(S) : Shiraishi et al.

Page 1 of 2

It is certified that error appears in the above-indentified patent and that said Letters Patent is hereby corrected as shown below:

Column 10, line 23, delete "73" and insert --73A--;
        between lines 25 and 26, indent and insert the following paragraph --FIGS. 73B and 73C are sectional views of the optical exposure unit of FIG. 73;--;
        line 28, delete "73" and insert --73A--;
        line 30, delete "73)" and insert --73A)--;
        line 40, delete "73" and insert --73A--;
        line 46, delete "73" and insert --73A--;
        line 53, delete "73" and insert --73A--.

Column 11, line 4, delete "73" and insert --73A--;
        line 15, delete "73" and insert --73A--;
        line 21, delete "73" and insert --73A--;
        line 46, delete "73" and insert --73A--;
        line 49, delete "73" and insert --73A--;
        line 54, delete "73" and insert --73A--.

Column 48, line 61, delete "73" and insert --73A--;
        line 62, delete "72." and insert --72, and FIGS. 73B and 73C are two different sectional views of the two-beam exposure unit of FIG. 73A.--;
        line 63, delete "73" and insert --73A--.

UNITED STATES PATENT AND TRADEMARK OFFICE
CERTIFICATE OF CORRECTION

PATENT NO. : 5,774,249
DATED : June 30, 1998
INVENTOR(S) : Shiraishi et al.

It is certified that error appears in the above-identified patent and that said Letters Patent is hereby corrected as shown below:

Column 49, line 33, delete "73" and insert --73A--.

Signed and Sealed this

Twenty-eighth Day of September, 1999

Attest:

Q. TODD DICKINSON

*Attesting Officer*     *Acting Commissioner of Patents and Trademarks*